US010832424B2

(12) United States Patent
Fletcher et al.

(10) Patent No.: US 10,832,424 B2
(45) Date of Patent: Nov. 10, 2020

(54) IMAGE REGISTRATION METHOD

(71) Applicant: CANON KABUSHIKI KAISHA, Tokyo (JP)

(72) Inventors: Peter Alleine Fletcher, Rozelle (AU); Andrew Docherty, Surry Hills (AU); Tatiana Dudina, Manly Vale (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 15/821,619

(22) Filed: Nov. 22, 2017

(65) Prior Publication Data
US 2018/0150962 A1 May 31, 2018

(30) Foreign Application Priority Data
Nov. 30, 2016 (AU) .............................. 2016266019

(51) Int. Cl.
G06T 7/10 (2017.01)
G06T 7/35 (2017.01)
G06T 7/33 (2017.01)

(52) U.S. Cl.
CPC ............... G06T 7/35 (2017.01); G06T 7/337 (2017.01); G06T 2207/20021 (2013.01); G06T 2207/20072 (2013.01); G06T 2207/20076 (2013.01)

(58) Field of Classification Search
CPC . G06T 7/35; G06T 7/337; G06T 2207/20021; G06T 2207/20072; G06T 2207/20076
See application file for complete search history.

(56) References Cited

U.S. PATENT DOCUMENTS 6,539,127 B1 3/2003 Roche et al.
7,440,628 B2 * 10/2008 Chefd'hotel ............ G06T 7/207
    382/236
7,483,034 B2 * 1/2009 Chefd'hotel .......... G06T 15/005
    345/582

(Continued)

OTHER PUBLICATIONS

B. Lucas, T. Kanade, "An Iterative Image Registration Technique with an Application to Stereo Vision," Proc 7th International Joint Conference on Artificial Intelligence (IJCAI) 1981, Aug. 24-28, Vancouver, British Columbia, pp. 674-679.

(Continued)

Primary Examiner — Gregory M Desire
(74) Attorney, Agent, or Firm — Canon U.S.A., Inc. IP Division

(57) ABSTRACT

A displacement field relating positions of pixels between at least two images having an initial displacement field is adjusted. Each pixel of the first image and the second image is associated with a label. A first pixel in the first image maps to a second pixel in the second image based on a vector of the initial displacement field. A set of third pixels includes the second pixel and a plurality of adjacent pixels to the second pixel, the third pixels being associated with labels and a candidate shift vector with respect to the second pixel. A covariance score is determined for each of the third pixels, the covariance score defining a statistical dependence between the first label of the first pixel and each of the third labels. An adjustment shift vector is then determined based on the covariance scores and the candidate shift vectors of the third pixels.

15 Claims, 30 Drawing Sheets

(56) References Cited

U.S. PATENT DOCUMENTS

| | | | | |
|---|---|---|---|---|
| 7,813,592 | B2* | 10/2010 | Vetter | G06K 9/00986 |
| | | | | 345/651 |
| 8,023,732 | B2* | 9/2011 | Deuerling-Zheng | G06T 7/238 |
| | | | | 375/240.16 |
| 8,126,291 | B2* | 2/2012 | Paragios | G06K 9/32 |
| | | | | 382/294 |
| 9,330,472 | B2* | 5/2016 | Deigmoeller | G06T 7/223 |
| 10,366,501 | B2* | 7/2019 | Ray | G06T 5/20 |
| 2007/0165943 | A1 | 7/2007 | Guetter et al. | |
| 2017/0365058 | A1* | 12/2017 | Kabus | G06T 7/344 |
| 2018/0150962 | A1* | 5/2018 | Fletcher | G06T 7/35 |

OTHER PUBLICATIONS

Cobzas D., Sen A. (2011) Random Walks for Deformable Image Registration. In: Fichtinger G., Martel A., Peter T. (eds) Medical Image Computing and Computer-Assisted Intervention—MICCAI 2011. Lecture notes in Computer Science, vol. 6892. Springer, Berlin, Heidelberg.

* cited by examiner

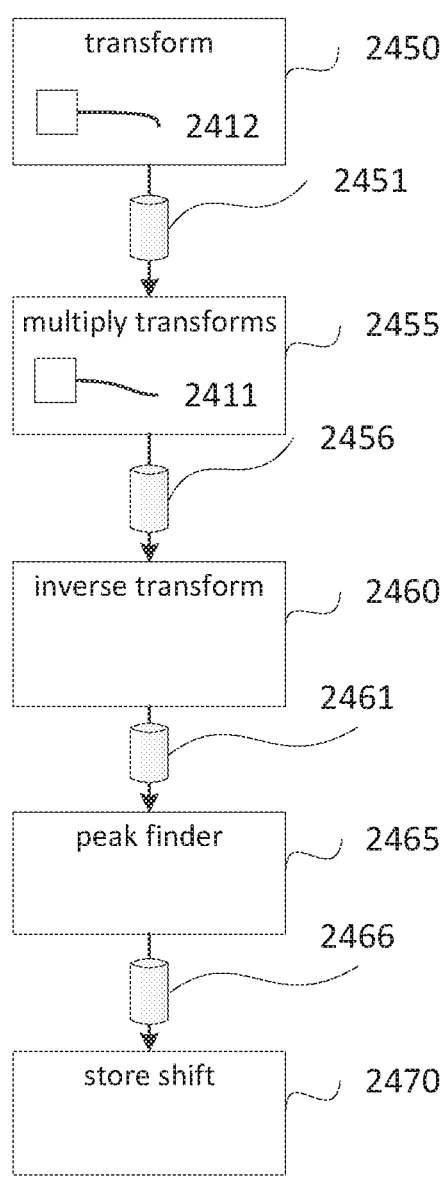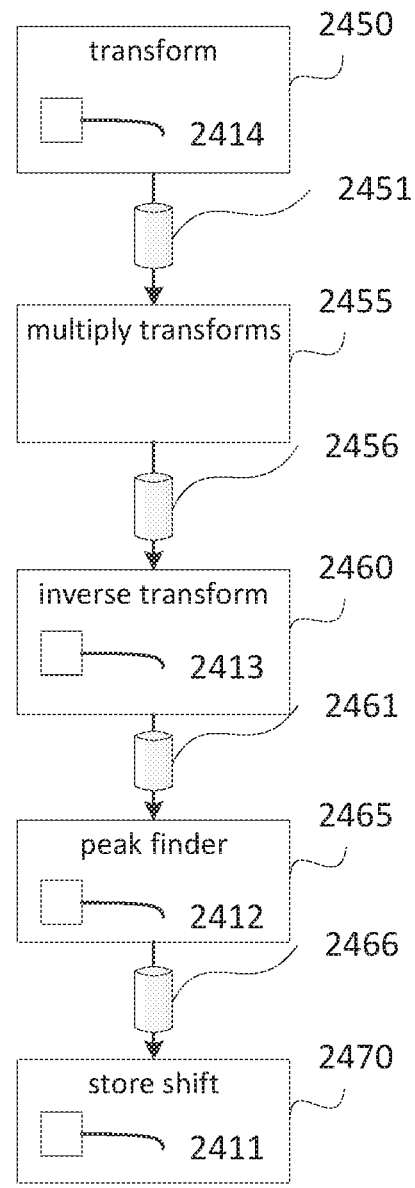
Fig. 24C
Fig. 24D

IMAGE REGISTRATION METHOD

TECHNICAL FIELD

The present invention relates to image processing, more particularly the registration of similar features in image pairs.

BACKGROUND

Registration of related images is a well-known problem in the image processing field, such as in medical imaging, video processing, optical device measurement and correction of optical distortions. It is commonly applied to both two and three dimensional data sets, which hereinafter will be referred to generically as images.

Two types of image registration methods are rigid registration methods and non-rigid registration methods. Rigid registration methods are simple and typically cannot handle local distortions in the images to be registered. Examples of distortions measured by rigid registration methods include translation, rotation, affine and the like.

Non-rigid registration methods are more complex, and are capable of dealing with local non-linear distortion in the images to be registered. There are two broad classes of non-rigid registration methods.

The first class of non-rigid registration methods is gradient-based methods, which combine intensity and gradient information calculated from the images to estimate local shift vectors for local areas of the images. The gradient-based methods operate under the assumption that registration is correct when the registered images are most similar by an intensity distance measure, such as RMS intensity difference. These gradient-based methods are appropriate where both images to be registered are acquired using the same modality and under the same conditions, making the intensity values of the images directly comparable. For example, two X-ray images of a patient's knee would contain similar intensity values if acquired at different times. Another example is two microscope images acquired of adjacent slices of a patient's tissue in a digital pathology sample, where both slices are stained by identical methods and acquired under identical magnification and lighting.

Gradient-based methods start with a local calculation involving image pixels. Gradient-based methods can also be configured to provide a global shift estimate for the images, or shift estimates for small local areas of pixels. In this way gradient-based methods can be used for calculation of non-rigid deformations such as optic flow, or for elastic movement of soft tissue due to positioning and gravity. However, gradient-based methods are not well-suited for registering images acquired under different modalities or conditions.

The second class of non-rigid registration methods is called mutual information (MI) based methods, which use the concept of entropy. MI methods measure the mutual information content of two images under registration relative to the information content of the two images independently. The quantity of mutual information content is maximized when the registration is correct. MI methods are appropriate where both images to be registered are acquired under different modalities, or under different conditions, and where intensity values are not directly comparable. For example, an MRI image acquired of a patient's knee would have a different appearance to a CAT scan image of the same knee (where when registered, intensity values do not match, but relate to each other). Another example is two related microscope images acquired of adjacent slices of a patient's tissue in a digital pathology sample, where both slices are stained by different methods, thus the colours in the two slides do not match, yet relate to each other.

The MI based methods calculate mutual information I, which is an image similarity measure that provides a mechanism to perform image registration. A series of displacement fields can be generated using a small number of parameters. The displacement field is used to warp a moving image (i.e., one of the pair of images to be registered) to a fixed image (i.e., the other image in the pair of images to be registered). The mutual information I is also calculated for the fixed image against each corresponding warped moving image.

While MI registration methods are well-suited to global rigid estimation, in which a global transform containing only a small number of parameters is estimated. It is possible to calculate non-rigid transformations by either optimizing a global transform containing a large number of parameters, or by estimating a small number of parameters on a small area of the image. However, these techniques can only operate over a relatively large image area, do not naturally allow a faster gradient-descent optimization, and are not suitable for estimating shift in a small area (such as an area of 8×8 pixels).

There is as yet no registration technique which combines the robust, multi-channel and multi-modal character of MI methods with the locality and speed of gradient-based methods.

SUMMARY

Disclosed are arrangements which seek to address at least one of the above problems by estimating a displacement adjustment vector on a pixel-wise basis.

One aspect of the present disclosure provides a method of adjusting a displacement field relating positions of pixels between at least two images, the method comprising:

receiving a first image and a second image, the received images being associated with an initial displacement field, each pixel of the first image and the second image being associated with a label;

selecting a first pixel in the first image which maps to a second pixel in the second image based on a vector of the initial displacement field, the first pixel being associated with a first label and the second pixel being associated with a second label;

determining a set of third pixels including the second pixel and a plurality of adjacent pixels to the second pixel, the third pixels being associated with third labels and a candidate shift vector with respect to the second pixel;

determining a covariance score for each of the third pixels, the covariance score defining a statistical dependence between the first label and each of the third labels;

determining an adjustment shift vector based on the covariance scores and the candidate shift vectors of the third pixels; and adjusting the vector of the initial displacement field using the determined adjustment shift vector.

Another aspect of the present disclosure provides a mini-kernel approximation filter, which is used for interpolation, including Partial,Volume (PV) interpolation, utilised in a method of determining a displacement field or a shift. The method of determining a displacement field relates positions of pixels between at least two images, the method comprising:

receiving a first image and a second image, the received images being associated with an initial displacement field, wherein each pixel of the received images is associated with a corresponding label;

calculating a first histogram comprising marginal probability distribution values of labels associated with pixels of the first image and a second histogram comprising marginal probability distribution values of labels associated with pixels of the second image, the first and second histograms being indexed by labels of corresponding images;

calculating a joint histogram defining a probability of a first label in the first image being mapped to a second label in the second image through a vector of the initial displacement field, wherein values in the joint histogram are calculated using partial volume interpolation technique with a 3×3 approximation kernel; and adjusting the initial displacement field using the first and second histograms and the joint histogram.

BRIEF DESCRIPTION OF THE DRAWINGS

At least one embodiment of the invention will now be described with reference to the following drawings, in which.

DETAILED DESCRIPTION INCLUDING BEST MODE

Figure 1A:
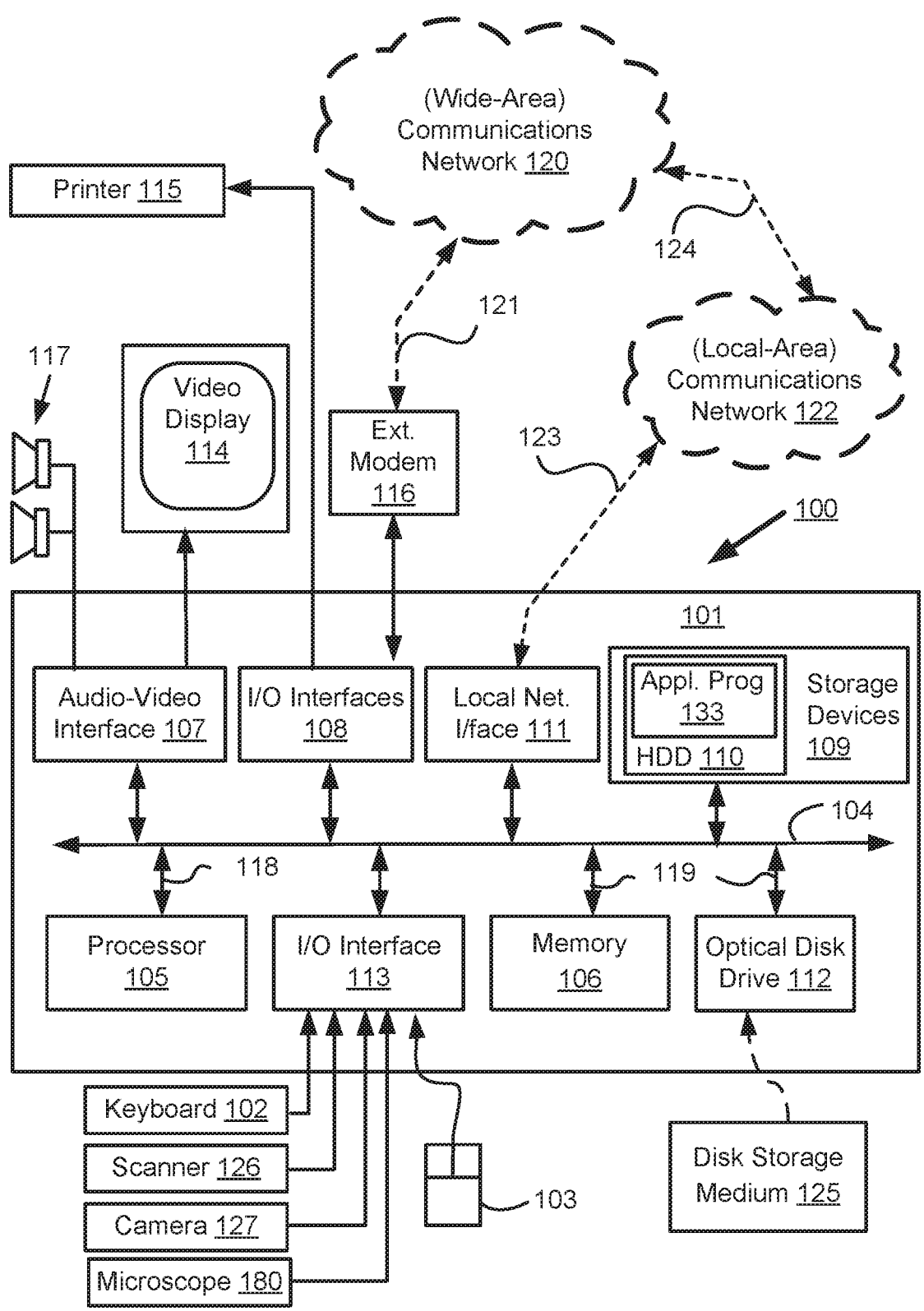
FIGS. 1A and 1B form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Structural Context

Figure 1B:
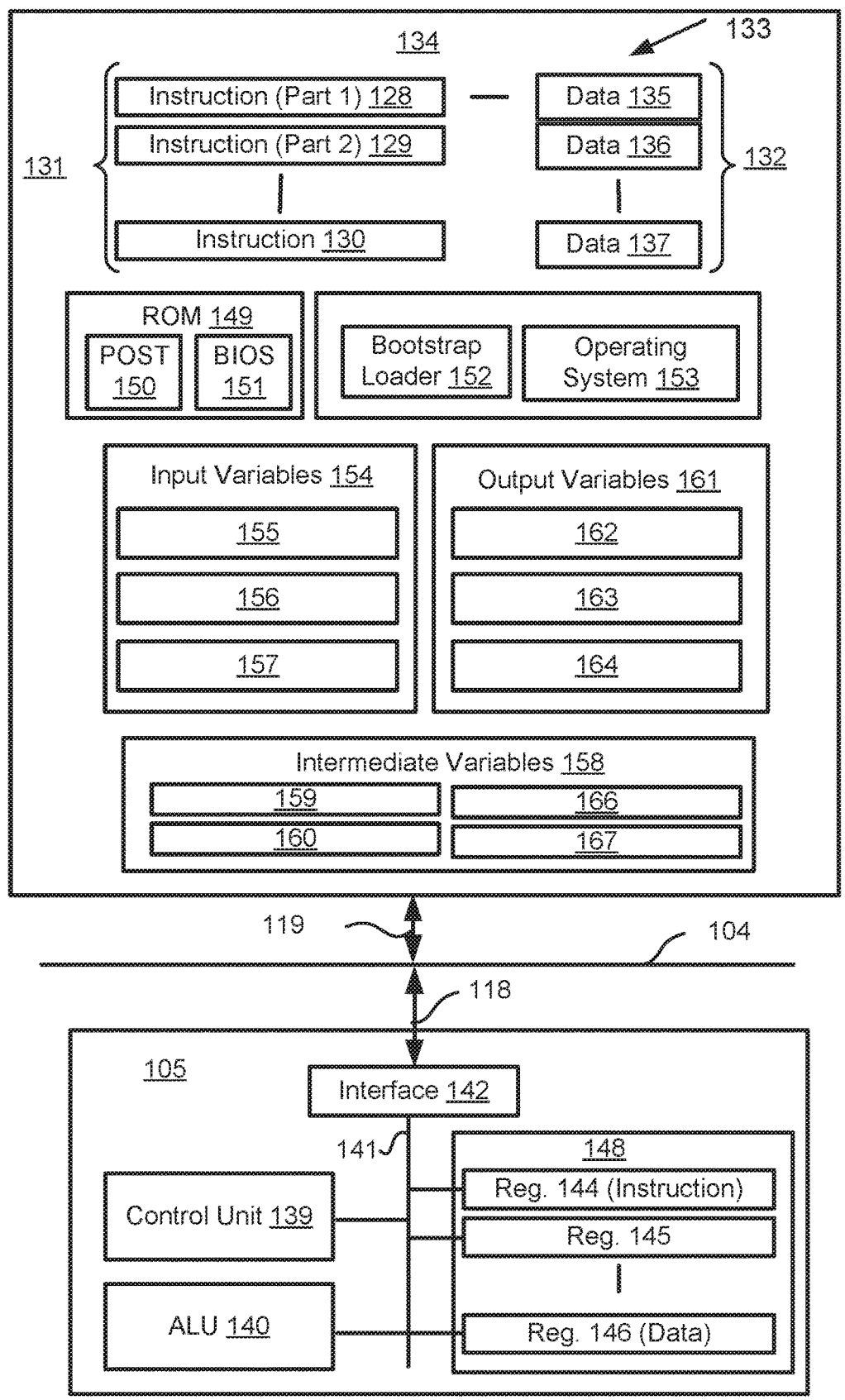

FIGS. 1A and 1B depict a general-purpose computer system 100, upon which the registration method described herein can be implemented.

As seen in FIG. 1A, the computer system 100 includes: a computer module 101; input devices such as a keyboard 102, a mouse pointer device 103, a scanner 126, a camera 127, and a pathology microscope 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone (not shown); an I/O interface 113 that couples to the keyboard 102, mouse 103, scanner 126, camera 127, microscope 180, and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The method of image registration may be implemented using the computer system 100 wherein the processes of FIGS. 2 to 27, to be described, may be implemented as one or more software application programs 133 executable within the computer system 100. In particular, the steps of the method of image registration are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the image registration methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for registering images.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for registering images.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via a microphone.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed image registration arrangements use input variables 154, which are stored in the memory 134 in corresponding memory locations 155, 156, 157. The input variables 154 for the image registration arrangements include image pairs that are to be registered. The image registration arrangements produce output variables 161, which are stored in the memory 134 in corresponding memory locations 162, 163, 164. Intermediate variables 158 may be stored in memory locations 159, 160, 166 and 167. The output variables 161 for the image registration arrangements include registered images.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 27 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of image registration may alternatively be implemented in dedicated hardware such as one or more integrated circuits performing the functions or sub functions of the methods of FIGS. 2 to 27. Such dedicated hardware may include graphic processors, digital signal processors, or one or more microprocessors and associated memories.

Image Registration

The image registration process is a process for mapping common features between a pair of images (i.e., a fixed image and a moving image) that are closely related. Ideally, such a registration process has sub-pixel accuracy, while minimizing the degree of unwanted distortion in the mapping of pixels of the image pair.

The output from the registration process is a displacement field, which includes an array of vectors for mapping pixel positions between the fixed and moving images. Such a vector array may represent either an inverse warp or a forward warp. The vector array for the inverse warp contains vectors, where each vector maps a pixel position in the fixed image to a corresponding pixel position in the moving image. The vector array for the forward warp contains vectors, where each vector maps a pixel position in the moving image to a corresponding pixel position in the fixed image. Hereinafter, the displacement field used to illustrate the registration method of the present disclosure is the inverse warp displacement field. However, the registration method of the present disclosure can also be performed with the forward warp displacement field.

The generated displacement field typically contains the same number of vectors as the number of pixels in the fixed image. However, if the fixed image includes a large number of pixels (e.g., in a high resolution fixed image), a vector in the displacement field may correspond to a number of adjacent pixels in the fixed image, so as to reduce computational requirements and storage. The estimated shift vectors obtained at the lower resolution fixed image can then be interpolated to obtain shift vectors for the higher resolution fixed image using spline interpolation or similar methods.

The registration process commonly operates in two broad stages: rigid estimation and non-rigid estimation.

Rigid estimation generates a global spatial transform representing a gross distortion to approximately register the two input images. Examples of such global spatial transforms are translation, rotation+translation, affine, and the projective transform.

Non-rigid estimation refines the registration obtained during rigid registration. If the misregistration between the fixed image and the moving image warped using the rigid transformation is small (e.g., of the order of one or two pixels) the image registration can be measured directly from the two input images. However, where misregistration is larger, a pyramidal scheme can be used, in which both input images are progressively down-sampled to create multiple lower resolution images from each of the input images. The plurality of lower resolution images are then inserted into two respective lists where each corresponding row in the lists includes corresponding lower resolution images to be aligned (i.e., registered). The lowest-resolution images are placed at the bottom of the pyramid (i.e., at the bottom of the respective lists) and are registered first. The lowest-resolution images are smaller and can thus be registered quickly. Further, features that are displaced by many pixels at the highest resolution are closer in the lowest-resolution images, thereby increasing the likelihood of a successful registration. After the lowest-resolution pair of images in the pyramid is registered, the resulting displacement field is used to provide an initial displacement field for the next-lowest resolution image pair. Thus a succession of displacement fields can be generated with increasing accuracy and smaller displacements. The iteration results in an accurate displacement field for the highest resolution images. If the registration process is terminated before the displacement field for the highest resolution images can be determined, a displacement field for one of the lower resolution image pairs can be generated and interpolated to approximate a displacement field at the highest resolution image pair.

Using the displacement field, the moving image can be warped so as to align its features with those in the fixed image.

The present disclosure describes a method for non-rigid registration which shares advantages with both MI registration methods and GBSE-based registration methods. In particular, a gradient-descent-like technique is used for MI registration which converges to a solution rapidly. The method of the present disclosure can be used to calculate a displacement field using simple, pixel-based operations without requiring a search-based optimization.

These properties are very useful for calculating a non-rigid registration with high accuracy where distortions can be both global and highly local.

Each pixel in an image has a corresponding label and position. The label is effectively a notation, for example an index, which can be used to determine properties associated with a pixel. For example, a pixel may be labelled with a value 5, which is associated with corresponding intensity data in a lookup table. The labels can be used to obtain a mutual information score for a pair of images and/or the displacement field. The position denotes the location of the pixel in an image.

If MI methods are used to register images, the dimensionality of the input data may be reduced by using a clustering method, prior to registration taking place. Such clustering reduces the input data (e.g., the number of possible labels in an image) and, thus, reduces storage requirements, computation time, and reducing the number of histogram entries. Examples of such clustering algorithms are k-means, merge and box, and median cut methods. An alternative method is to quantize all data channels into a smaller number of channels, resulting in a tractable number of distinct labels. For example, if a digital pathology image has 649,678 individual colours, each represented by a 24-bit RGB value, a corresponding quantised image might have 988 individual colours, each represented by a 12-bit RGB value.

The mutual information score I for two related images, with a first image containing a set of pixels associated with a set of labels $A=\{a_i\}$, and a second image containing a set of pixels associated with a set of labels $B=\{b_j\}$, is defined as $$I = \sum_{i,j} P(a_i, b_j) \log_2 \left( \frac{P(a_i, b_j)}{P(a_i)P(b_j)} \right),$$

where $P(a_i,b_j)$ is the joint probability value of the two labels $a_i$ and $b_j$ co-occurring at the same pixel position, and $P(a_i)$ and $P(b_j)$ are the marginal probability distribution values of the respective labels $a_i$ and $b_j$. Further, i is the index of the label a and j is the index of the label b. If the product of the marginal probability values $P(a_i)$ and $P(b_j)$ is zero (0), then such a pixel pair is ignored.

In particular, one-dimensional histogram of labels in each image are used to calculate the marginal probabilities of the labels (i.e., $P(a_i)$ and $P(b_j)$), and a pairwise histogram of co-located labels used to calculate the joint probabilities (i.e., $P(a_i,b_j)$).

According to the present disclosure, a first marginal histogram includes bins indexed by labels of the fixed image; each of the bins represents the number of times a corresponding label occurs in the fixed image. A second marginal histogram includes bins indexed by labels of the moving image with each of the bins representing the number of times a corresponding label occurs in the moving image. The joint (pairwise) histogram includes bins indexed by label pairs of the fixed image and the moving image. Each of the bins of the joint histogram represents the number of times a label in the fixed image is mapped, through a vector in a current displacement field, to a label in the moving image. As described below, Partial Volume Interpolation (PV interpolation) methods can be used to determine the pairwise and one-dimensional histograms.

A PV interpolation technique is a method for calculating a histogram for labels associated with pixels in the image. By using the PV interpolation method, an MI similarity measure for a pair of images incorporating a displacement field can be calculated more efficiently and more accurately without warping the moving image. In the PV interpolation technique, a pairwise histogram is calculated by relating labels (associated with pixels) in the fixed image to labels (associated with pixels) in the moving image through the displacement field. However, an event may occur that a vector in the displacement field does not map a pixel position in a first image to an exact pixel position in the second image. In such an event, multiple histogram bins relating to adjacent pixel positions (to which the vector is pointing) in the moving image are updated with weights dependent on the currently defined shift. The PV interpolation accounts for almost all of the calculation time in an MI registration method. To achieve high quality, known methods use PV interpolation on 4×4 neighbourhood (i.e., area) of pixels. The present disclosure calculates PV weights using a 3×3 neighbourhood of pixels. The present disclosure produces histograms of similar quality at a substantial increase in speed. The method of the present disclosure calculates 9 weights from the 3×3 neighbourhood of pixels, instead of 16 weights from the 4×4 neighbourhood of pixels. The method of the present disclosure is also applicable to three dimensional images, in which 27 weights are calculated from a 3×3×3 area of pixels, or, in one arrangement, 64 weights are calculated from a 4×4×4 area of pixels.

In one implementation, the one-dimensional histogram (representing the marginal probability values) of the pixels in the moving image may be calculated from weighted, mapped pixels. Particularly, the one-dimensional histogram is not simply the histogram of all moving image pixels, but a histogram of a portion of the moving image which overlaps the fixed image. This avoids including information from moving image pixels outside the mapped region, and also normalizes the information content measured from the moving image with respect to the information content of the joint histogram. The weights applied to the one-dimensional histogram in this way preserve the sum-of-squares of the one-dimensional histogram under a small constant shift and thus improve the monotonicity of the MI measure.

Figure 2:
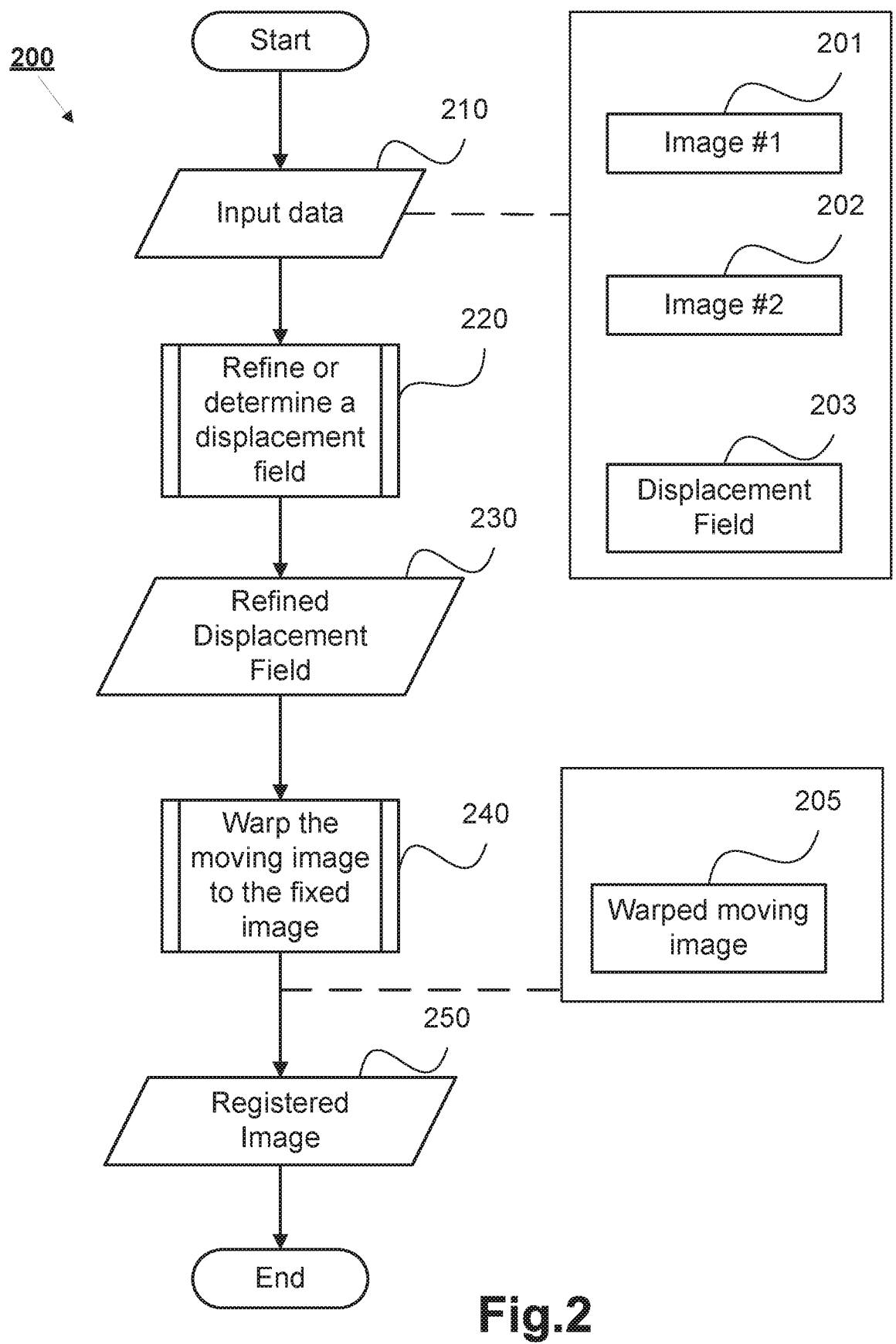
FIG. 2 shows a flow diagram of an image registration method.

FIG. 2 shows a flow diagram of a method 200 of registering a pair of images. The method 200 may be implemented as one or more software application programs 133 that are executed by the processor 105 on the computer system 100.

The method 200 commences at a sub-process 220 to refine (and thereby re-determine) or determine a displacement field relating to a pair of images to be registered.

As shown in FIG. 2, the sub-process 220 receives input data 210, which includes a first image 201, a second image 202, and optionally a displacement field 203. The first image 201 is known in the art as a fixed image, and the second image 202 is known in the art as a moving image. If a displacement field 203 is not included in the input data 210, the displacement field 203 is assumed to be an identity vector array, meaning an identity transformation between the fixed image 201 and the moving image 202. Each of the pixels in the images 201 and 202 is associated with a label, as described hereinbefore.

The images 201 and 202 may be obtained from any one of the scanner 126, the camera 127, the pathology microscope 180, the communications networks 120 or 122, and the disk storage medium 126. As described in relation to FIG. 1B, the images 201 and 202 and the displacement field 203 are stored in the input variables 154. When the images 201 and 202 are obtained, the method 200 may include an additional step of associating pixels of the images 201 and 202 with labels using the clustering method before executing sub-process 220. As described hereinbefore, the clustering method reduces the volume of input data associated with the images 201 and 202.

The sub-process 220 then processes the input images 201 and 202 with reference to the displacement field 203 to generate a refined displacement field 230. The processing of the images 201 and 202 in the sub-process 220 will be further described in relation to FIG. 3.

The method 200 then proceeds from the sub-process 220 to a sub-process 240, in which the moving image 202 is warped to the fixed image 201. The sub-process 240 is optional. The sub-process 240 receives the refined displacement field 230 and warps the moving image 202 to the fixed image 201 using the refined displacement field 230. The result of the warping process is a warped moving image 205, which is registered to the fixed image 201. The sub-process 240 may optionally output a registered image 250, where the input images 201 and 202 are merged. The method 200 then concludes.

Figure 3:
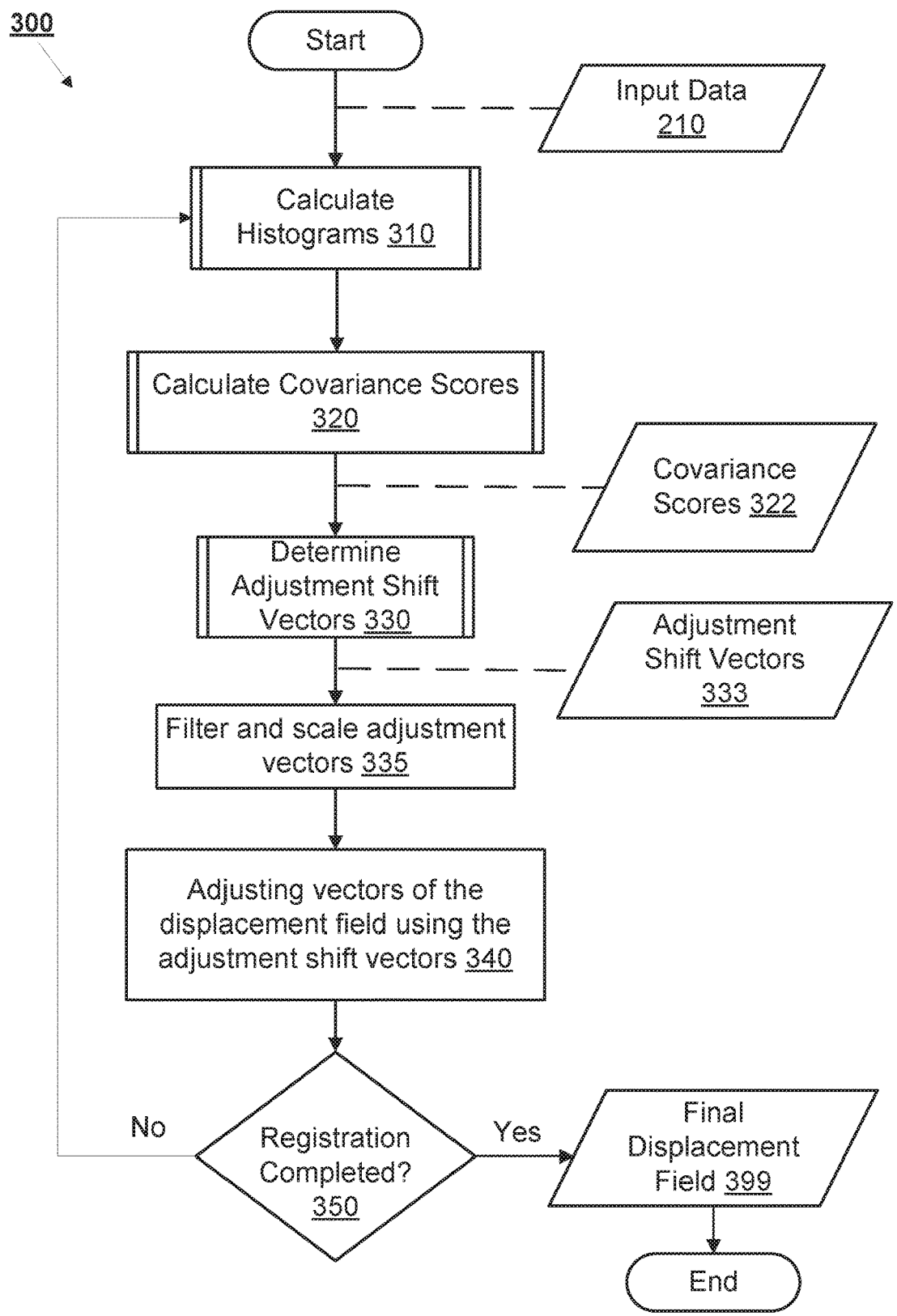
FIG. 3 shows a flowchart of a sub-process of the method shown in FIG. 2 to iteratively refine or determine a displacement field using the Covariance Score Method (CSM)

FIG. 3 shows a method 300 of refining (or re-determining) or determining a displacement field. The method 300 is the method performed in the sub-process 220 of the method 200. The method 300 may be implemented as one or more software application programs 133 that are executed by the processor 105 on the computer system 100.

The method 300 is a method of refining (or re-determining) a displacement field, through iteration, to produce a displacement field of higher accuracy. The method 300 commences at sub-process 310 by calculating histograms of the input data 210. As described in relation to FIG. 2, the input data 210 includes the first image 201, the second image 202, and optionally the displacement field 203. Further, the pixels of the first and second images 201 and 202 are associated with labels, as described above. The sub-process 310 is hereinafter described in detail in relation to FIGS. 4 and 5. The method 300 then proceeds from the sub-process 310 to a sub-process 320.

The sub-process 320 calculates covariance scores associated with labels $a_i$ and $b_j$ of the fixed image 201 and the moving image 202. A covariance score defines a statistical dependence between a label The covariance score is determined by normalizing a probability that labels co-occur with respect to a product of marginal probabilities of the labels such that the covariance score has a value between 0 and 1. Two labels co-occur together if a pixel in the fixed image associated with a first label is mapped, through the initial displacement field, to a pixel in the second image associated with a second label. Calculation of covariance scores will be hereinafter described in more detail in relation to FIGS. 6 and 7. The output of the sub-process 320 is covariance scores 322.

In one arrangement, the covariance scores 322 are calculated in advance, based on the histograms obtained at the sub-process 310, for all pairs of labels for mapped pixels and all the calculated covariance scores 322 are stored in a look-up table indexed by a pair index associated with the pair labels.

In another arrangement, the covariance scores 322 are calculated when the adjustment shift vectors are determined in a sub-process 330 (described immediately below).

The method 300 then proceeds from the sub-process 320 to a sub-process 330.

In the sub-process 330, adjustment shift vectors 333 are determined (which will be hereinafter described in relation to FIGS. 6 to 8) by using the covariance scores 333 and the input data 210. The method 300 then proceeds from the sub-process 330 to step 335.

In step 335, the adjustment shift vectors 333 are filtered and scaled.

The adjustment shift vectors 333 are typically noisy. Therefore, the adjustment shift vectors 333 are filtered using a low-pass filter to supress the noise. Convolution (i.e., filtering) by a Gaussian operator can be performed quickly using Infinite Impulse Response methods, such as the Deriche method applied separably. Suitable noise reduction is achieved with a Gaussian RMS width of between 20 and 40 pixels. Alternatively, adjustment shift vectors 333 can be fitted, for example using a least-squares method, to a rigid transform.

After the filtering process, the true value of the adjustment shift vectors 333 tend to be underestimated. Convergence to a solution can be accelerated by scaling the values of the adjustment shift vectors 333 by a value greater than 1. In one example, a scaling factor I of 10.0 can be initially used.

In some implementations, the method 300 is iterated to achieve an accurate registration (as discussed in step 350 below). If the method 300 is iterated at least twice, a stability of convergence can be estimated from two previously calculated displacement field vectors $\tilde{w}_{p-1}$ and $\tilde{w}_{p-2}$ using the ratio:

$$S = \frac{|\tilde{w}_{p-1} - \tilde{w}_{p-2}|}{|\tilde{w}_{p-1} + \tilde{w}_{p-2}|}$$

$\tilde{w}_p$ is a vector representing all individual vectors in the displacement field 203 calculated during current iteration p, $\tilde{w}_{p-1}$ and $\tilde{w}_{p-2}$ are vectors representing the two previously calculated displacement fields. For example, let (x0, y0), (x1, y1), (x2, y2) be shift vectors in the displacement field 203 determined at three grid points of the images. In some implementations, to generate a displacement field vector $\tilde{w}$, the shift vectors (x0, y0), (x1, y1), (x2, y2) are combined starting from the top left corner of the image displacement field 203 to produce a direction vector $\tilde{w}$ having coordinates (x0,y0,x1,y1,x2,y2). In another implementation, the shift vectors are combined on a coordinate basis to form a direction vector $\tilde{w}$ having coordinates (x0,x1,x2,y0,y1,y2). Regardless of a particular pattern chosen to combine the shift vectors, the same pattern should be maintained to concatenate vectors $\tilde{w}_{p-1}$ and $\tilde{w}_{p-2}$ in the previously determined displacement fields.

Where convergence is proceeding smoothly S will be smaller than if convergence is proceeding jerkily (i.e., oscillatory). As such, if S<0.125 the scaling factor for the current iteration p is increased by a factor of 1.5 (I←1.5×1). If, however, S>0.125 then the scaling factor I is decreased by a factor of 1.5, (I←I/1.5). By scaling the adjustment shift vectors in this manner based on the stability of convergence, convergence to a solution can be achieved faster.

Step 335 is an optional step to improve the adjustment shift vectors 333.

The method 300 proceeds from step 335 to step 340.

In step 340, the adjustment shift vectors 333 are combined with corresponding vectors of the displacement field 203 (which will be described in relation to FIGS. 6 to 8) to produce a refined (or improved) displacement field 230. That is, the vectors of the displacement field 203 are adjusted using the adjustment shift vectors 333. The method 300 then proceeds from step 340 to step 350.

In step 350, the method 300 determines whether the registration is completed based upon an estimate of convergence. Examples of suitable convergence completion tests are a predefined maximum iteration number, or a predefined threshold value which halts the iteration when the predefined threshold value is larger than an RMS magnitude of the adjustment shift vectors 333. An example threshold value is 0.001 pixels. In some implementations, the predefined maximum iteration number is set to 1, i.e. the method 300 is performed only once. In majority of cases, however, to achieve accurate registration, the maximum iteration number is set to at least 10. For smaller images (e.g. 64×64 pixels) the maximum iteration number can be set to 100.

If the registration is not completed (NO), then the method 300 returns to the sub-process 310. If the test for convergence is met (YES), then the method 300 concludes and outputs a final displacement field 399, which is also the output of the sub-process 220 of the method 200.

Figure 4:
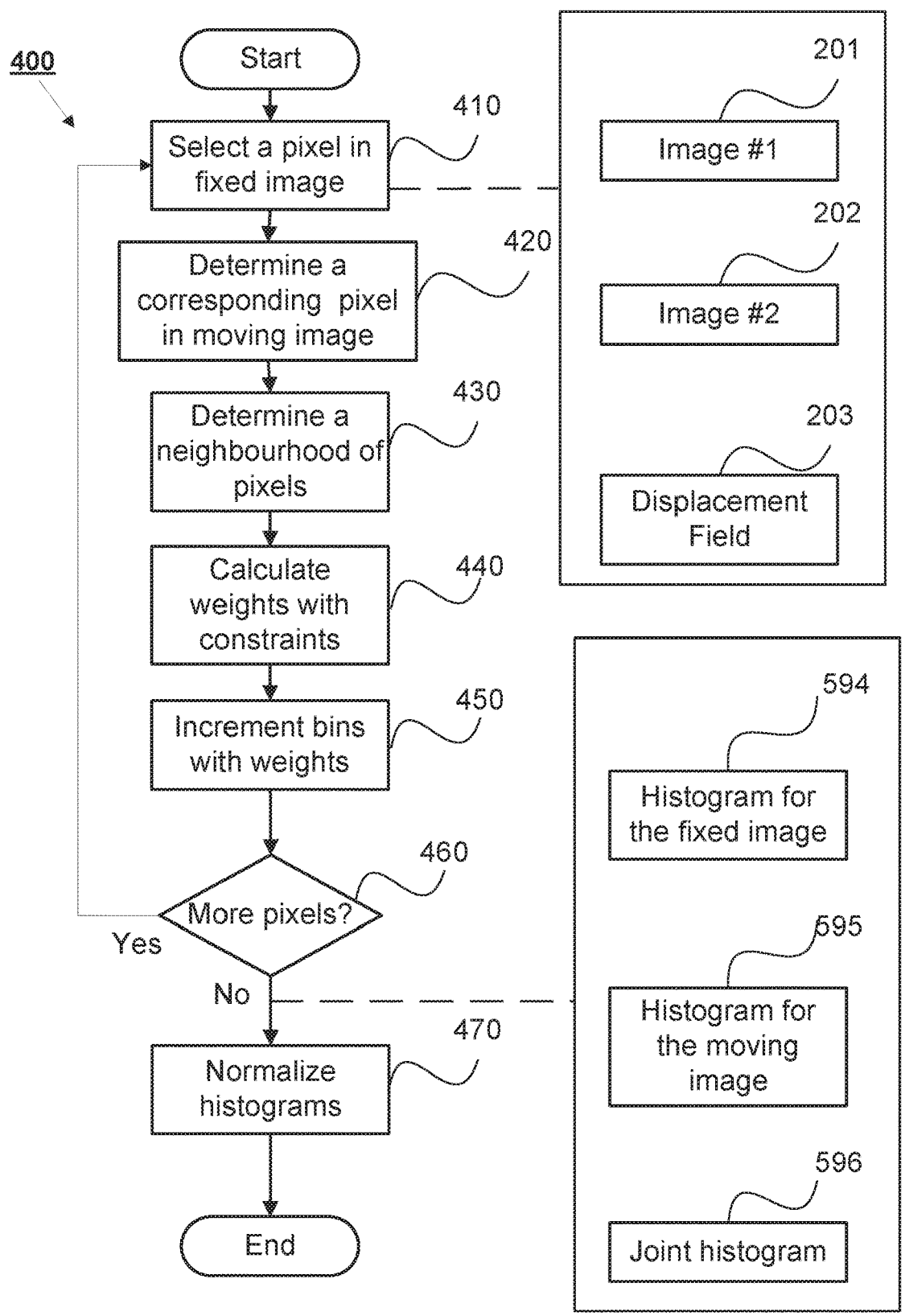
FIG. 4 shows a flowchart of a sub-process of the method shown in FIG. 3 to calculate histograms associated with two input images related by a displacement field.

FIG. 4 shows a flowchart of a method 400 for calculating histograms. The method 400 is the method performed in the sub-process 310 of the method 300. The method 400 may be implemented as one or more software application programs 133 that are executed by the processor 105 on the computer system 100.

Inputs to the method 400 are the fixed image 201, the moving image 202, and the displacement field 203, as described in relation to the sub-process 310 of the method 300 above. The method 400 starts at step 410 where a pixel from the fixed image 201 is selected. The method 400 then proceeds from step 410 to step 420.

In step 420, a pixel in the moving image 202 is determined using a corresponding vector in the displacement field 203. The pixel selected in step 410 and the vector point to the pixel in the moving image 202.

The pixel in the first image 201 is mapped from a coordinate system of the first image 201 to a coordinate system of the second image 202. The coordinate system of the second image 202 is also referred to as an alignment coordinate system. The alignment coordinate system may be further related to a joint histogram 596 of labels of the fixed image 201 and the moving image 202. The method 400 then proceeds from step 420 to step 430.

In step 430, a neighbourhood of pixels is determined. The neighbourhood of pixels is the pixels neighbouring the pixel of the moving image 202 determined in step 420. Typically, eight pixels surrounding the pixel determined in step 420, and including the pixel determined in step 420, are determined to form the neighbourhood of pixels. The method 400 then proceeds from step 430 to step 440.

In step 440, weights with constraints are calculated for updating bins in the histograms. Using the sub-pixel shift part of the displacement vector, i.e. for a position vector v=(x,y), the sub-pixel part v' of this vector is v'=(x-⌊x+0.5⌋, y-⌊y+0.5⌋), PV weights are calculated for the nine pixels in the neighbourhood of pixels determined in step 420.

The nine pixels correspond to a 3×3 set of interpolation filter (or weights) used for PV interpolation. The 3×3 set of weights is calculated separably using 3 weights each for a shift in the x and y directions. The values of the weights are determined by assuming three constraints, which are sum, centroid, and norm constraints (described below). The three constraints define the values of the PV weighting function.

The sum constraint of the weighting function values is constant and equals to 1.0. The centroid constraint of the weighting function is equal to the sub-pixel shift. The norm constraint of the sum-of-squares of the weighting values is the constant value 0.5. The sum-of-squares (i.e., norm) constraint produces excellent phase linearity, substantially removes bias in the MI calculation, produces symmetric kernels with shifts within [−0.5 to 0.5], and results in a MI value increasing monotonically with shift to a maximum value close to the true shift position.

These constraints for a sub-pixel shift s, where −0.5≤s≤0.5, are stated as follows:

$$\begin{bmatrix} w_1 + w_2 + w_3 = 1 & \text{(sum)} \\ w_3 - w_1 = s & \text{(centroid)} \\ w_1^2 + w_2^2 + w_3^2 = 0.5 & \text{(norm)} \end{bmatrix}$$

The single solution for positive weights with these constraints is:

$$\begin{bmatrix} \text{let } r = \frac{(2-3s) - \sqrt{1-3s^2}}{6} \\ w_1(s) = r \\ w_2(s) = 1 - s - 2r \\ w_3(s) = s + r \end{bmatrix}$$

A quadratic function giving an accurate approximation of this solution is:

$$\begin{bmatrix} w_1(s) = \dfrac{(s-1)(2s-1)}{6} \\ w_2(s) = \dfrac{2}{3}(1-s^2) \\ w_3(s) = \dfrac{(s+1)(2s+1)}{6} \end{bmatrix} \quad [1]$$

Because approximation is used in equation [1], certain shifts may be about the constant value of 0.5. For a range of shift between −0.5 to 0.5, the sum-of-squares may oscillate around the constant value of 0.5. The amount of oscillation is about 5%.

Some examples of weights from these equations are: for s=−0.5, $(w_0, w_1, w_2)=(0.5,0.5,0.0)$; for $$s = 0.0 \ (w_0, w_1, w_2) = \left(\dfrac{1}{6}, \dfrac{2}{3}, \dfrac{1}{6}\right);$$

and for s=+0.5, $(w_0, w_1, w_2)=(0.0,0.5,0.5)$. Note that these weights do not form an interpolation kernel, but an approximation kernel.

The method 400 then proceeds from step 440 to step 450, where these weights are used to increment the associated bins in the histograms. For example, if weight $w_{i,j}$ was determined for a pixel position (i,j) in the window 513, a bin for a corresponding label at the pixel position (i,j) in the window 513 is incremented by $w_{i,j}$. The weights are also used to increment pixel count N. Each of the bins in the histograms relates to a label in each of the images 201 and 202. The incrementing of the bins then generates the histograms (i.e., the joint histograms 596 and the one-dimensional histograms 594 and 595, as shown in FIG. 5B).

The number of entries in the joint histogram 596 is the product of the number of associated labels in both the fixed and moving images 201 and 202, as some labels are ignored because they are not mapped. It is common for the number of labels to be smaller than the number of pixels in the images 201 and 202.

The method 400 then proceeds from step 450 to step 460.

In step 460, it is determined whether more pixels remain to be processed. If there are more pixels to be processed (YES), then the method 400 returns to step 410 so the remaining pixels can be processed. If all pixels have been processed (NO), then the method 400 proceeds to step 470.

Due to the iterative process of steps 410 to 460, pixels in the first image 201 are mapped from a coordinate system of the first image 201 to a coordinate system of the second image 202 in an inverse warp displacement. On the other hand, in a forward warp displacement, pixels in the second image 202 are mapped from a coordinate system of the second image 202 to a coordinate system of the first image 201. In the inverse warp displacement, the coordinate system of the second image 202 is known as an alignment coordinate system. In the forward warp displacement, the coordinate system of the first image 201 is known as an alignment coordinate system.

In step 470, the histograms are normalized into probability estimates by dividing all bins by the pixel count N.

Outputs from step 470 are normalized one-dimensional histograms for the fixed image 201 and the moving image 202, and the joint histogram for the images 201 and 202. Although the method 400 has been described only in relation to two dimensional images 201 and 202, the method 400 can be modified to calculate histograms for volumetric images using three-dimensional mappings and three-dimensional neighbourhood of pixels.

There are various other techniques in use to generate the histograms, for example which have different weights for the PV interpolation weighting, or which use Parzen windows. The method 400 as described above, however, is relatively efficient and produces accurate results.

From the probability histograms, accuracy of a displacement field for high-resolution images can be estimated using a mutual information score can be determined using $$I = \sum_{i,j} P(a_i, b_j) \log_2\left(\dfrac{P(a_i, b_j)}{P(a_i)P(b_j)}\right).$$

A correction for an existing displacement field can be estimated from the probability histograms. As such, the pairs of labels in the joint histogram 596 and labels of the moving image 202 represent bins which are updated through mapping from the coordinate system of the fixed image to the alignment coordinate system.

For example, as described hereinafter in relation to FIGS. 6 to 8, 9 covariance scores (described above in relation to the sub-process 320 of the method 300) can be calculated for each pixel of the images 201 and 202 using the normalised histograms. Computation time for generating a displacement field using covariance scores can be reduced by pre-computing covariance scores for all associated label pairs and storing the covariance scores in a table indexed by the label pairs. For example, for images containing 256 labels (which may be associated to more than 256 pixels), a table of covariance scores contains 65,536 entries, which is approximately the same number of covariance scores used in an image containing 80×80 pixels.

Figure 5A:
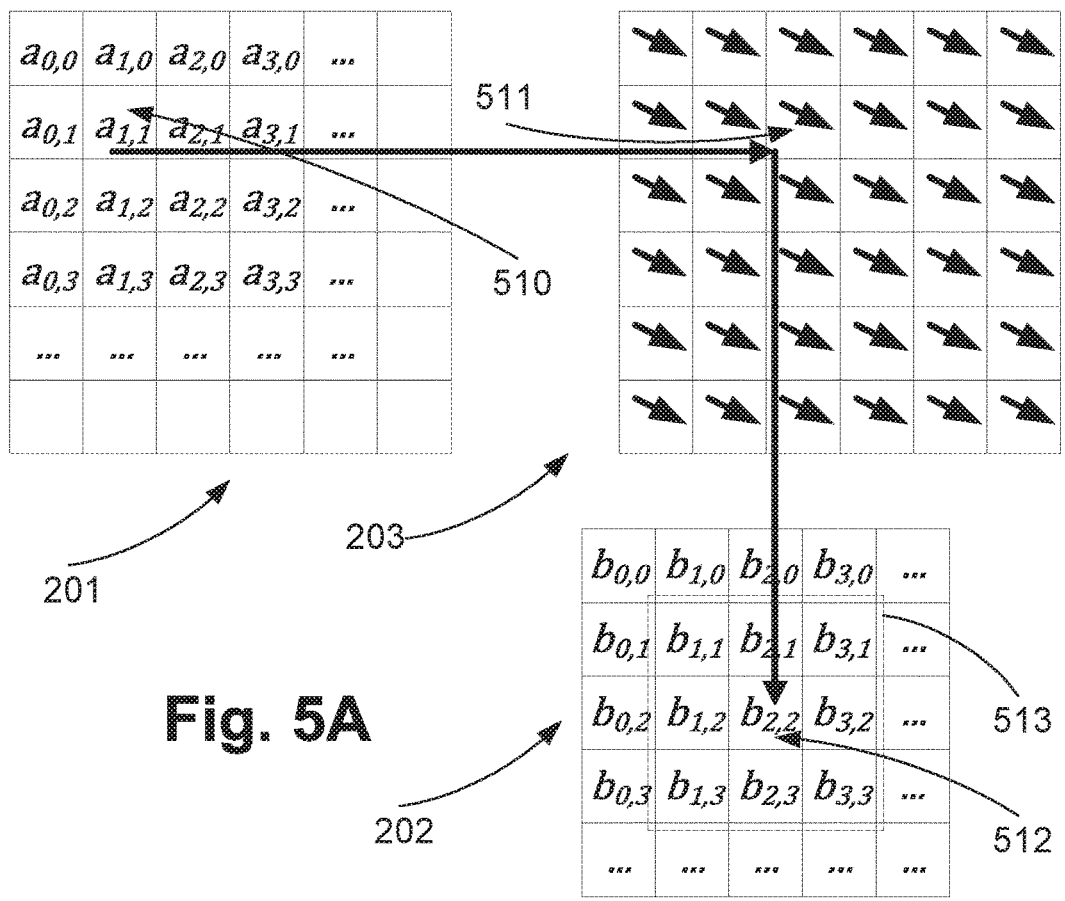
FIGS. 5A and 5B show block diagrams representing the images and associated histograms, respectively, when performing the method shown in FIG. 4.
Figure 5B:
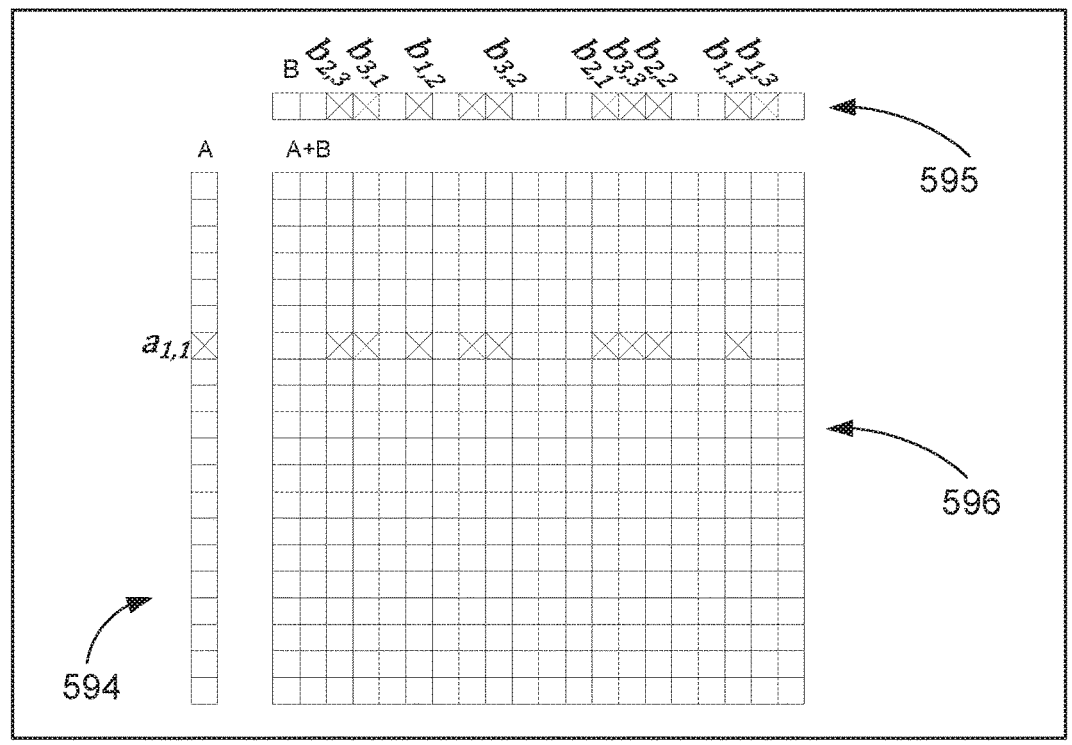

FIG. 5A shows block diagrams of images as the method 400 is performed. In particular, the updating of the MI histograms for a single pixel is shown.

As described in relation to FIG. 4 above, the inputs to the method 400 are the fixed image 201, the moving image 202, and the displacement field 203. The moving image 202 does not need to be the same size as the fixed image 201. As described earlier, the fixed and moving images 201 and 202 contain labels, associated with pixels of the images 201 and 202. The displacement field 203 contains floating-point vectors relating pixel positions in the fixed image 201 to pixel positions in the moving image 202. If the forward warp displacement field is used, then the displacement field 203 would contain floating-point vectors relating pixel positions in the moving image 202 to pixel positions in the fixed image 201.

By following the steps 410 to 450, the result is a histogram 594 of marginal probability values of pixels in the fixed image 201, a histogram 595 of marginal probability values of pixels in the moving image 202, a joint histogram 596 of joint probability values of related label pairs in the fixed image 201 and the moving image 202. Further, a sum of weights is also obtained to be used for normalization of the histograms 594, 595, and 596 to convert pixel counts to probabilities.

The histogram 594 includes bins indexed by labels of the first image 201. Each of the bins of the histogram 594 represents the number of times each label occurs in the first image 201.

The histogram 595 includes bins indexed by labels of the second image 202. Each of the bins of the histogram 595 represents the number of times each label occurs in the second image 202.

The joint histogram 596 includes bins indexed by label pairs of the first image 201 and the second image 202. Each of the bins of the joint histogram 596 represents the number of times a label in the first image 201 is mapped, through a vector in the displacement field 203, to a label in the second image 202. The marginal histogram 595 and joint histogram 596 are determined using the PV interpolation technique with a 3×3 approximation kernel, as described above. Also, as described above, the joint histogram 596 and the marginal histograms 595 are used to align the fixed image 201 and the moving image 202. As such, pairs of labels and labels of the moving image 202 represent bins which are updated through mapping from the coordinate system of the fixed image 201 to the alignment coordinate system (coordinate system of the moving image 202) in case of an inverse warp displacement.

As described in step 410, a pixel position (1, 1) is selected from the fixed image 201. As shown in FIG. 5A, the pixel at position (1, 1) is associated with the label $a_{1,1}$. In the subsequent step 420, a vector 511 in the displacement field 203 for the pixel at position (1, 1) is used to determine a floating-point position (x,y) in the moving image 202. The position (x,y) is then rounded to the nearest pixel 512 with integer coordinates (X,Y) by rounding the floating-point values (x,y) with a common method, $X=\lfloor x+0.5 \rfloor$, $Y=\lfloor y+0.5 \rfloor$. As shown in FIG. 5A, the nearest pixel 512 is associated with the label $b_{2,2}$. Hence, step 420 determines a corresponding pixel position 512 in the moving image 202 by using both the vector 511 in the displacement field 203 and the corresponding pixel position 510 in the fixed image 201.

In the step 430, a 3×3 neighbourhood of pixels 513 is determined. The neighbourhood of pixels 513 contains the pixel 512 and 8 neighbouring pixels. The pixel 512 is associated with the label $b_{2,2}$ and the 8 neighbouring pixels are associated with the labels ($b_{1,1}$, $b_{2,1}$ ... $b_{3,3}$). If the central pixel 512 or any of the neighbouring pixels extend outside the boundary of the moving image 202, the pixels can be estimated by mirroring or by extension of the final value. However, the preferred method is to drop pixels which map outside the moving image 202 from consideration. By dropping such pixels from consideration, the histograms are left unchanged.

In step 440, PV weights ($w_{1,1}$ ... $w_{3,3}$) are calculated for each label pair (($a_{1,1},b_{1,1}$) ... ($a_{1,1},b_{3,3}$))). The weights are calculated using, for example, equation [1], where $s_x$ and $s_y$ are the fractional shifts in the x and y directions: $s_x=x-X$, $s_y=y-Y$, $-0.5 \le s_x < 0.5$ and $-0.5 \le s_y < 0.5$. The fractional shifts $s_x$ and $s_y$ provide a sub-pixel shift value corresponding to a shift from an integer pixel coordinate X or Y respectively.

In step 450, the three histograms 594, 595, and 596 are updated using the weights calculated in step 440. The bins in the histogram 594 (see FIG. 5B) for labels $A=\{a_{1,1}\}$ in the fixed image 201 are incremented by the operation $H_A(a_{1,1}) \leftarrow H_A(a_{1,1})+1$. The bins in the histogram 595 (see FIG. 5B) for labels $B=\{b_{i,j}\}$ in the moving image 202 are incremented by the operation $H_B(b_{i,j}) \leftarrow H_B(b_{i,j})+w_{i,j}$ (for (i,j) of $\{(1,1) \ldots (3,3)\}$), where (i,j) refers to a position in the window 513, $b_{i,j}$ is a label assigned to the pixel position (i,j) in the window 513 and $w_{i,j}$ is a weight determined for the pixel position (i,j) in the window 513. The bins in the joint histogram 596 (see FIG. 5B) are incremented by the operation $H_{AB}(a_{1,1}, b_{i,j}) \leftarrow H_{AB}(a_{1,1},b_{i,j})+w_{i,j}$ (for (i,j) of $\{(1,1) \ldots (3,3)\}$). Finally, the total pixel count N is updated by the operation $N \leftarrow N+1$.

The above process is repeated for all pixels in the fixed image 201, as described in step 460 of the method 400. Once it is determined that all the pixels in the fixed image 201 have been processed, the method 400 proceeds to step 470.

In step 470, each value in the one-dimensional histogram 594 for the first image 201 can be converted from pixel counts to a probability. Such a conversion occurs by normalizing using the pixel count which is defined by the operation $$H(a_i) \leftarrow \frac{H(a_i)}{N}, P(a_i) = H(a_i).$$

Similarly, the second one-dimensional histogram 595 and the joint histogram 596 are normalized by dividing the counts in the respective bins by the pixel count N.

The method 400 then concludes.

Figure 6:
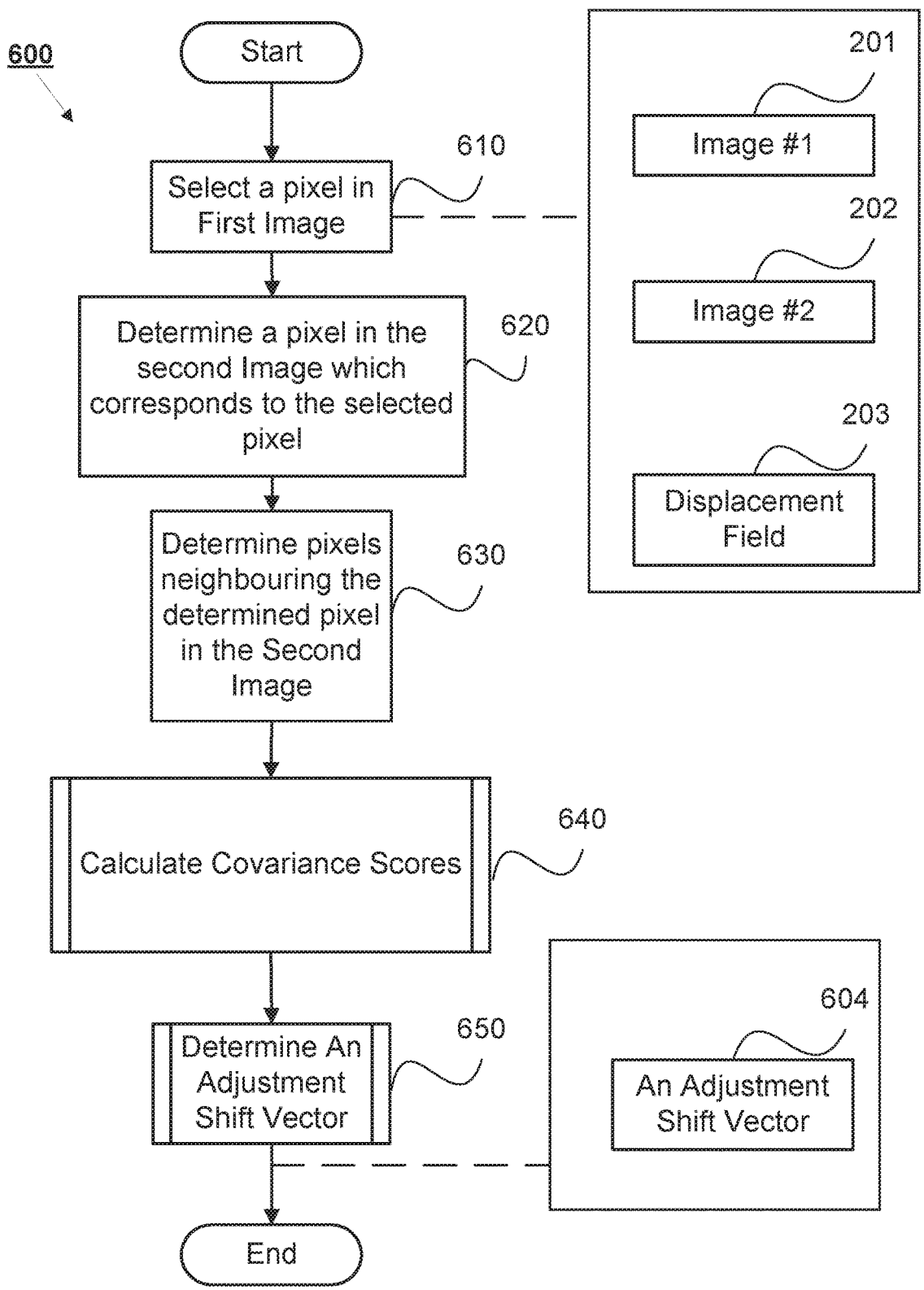
FIG. 6 shows a flowchart of a sub-process of the method shown in FIG. 3 to calculate an adjustment vector for a single position using the CSM.

FIG. 6 is a flow diagram of a method 600 for calculating an adjustment vector for a single pixel position using the CSM. The method 600 is the method performed for the sub-processes 320 and 330 in the method 300. The method 600 may be implemented as one or more software application programs 133 that are executed by the processor 105 on the computer system 100.

The method 600 receives the input data 210 which includes two images, 201 and 202, and a displacement field 203 containing a vector array pointing from pixel positions in the first image 201 to corresponding pixel positions in the second image 202.

The method 600 commences at step 610 where a pixel is selected from the first input image 201 (i.e., the fixed image). The method 600 then proceeds from step 610 to step 620.

In step 620, a pixel in the second image 202 that corresponds to the selected pixel in step 610 is determined. The pixel in the second image 202 is determined by using a vector in the displacement field 203. The vector refers the selected pixel to a pixel position in the second image 202, similar to step 420 above. The pixel position is then rounded to the nearest pixel in the second input image 202 (i.e., the moving image). The method 600 then proceeds from step 620 to step 630.

In step 630, pixels neighbouring the pixel of the second image 202 (determined in step 620) are determined. The neighbouring pixels and the pixel determined in step 620 then form a neighbourhood of pixels. The step 630 is similar to the step 430 above. The method 600 then proceeds from step 630 to sub-process 640.

In the sub-process 640, covariance scores are calculated between a label of the selected pixel of the first image 201 and each of the labels of the neighbourhood of pixels (determined in step 630).

The covariance score provides a score characterising a statistical dependence between two labels based on statistics or probability of a label relating to the selected pixel in the first image 201 (determined in step 610) being mapped to a label of a pixel in the second image 202 through a current displacement field. In other words, the covariance score provides a statistical dependence between a label of the selected pixel in the first image 201 (determined in step 610) and a label of a pixel in the neighbourhood of pixels (determined in step 630) given a current displacement field.

The covariance score ($C_{i,j}$) for labels ($a_i, b_j$) is calculated from the probability estimates (i.e., the outputs of step 470) between two images 201 and 202. As described in relation to step 470, the probability estimates are calculated using the determined marginal and joint histograms 594, 595, and 596. The equation to calculate covariance scores is as follows:

$$C_{i,j} = \frac{P(a_i, b_j)}{P(a_i, b_j) + P(a_i) \times P(b_j) + \varepsilon}$$

where $P(a_i, b_j)$ is the joint probability estimate based on the joint histogram 596, $P(a_i)$ is the probability estimate based on the histogram 594, and $P(b_j)$ is the probability estimate based on the histogram 595. $\varepsilon$ is a regularization term to prevent a division-by-zero error, and can be an extremely small value.

The covariance score has a value between 0 and 1. The covariance score $C_{i,j}$ takes on values similar to a probability where $C_{i,j}$ approaches 0 as the two labels appear in both image, however, rarely co-occur, i.e. $P(a_i, b_j) \ll P(a_i) \times P(b_j)$, $C_{i,j}$ is 0.5 where the two labels are statistically independent, i.e. $P(a_i, b_j) = P(a_i) \times P(b_j)$, and $C_{i,j}$ approaches 1.0 as the two labels co-occur more often than not, i.e. $P(a_i, b_j) \gg P(a_i) \times P(b_j)$.

Note that the denominator of the covariance score equation is zero only where the numerator is also zero, therefore a small value of £ will never influence the value of $C_{i,j}$ except where the denominator is close to zero. The covariance score is also non-negative. Therefore, the covariance score for positively correlated labels exceeds the covariance score for statistically independent labels and the covariance score of negatively correlated labels.

As discussed above in relation to step 320 of the method 300, the covariance scores can be either calculated in advance for corresponding pairs of pixels and the pre-calculated covariance scores stored in a table; or calculated for each label pair in real time when the covariance score is needed. A numeric value for the covariance score provides a scoring of how well each label pair matches, according to the statistical model of their relationship embodied in the probability estimates.

A covariance score $C_0$ is therefore calculated for mapping the selected pixel in the fixed image 201 (determined in step 610) to the corresponding pixel in the moving image 202 (determined in step 620). Covariance scores are also calculated for the selected pixel in the first image 201 and each pixel in the neighbourhood of pixels (determined in step 630) in the moving image 202, giving respective covariance scores $C_1, C_2, \ldots$. If any of the covariance scores $C_1, C_2, \ldots$ is larger than the covariance score $C_0$, then it is likely that the displacement field 203 for the selected pixel is incorrect, and that the selected pixel is more likely to be mapped to one of the neighbouring pixels with the higher covariance score (e.g., $C_1, C_2, \ldots$).

The method 600 then proceeds from the sub-process 640 to a sub-process 650.

In the sub-process 650, an adjustment shift vector for the selected pixel is determined. One method for determining the adjustment shift vector is by calculating a sum of the candidate shift vectors associated with each of the neighbourhood of pixels, as each of the candidate shift vectors is weighted by the corresponding covariance score. Alternatively, the adjustment shift vector is determined to be the candidate shift vector of the pixel with the highest covariance score, as that candidate shift vector is weighted by the corresponding covariance score. The determination of the adjustment shift vector and the candidate shift vectors will be described further in relation to FIGS. 7 and 8.

The determined adjustment shift vector is then used to update the displacement field 203.

The method 600 concludes at the completion of the sub-process 650. When the method 600 concludes (which also means the conclusion of the sub-processes 320 and 330), the method 300 continues to step 335, which is described above.

Figure 7:
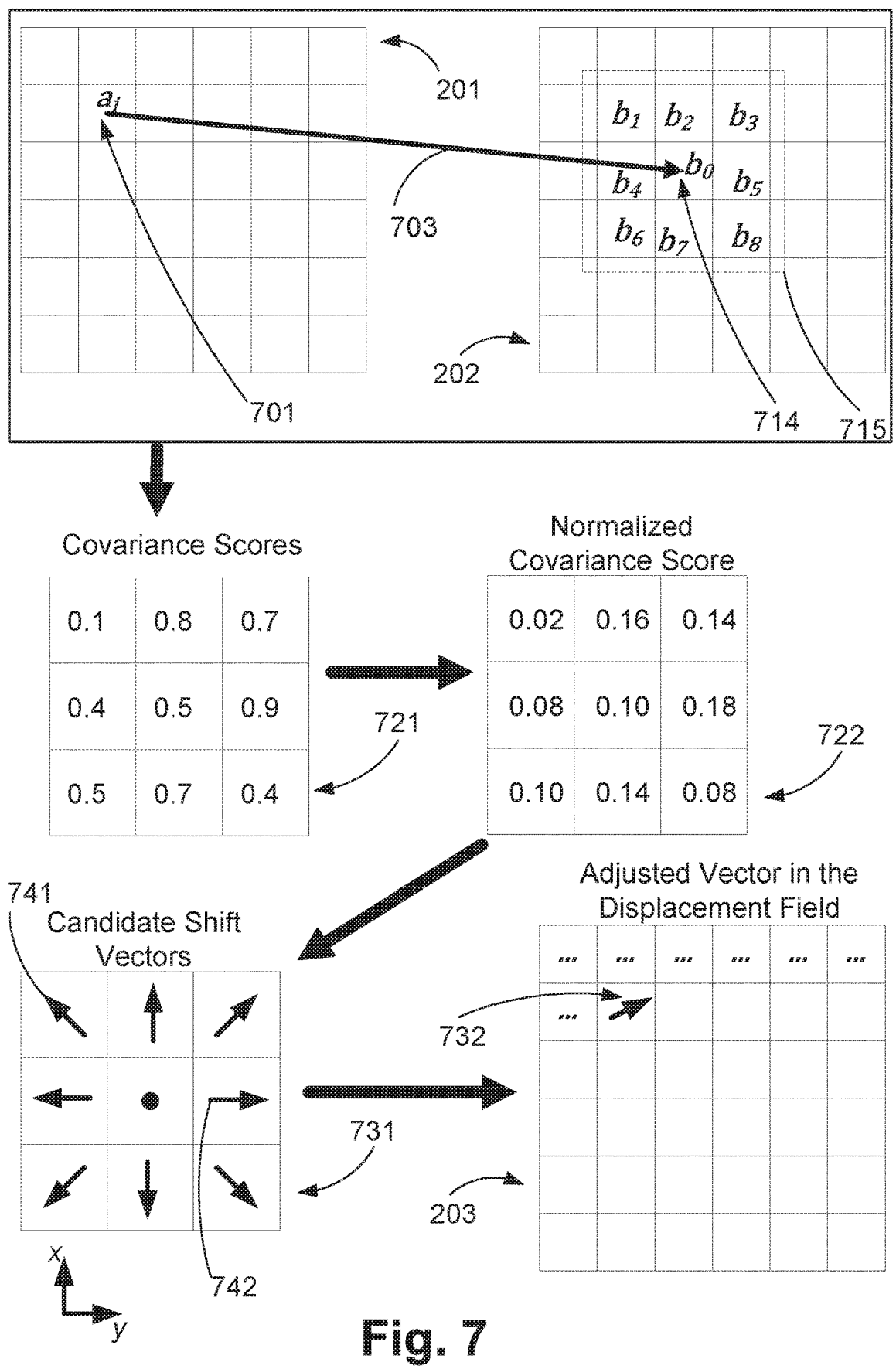
FIG. 7 shows block diagrams of the images in the calculation of an adjustment shift vector using the covariance score as shown in the method of FIG. 6.

FIG. 7 shows block diagrams of images 201 and 202 as the method 600 is performed. FIG. 7 also shows how covariance scores are used to calculate an adjustment shift vector for a single pixel (i.e., an integer pixel coordinate) in the fixed image 201.

As discussed above, the input to the method 600 is the fixed image 201, the displacement field 203 (not shown in FIG. 7), which is identical in size to the fixed image 201, and the moving image 203. As described above, the method 600 at step 610 selects a pixel position 701 (associated with the label $a_i$) in the fixed image 201.

In step 620, a vector 703 (in the displacement field 203) corresponding to the selected pixel 701 maps the selected pixel 701 to a pixel position in the moving image 202. The pixel 714 (associated with the label $b_0$) in the second image 202 is then determined by rounding the mapped pixel position to the nearest pixel. It should be noted that mapping determined by the vector 703 is schematically shown in FIG. 7 and does not represent the actual vector 703, which is a vector pointing from coordinates (2, 2) in the fixed image 201 to coordinates (3, 3) in the moving image 202.

In step 630, pixels (respectively associated with the labels $b_1, b_2, \ldots b_8$) neighbouring the pixel 714 are determined. As shown in FIG. 7, the pixel 714 and the neighbouring pixels form a neighbourhood of nine pixels 715.

In step 640, a covariance score is calculated for the pixel 701 (which is associated with a label $a_i$) and each of the pixels 715 (which are associated with the labels $b_0, b_1, b_2, \ldots b_8$). Therefore, covariance scores $C_0, C_1, C_2, \ldots, C_8$ (721) are obtained respectively for each label pair $(a_i, b_0), (a_i, b_1) \ldots (a_i, b_8)$. The covariance scores 721 is a 3×3 matrix of covariance scores. The 3×3 matrix of covariance scores 721 is then normalized so as to sum to 1.0, resulting in a 3×3 matrix of normalized covariance scores 722.

In the sub-process 650, the normalized covariance scores 722 are multiplied by candidate shift vectors 731. The candidate shift vectors 731 are as shown in FIG. 7, where the vector at the centre is a zero vector and vectors neighbouring the centre vector point away from the centre. Each of the candidate shift vectors 731 is associated with the corresponding pixels 715, such that the pixel 714 associated with the label $b_0$ is associated with the centre vector and the neighbouring pixels are associated with the neighbouring vectors. Thus, each of the pixels associated with respective labels $b_1, b_2, \ldots b_8$ is associated with a candidate shift vector pointing away from the centre towards the center of a corresponding associated pixel. For example, the pixel associated with the label $b_1$ is associated with a vector 741 with a length of 1 pointing towards −1 and −1 in the respective x and y directions.

In one arrangement, the candidate shift vectors (731) are multiplied with the corresponding normalized covariance scores (722) and summed to produce an adjustment shift vector (which is a weighted sum of all the candidate adjustment shift vectors). The adjustment shift vector is a local estimate of shift for the pixel 701, which provides a local adjustment to the vector 703 resulting in a vector 732 for the displacement field 203. That is, the vector 732 is a combination of the adjustment shift vector with the vector 703, as performed in step 340 in the method 300.

Alternatively, the adjustment shift vector is obtained by selecting one of the candidate shift vectors 731 with the highest covariance score. The selected candidate shift vector is then weighted with the corresponding normalized highest covariance score. In the example shown in FIG. 7, the candidate shift vector 742 has the highest covariance score. Therefore, the candidate shift vector 742 is multiplied with the normalized covariance score of 0.18 to obtain the adjustment shift vector. The adjustment shift vector is then combined with the vector 703 to obtain the vector 732, as performed in step 340 in the method 300.

The method 600 uses pixel-local operations relative to a pixel position 701 in the fixed image 201 and a mapped pixel position 714 in the moving image 202. Thus, the adjustment shift vector (determined in the method 600) can be determined in parallel. Further, the adjustment shift vector can be determined asynchronously. That is, an adjustment shift vector for a pixel other than the pixel 701 can be determined in parallel and asynchronously. For example, in a multi-threaded application, the fixed image 201 may be subdivided into t tiles which are further assigned to individual threads, with each thread calculating local estimates of adjustment shift vectors for all of the pixels in its assigned tile. Neglecting cache collisions and memory bandwidth issues, the parallel and asynchronous approach can provide a speedup approaching t for performing the method 600. Alternatively, such a speedup can be achieved by using a GPU, so long as the histograms, the fixed-image tiles, and a bounded rectangle of pixels in the moving image be made available to each processing element in local storage.

The sub-process 650 for determining an adjustment shift vector as shown in FIG. 7 accounts for sub-pixel shift in the generation of the histograms 594, 595, and 596. However, the sub-process 650 shown in FIG. 7 does not account for the sub-pixel shift when estimating the adjustment shift vector using CSM.

Figure 8:
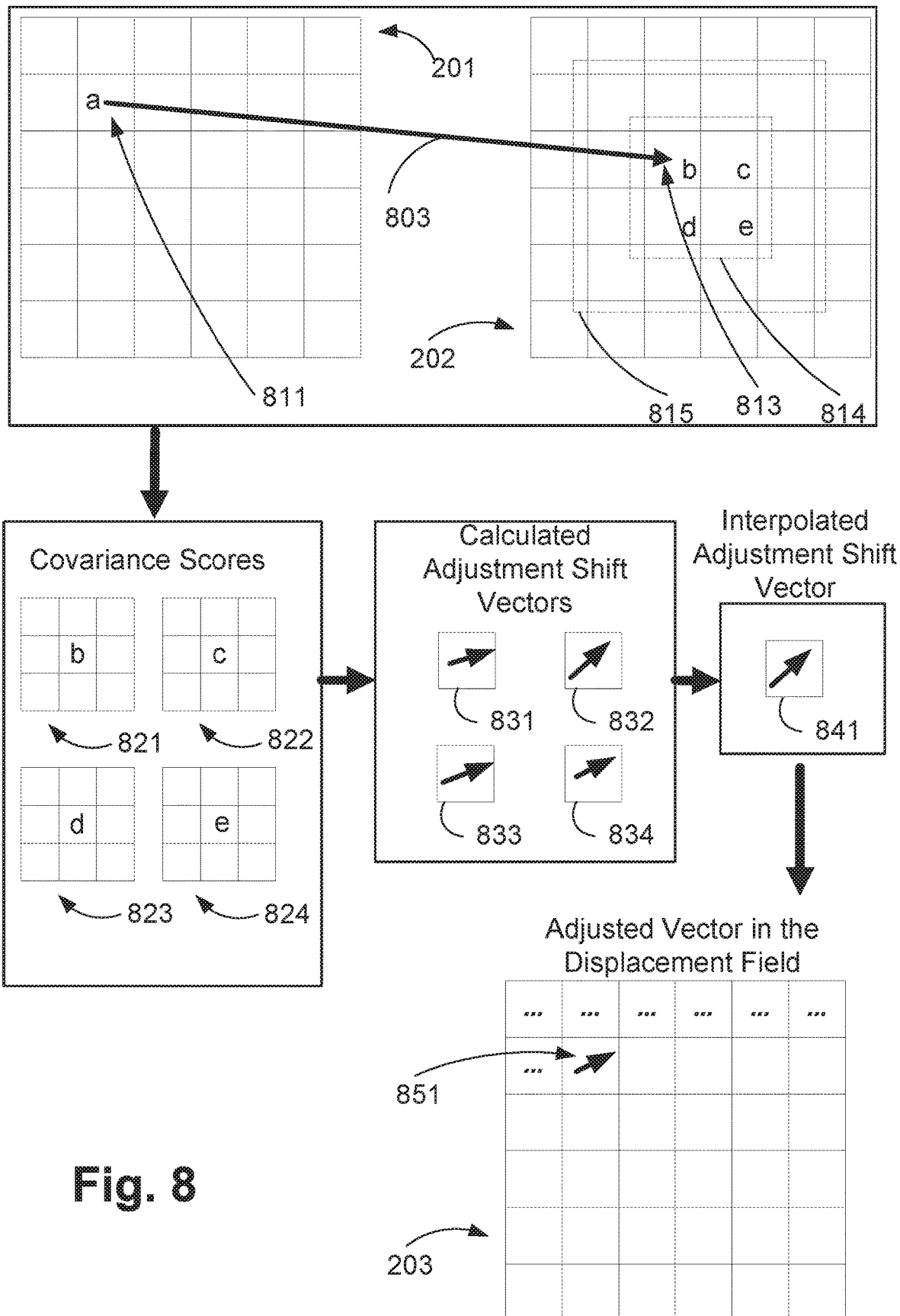
FIG. 8 shows block diagrams of the images in the calculation of an adjustment shift vector using the covariance score as shown in the method of FIG. 6 by incorporating linear interpolation.

FIG. 8 shows an alternative process for determining an adjustment shift vector which incorporates a sub-pixel shift through linear interpolation of candidate shift vectors from neighbouring pixels.

As described hereinbefore, the input to the method 600 is the fixed image 201, the moving image 202, and the displacement field 203. In step 610, a pixel 811 associated with a label a is selected from the fixed image 201.

In step 620, a vector 803 (in the displacement field 203) maps the selected pixel 811 to a position (x,y) in the moving image 202. The position (x,y) is then rounded to the nearest integer pixel position 813, which is associated with a label b. It should be noted that mapping determined by the vector 803 is schematically shown in FIG. 8 and does not represent the actual vector 803, which is a vector pointing from coordinates (2, 2) in the fixed image 201 to coordinates (3, 3) in the moving image 202.

In step 630, pixels surrounding the pixel 813 are determined, as described hereinbefore in relation to FIGS. 6 and 7.

FIG. 8 shows an alternative method for performing the sub-process 650. FIG. 8 shows that the method 600 at step 610 selects a pixel 811 in the fixed image 201, where the pixel 811 is associated with the label a.

In step 620, a vector 803 (in the displacement field 203) corresponding to the selected pixel 811 maps the selected pixel 811 to a pixel position in the moving image 202. The pixel 813 (associated with the label b) in the second image 202 is then determined by rounding the mapped pixel position to the nearest pixel.

In step 630, pixels neighbouring the pixel 813 are determined. As shown in FIG. 8, a neighbourhood of three pixels associated with labels c, d, e are first selected to form a 2×2 neighbourhood of pixels 814. The three pixels are selected from coordinates (x,y),(x+1,y),(x,y+1),(x+1,y+1).

Next, a 3×3 region adjacent each of the pixels 814 is then determined to obtain a 4×4 region of pixels 815.

In step 640 of the alternative method shown in FIG. 8, covariance scores are calculated for the neighbourhood of pixels 815. The covariance scores 821 are obtained for a 3×3 area of pixels surrounding the pixel 813. The covariance scores 822 are obtained for a 3×3 area of pixels surrounding the pixel associated with the label c. The covariance scores 823 are obtained for a 3×3 area of pixels surrounding the pixel associated with the label d. The covariance scores 824 are obtained for a 3×3 area pixels surrounding the pixel associated with the label e. As described hereinbefore, the covariance scores 821, 822, 823, and 824 are calculated against the pixel 811 from the fixed image 201 to obtain the probabilistic correlation (i.e., statistical dependence) between the pixel 811 and each of the pixels 815.

In the sub-process 650 of the alternative method shown in FIG. 8, the covariance scores 821 of the 3×3 area of the pixel 813 associated with the label b are multiplied with the candidate shift vectors 731 (shown in FIG. 7). An adjustment shift vector 831 is obtained by either summing the covariance-score weighted vectors 731 or selecting the largest covariance-score weighted vector 731.

Adjustment shift vectors 832, 833, 834 of the respective 3×3 area of the pixels associated with the label c, d, e are respectively multiplied with the candidate shift vectors 731. Each of adjustment shift vectors 832, 833, 834 is obtained by either summing the covariance-score weighted vectors 731 or selecting the largest covariance-score weighted vector 731.

A single interpolated adjustment shift vector 841 can be calculated from the four calculated adjustment shift vectors 831, 832, 833, 834 using linear interpolation. The interpolated adjustment shift vector 841 is then combined with the vector 803 to yield a vector 851 in the displacement field 203, as described in relation to step 340 in the method 300.

The alternative method shown in FIG. 8 for determining an interpolated adjustment shift vector 841 produces a more accurate adjustment shift vector than that shown in FIG. 7.

The adjustment shift vector (e.g., 841) is then outputted by the method 600. The method 600 then concludes. By iterating the method 600 (as performed by the method 300), an initial displacement field can progressively be updated to shift mapped pixels to increasingly likely positions.

Example Application 1

The CSM image registration method 300 works effectively with both single-modal alignment, in which the pixels in both input images 201 and 202 represent the same kind of measurement, and also multi-modal alignment, in which pixel values represent different "meanings". The method 300 also works in a single-moded, multi-channel environment in which pixel values vary over time. Such variation can be caused by, for example, changes in lighting, changes in outdoors photographs due to the position of the sun over time, pairs of photographs taken with flash and without flash, and images of the same scene with changes in camera or light source positioning.

One application in which the CSM image registration method 300 can be used successfully is in the registration of multiple images having objects whose appearance is a complicated function of light source direction. One example of such a complicated function is when light reflects of brushed metal where the lighting response is non-isotropic. Another example is paintings where the unevenness of the surface due to paint results in complicated variations in specular reflections with lighting angle.

Such registration is necessary where a camera is translated between shots, and the calibration of the camera position is not sufficiently accurate to register images to the desired accuracy, for example, 0.1 pixel. It is assumed that the camera calibration and positioning is accurate to, for example, one pixel, and that the height of object features is such that different viewpoints do not substantially distort local features in the image. The CSM method 300 can be used to directly register overlapping views of a single part of an object despite any differences in lighting.

Using techniques such as bundle adjustment, such registration can be used in subsequent processing steps to create a larger, compound image. The geometry of the object in the compound image is accurately represented and multiple images contributing to one part of the object are accurately registered.

Figure 9:
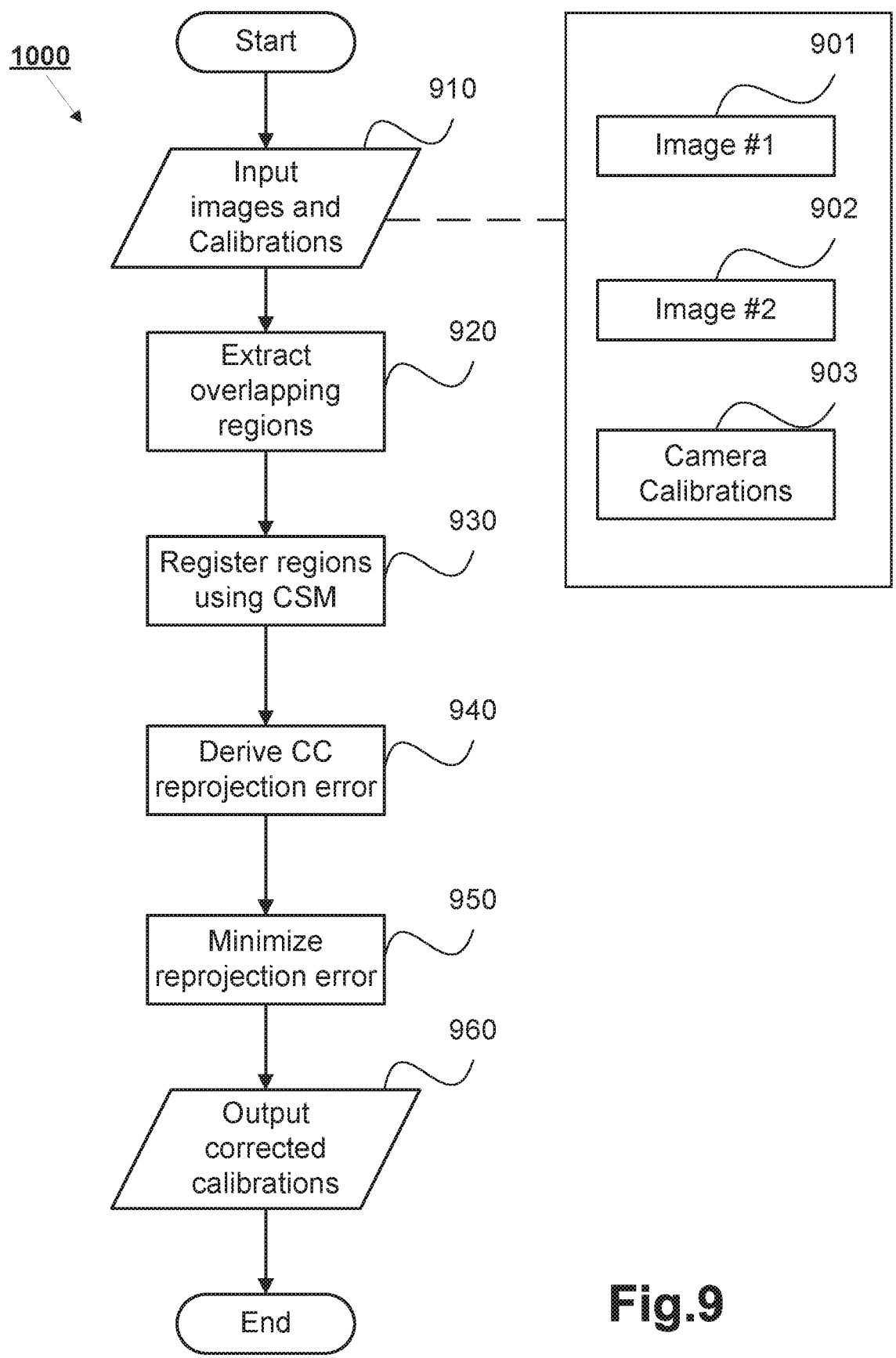
FIG. 9 shows a flowchart of an image registration process to correct a pair of camera calibrations by registering overlapping regions of input images using the method of FIG. 3.

FIG. 9 shows a method 1000 for measuring and correcting camera calibration errors. The method starts with step 920 by extracting overlapping regions.

The inputs to the step 910 are two images (901 and 902) taken of the same flat object with two different camera poses. Both poses are substantially similar except for an X/Y translation of the camera with respect to the object. Camera calibration data 903 for the two images 901 and 902 contains at least an X/Y/Z position of the camera, focal length and view direction.

From the two camera images 901 and 902, overlapping regions of both images 901 and 902 can be determined. Two identically-sized sub-images can then be extracted. The sub-images contain substantially the same content viewed from different positions and already registered to an accuracy corresponding to the accuracy of the camera calibrations, for example, one or two pixels. Depending upon the required accuracy and the size of the sub-images, these sub-images can be sub-sampled to a smaller size to decrease the data processing requirements, increase the maximum measurable shift, and potentially decrease the registration accuracy. The method 1000 then proceeds to step 930.

In step 930, the CSM registration method 300 is used to register the two sub-images. An identity displacement field is used as input, resulting in a final displacement field containing the error in the input camera calibration. This displacement field can be used to improve the camera calibrations. The displacement field can be used to generate a set of corresponding image points between the sub-images. The method 1000 then proceeds to step 940.

In step 940, the image points can be used along with the original camera calibration and the positions of the sub-images to derive a camera calibration reprojection error. The method 1000 then proceeds to step 950.

In step 950, the camera calibration reprojection error can be used to correct the input camera calibrations by minimising the reprojection error to output a camera corrected calibrations 960.

Therefore, the method 1000 provides a set of more accurate camera calibrations can be determined and used as input to bundle adjustment, providing improvement in the stitching of the input images 901 and 902 into a single composite image.

Example Application 2

The CSM image registration method 300 for estimating a displacement field works best if the displacements being measured are smaller than a couple of pixels. To estimate larger displacements, two approaches are described hereinbefore: estimation of a small number of parameters of a global non-rigid transformation using the MI measure, and a pyramidal approach. The pyramidal approach registers down-sampled, lower-resolution versions of the input images to provide starting conditions for progressively estimating displacements of higher resolution images.

One application for MI-based nonrigid registration is the registration of digital pathology slides, in which two or more human tissue samples are sliced from a pathology specimen, stained by different methods, and mounted upon a glass slide. Such samples can be scanned by a pathology microscope 180 (described in relation to FIG. 1A) at high resolution, and can generate images of a large size (e.g., an image of 50,000×50,000 pixels at least). Tissue samples from adjacent slices have many image features in common, and registering these samples before display can allow a pathologist to quickly examine aspects of a single feature by looking through a stack of images in which that feature is closely aligned. Where the use of different stains for subsequent slices result in a very different image appearance, MI methods are essential, and gradient-based methods do not work. Even where only a single stain is used, MI methods provide greater robustness to image artifacts than gradient-based methods.

Methods for down-sampling images without aliasing are known. However, because the label images used for MI registration are non-numeric, it is not possible to down-sample such images by conventional means. Down-sampling label images by dropping pixels is a simple process, but leads to substantial aliasing in the down-sampled images. A preferable approach is to maintain the input images in their original form of multichannel intensities while the images are then down-sampled using subsampling combined with linear filtering. The images are independently clustered at each level of the pyramid, as described earlier using k-means or similar algorithm.

Figure 10:
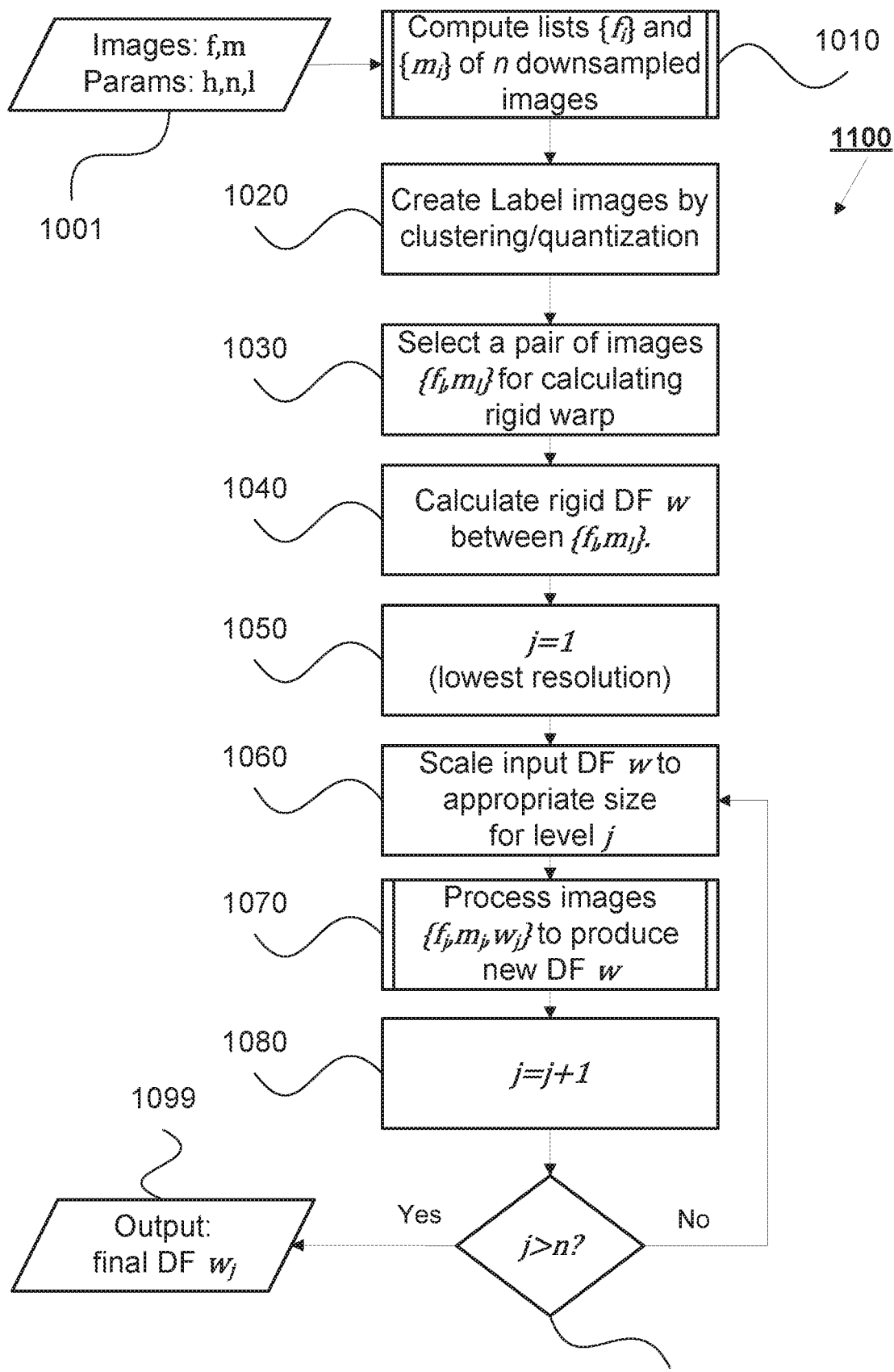
FIG. 10 shows a flowchart of an image registration process to register two digital pathology slides using the CSM registration method of FIG. 3 to register a pyramidal decomposition of the large input images

The method 1100 shown in FIG. 10 shows a flow diagram for the registration of images using a multi-resolution image pyramid using CSM. The method 1100 starts at sub-process 1010.

In the sub-process 1010, the inputs are a fixed image f, a moving image m, with linear pixel values, and three pre-computed parameters: h, n and l. h is the initial number of halvings, n is the desired number of levels in the pyramid, and l is the list entry to be used for rigid registration. These parameters are chosen to balance registration accuracy against computation time, and the selection of these parameters varies according to requirements. For example, sufficient registration accuracy with a processing time of around a minute requires a value of h with the highest-resolution image being around 4 M pixels, a value of n with the lowest-resolution images being around 10K pixels, and a value of l with the rigid-registration images being around 100K pixels.

The input images f and m are first halved h times to bring them to the highest resolution at which registration is performed. These images are stored in a pair of lists, and the images down-sampled (n−1) times further, resulting in two lists of n images, with the lowest-resolution pair being in position 1. The method 1100 then proceeds to step 1020.

In step 1020, each image in the pair of lists is then associated with a label image by using a clustering method. The number of clusters used to quantize each image is configurable, with a suggested range from 32 clusters at the lowest resolution image to 256 clusters at the highest resolution image. The method 1100 then proceeds to step 1030.

In step 1030, two images of medium size are selected from the list entry 1. The method 1100 then proceeds to step 1040 to calculate rigid displacement field between the images f and m using rigid estimation performed to calculate a rigid transform, using MI-based techniques as described, or, if not performing multi-modal registration, using direct methods to calculate transformations. This process results in an initial state for the displacement field w. The method 1100 then proceeds to step 1050.

In step 1050, multi-scale registration is started at the lowest level, with an iteration variable j=1. The method 1100 then proceeds to step 1060.

In step 1060, the displacement field w is scaled to the same size for images in the list at level j. The method 1100 then proceeds to step 1070.

In step 1070, the displacement field $w_j$ is refined using the CSM, as described above in relation to FIG. 3. The method 1100 then proceeds to step 1080 where the iteration variable j is incremented, and, in step 1090, if fewer than n images have been processed, control is returned to step 1060, and the processing continues until a final displacement field $w_j$ is output in step 1099.

This displacement field can be used to warp the moving image m as described above, and the warped moving image and the fixed image f can be displayed together with common features located in the same position.

Alignment Data Determination

Existing methods of determining approximation kernels of limited support are based upon functions which optimize fitted spline functions while maintaining the ability of the kernels to interpolate polynomials of small degree. By determining a set of constraints it is possible to determine approximation kernels with superior behaviour for specific applications to existing approximation kernels, such as MOMs. Such an approximation kernel with a set of constraints is described above in relation to step 440 of the method 400.

As described above, for a three-tap kernel, for a sub-pixel shift s, where −0.5≤s≤0.5, the constraints on the three weights $w_0$, $w_1$ and $w_2$ are stated as follows:

$$s=-0.5 \Rightarrow (w_0,w_1,w_2)=(m,m,0) \ldots \text{(symmetry)}$$

$$s=+0.0 \Rightarrow (w_0,w_1,w_2)=(p,q,p) \ldots \text{(symmetry)}$$

$$w_0+w_1+w_2=1 \text{ (sum)}$$

$$w_2-w_0=s \text{ (centroid)}$$

$$w_0^2+w_1^2+w_2^2=0.5 \text{ (norm)}$$

The sum constraint of the weighting function values is present to ensure that the approximation kernel can correctly interpolate constant functions. This constraint is present in existing approximation and interpolation kernels.

The centroid constraint of the weighting function is equal to the sub-pixel shift, and is present to ensure that the approximation kernel can correctly interpolate linear functions. This constraint is present in existing approximation and interpolation kernels.

The sum-of-squares constraint ensures that the kernel has a constant $L_2$ norm, and produces excellent phase linearity, substantially removes bias in the MI and gradient-based shift estimation calculations, produces symmetric kernels for shifts around the subpixel shift position at shifts of −0.5, 0.0, and +0.5, and results in weighting values which are continuous with changing subpixel shift s. Note that a value of 0.5 is the only value for this constraint which satisfies the symmetry constraints.

There is a single solution for which the kernel values are all positive with these constraints. This solution can be written compactly in terms of the shift and as follows:

$$\text{let } r = \frac{(2-3s) - \sqrt{1-3s^2}}{6} \quad [2]$$

$$w_0 = r$$

$$w_1 = 1 - s - 2r$$

$$w_2 = s + r$$

An accurate polynomial approximation of this solution is:

$$w_0 = \frac{(s-1)(2s-1)}{6} \quad [3]$$

$$w_1 = \frac{2}{3}(1-s^2)$$

$$w_2 = \frac{(s+1)(2s+1)}{6}$$

Some examples of weights from these equations are:

$$\text{for } s=-0.5, (w_0, w_1, w_2) = \left(\frac{1}{2}, \frac{1}{2}, 0\right);$$

$$\text{for } s=0.0, (w_0, w_1, w_2) = \left(\frac{1}{6}, \frac{2}{3}, \frac{1}{6}\right); \text{ and}$$

$$\text{for } s=+0.5, (w_0, w_1, w_2) = \left(0, \frac{1}{2}, \frac{1}{2}\right).$$

This kernel is called the MACK 3 kernel (mini approximation constraints-based kernel with three weights).

For a four-tap kernel, weights are calculated for 0≤s<1 to ensure that there are always two pixels either side of the fractional pixel position, and additional constraints are added, which completely determine the kernel weights:

$$s=0.0 \Rightarrow (w_0,w_1,w_2,w_3)=(p,q,p,0) \ldots \text{(symmetry)}$$

$$s=0.5 \Rightarrow (w_0,w_1,w_2,w_3)=(m,n,n,m) \ldots \text{(symmetry)}$$

$$w_0+w_1+w_2+w_3=1 \text{ (sum)}$$

$$w_0^2+w_1^2+w_2^2+w_3^2=k_1 \text{ (energy)}$$

$$-w_0+w_2+2w_3=s \text{ (centroid)}$$

$$w_0(-1-s)^2+w_1(-s)^2+w_2(1-s)^2+w_3(2-s)^2=k_2 \text{ (second moment)}$$

$$w_0, w_1, w_2, w_3 \geq 0 \text{ (positivity)}$$

$w_0 > w_3 = w_1 > w_2$ (shape)

$w_0 < w_3 = w_1 < w_2$ (shape)

$w_0 = w_3 = w_1 = w_2$ (shape)

These constraints can be solved for a single value of the constants $k_1$ and $k_2$. Solving the constraints with these values $k_1$ and $k_2$, the kernel weights for shift s:

$$\text{let } e = \frac{14\sqrt{6} + 301}{40} \quad [4]$$

$$\text{let } m = \frac{\sqrt{42\sqrt{6} + 103} + 40}{60}$$

$$p = \sqrt{-5s^4 + 10s^3 + s^2 - 10ms^2 + 10ms - 6s + e - 5m^2 + 10m - 11}$$

$$h = \begin{cases} s < 0.5: & 1 \\ s \geq 0.5: & -1 \end{cases}$$

$$w_0 = -h\frac{p}{20} + \frac{m}{4} + \frac{s^2}{4} - \frac{11s}{20} + \frac{3}{20}$$

$$w_1 = +h\frac{3p}{20} - \frac{m}{4} + \frac{s^2}{4} + \frac{3s}{20} + \frac{11}{20}$$

$$w_2 = -h\frac{3p}{20} - \frac{m}{4} + \frac{s^2}{4} + \frac{7s}{20} + \frac{9}{20}$$

$$w_3 = +h\frac{p}{20} + \frac{m}{4} + \frac{s^2}{4} + \frac{s}{20} - \frac{3}{20}$$

An accurate approximation for this solution is:

$$\text{let } f = |s - 0.5| \quad [5]$$

$$\text{let } a = +0.3006389f^2 + 0.188443f + 0.0443814$$

$$\text{let } b = -0.4019168f^2 + 0.434670f + 0.4556187$$

$$\text{let } c = -0.0980832f^2 - 0.434670f + 0.4556187$$

$$\text{let } d = +0.1993611f^2 - 0.188443f + 0.0443814$$

$$\begin{pmatrix} w_0 \\ w_1 \\ w_2 \\ w_3 \end{pmatrix} = \begin{cases} s < 0.5: & \begin{pmatrix} a \\ b \\ c \\ d \end{pmatrix} \\ s \geq 0.5: & \begin{pmatrix} d \\ c \\ b \\ a \end{pmatrix} \end{cases}$$

This kernel is called the MACK 4 kernel (mini approximation constraints-based kernel with four weights).

The MACK3 and MACK4 kernels provide high-quality approximation that improve on previous interpolation methods with the same computational cost for a variety of uses.
Application of the Kernels to MI-Style Registration The MACK3 kernel has application in mutual-information-based registration methods. Each pixel in an image has a corresponding label and position. The label is effectively a notation, for example an index, which is related to properties associated with a pixel. For example, a pixel at location (x,y) may be labelled with a value $L_{x,y}$, which is associated with corresponding intensity data in a lookup table. The labels can be used to obtain a mutual information score for a pair of images and/or the displacement field. The position denotes the location of the pixel in an image, generally specified in the form of coordinates, for example in two dimensions (x,y), where x and y are integers ranging from 0 up to the image width and height respectively minus 1.

To determine the mapping between input data, in one or multiple dimensions, and the labels L the input data may be associated with a discrete group using a clustering method, prior to registration taking place. Such clustering allows a fixed and configurable number of possible labels in the lookup table and, thus, reduces storage requirements and computation time.

Examples of such clustering algorithms are k-means, merge and box, and median cut methods. An alternative method is to quantize all data channels into a smaller number of channels, resulting in a tractable number of distinct labels. For example, if a digital pathology image has 649,678 individual colours, each represented by a 24-bit RGB value, a corresponding quantised image might have 988 individual colours, each represented by a 12-bit RGB value.

Here we assume that the images have been separately converted to labels by a method such as clustering. The mapping between image data and label, as well as the number of labels, is assumed to be different for each image. The mutual information score I for two related images, with a fixed image containing a set of pixels associated with a set of labels $A = \{a_i\}$, and a moving image containing a set of pixels associated with a set of labels $B = \{b_j\}$, is defined as $$I = \sum_{i,j} P(a_i, b_j) \log_2 \left( \frac{P(a_i, b_j)}{P(a_i)P(b_j)} \right),$$

where $P(a_i, b_j)$ is the joint probability value of the two labels $a_i$ and $b_j$ co-occurring at corresponding pixel positions, and $P(a_i)$ and $P(b_j)$ are the marginal probability distribution values of the respective labels $a_i$ and $b_j$. If the product of the marginal probability values $P(a_i)$ and $P(b_j)$ is zero (0), then the pixel pair is ignored.

In particular, one-dimensional histograms of labels for each image are used to approximate the marginal probabilities of the labels (i.e., $P(a_i)$ and $P(b_j)$), and a pairwise histogram of co-located labels used to approximate the joint probabilities (i.e., $P(a_i, b_j)$).

Where the two images are associated by a transformation, the probability $P(a_i, b_j)$ is the joint probability of a position in the fixed image containing the label $a_i$ being mapped through the transformation to a corresponding position in the moving image containing the label $b_j$. Where the transformation does not map from a pixel position in the fixed image to an exact pixel position in the moving image, partial volume interpolation is used to create the histograms.

According to the present disclosure, a first marginal histogram includes bins indexed by labels of the fixed image; each of the bins represents the number of times a corresponding label occurs in the fixed image. A second marginal histogram includes bins indexed by labels of the moving image with each of the bins representing the number of times a corresponding label occurs in the moving image. The joint (pairwise) histogram is associated with a displacement field and includes bins indexed by label pairs of the label at a location in the fixed image and the label at a corresponding location in the moving image. Each of the bins of the joint histogram represents the number of times a label in the fixed image is mapped, through a vector in the current transform to a label in the moving image. As described below, Partial Volume Interpolation (PV interpolation) methods can be used to determine the pairwise and one-dimensional histograms when the transform maps an integer location in one image to a non-integer location in the other image.

A PV interpolation technique is a method for calculating a histogram for labels associated with pixels in the image. By using the PV interpolation method, an MI similarity measure for a pair of images incorporating a displacement field can be calculated more efficiently and more accurately without warping the moving image. In the PV interpolation technique, a pairwise histogram is calculated by relating labels (associated with pixels) in the fixed image to labels (associated with pixels) in the moving image through the displacement field. In PV interpolation, multiple histogram bins relating to adjacent pixel positions (to which the vector is pointing) in the moving image are updated with weights dependent on the currently defined shift. The PV interpolation accounts for almost all of the calculation time in an MI registration method. Using the MACK3 or MACK4 kernels to implement PV interpolation, a calculated MI score will increase monotonically as the associated transform converges to the correct transformation, so long as the initial transformation is sufficiently close to the correct transformation.

The one-dimensional histogram of the moving image is a histogram of the portion of the moving image which when transformed overlaps the fixed image. This avoids including information from moving image pixels outside the mapped region, and also normalizes the information content measured from the moving image with respect to the information content of the joint histogram. Calculating the one-dimensional histogram using the MACK3 or MACK4 kernel, because of the constant $L_2$ norm of each kernel, preserves the sum-of-squares of the one-dimensional histogram under a small constant shift and improves the monotonicity of the MI measure.

Figure 11:
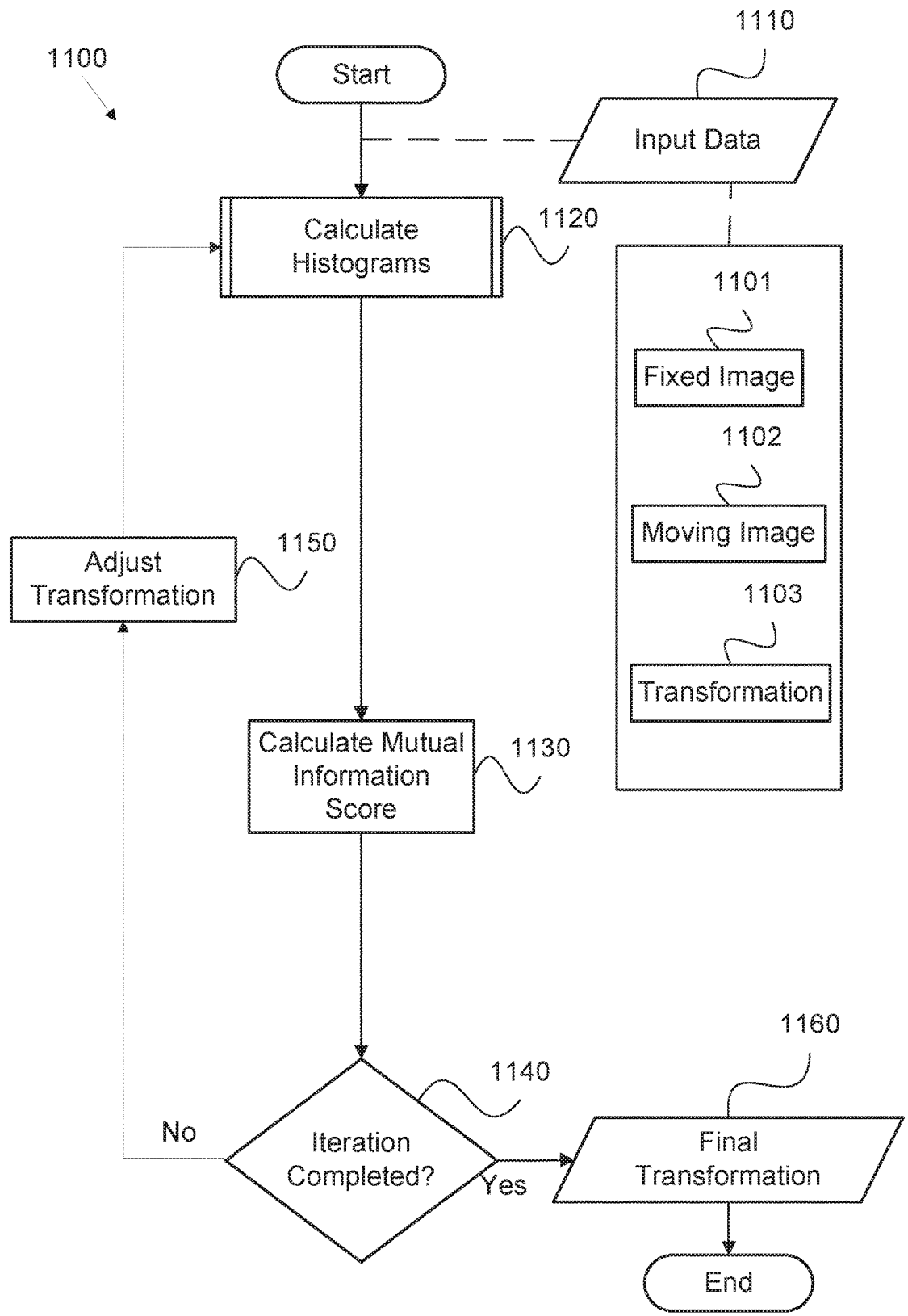
FIG. 11 shows a method of finding a parametrized transformation between a fixed and moving image by mutual information methods.

FIG. 11 shows a flow diagram of a method 1100 of registering a pair of images using a parameterized transform. The method 200 aims to calculate a refinement of an existing transformation (and thereby re-determine) or determine a new transformation for a pair of images to be registered. The transformation should be representable using a small number of parameters, such as an RST-transform, an affine transform, a homography, or the like.

As shown in FIG. 11, the method 1100 commences at sub-process 1120 which receives input data 1110, which includes a fixed image 1101, a moving image 1102, and optionally a transformation 1103. If the transformation 1103 is not included in the input data 1110, it is assumed to be an identity transformation between the fixed image 1101 and the moving image 1102. Each of the pixels in the images 1101 and 1102 is associated with a label, as described hereinbefore in relation to the fixed image 201 and the moving image 202 in FIG. 2.

The images 1101 and 1102 may be obtained from any one of the scanner 126, the camera 127, the microscope 180, the communications network 120 or 122, and the disk storage medium 126. Similar to the images 201 and 202, the images 1101 and 1102 and the transformation 1103 are stored in the input variables 154 (see FIG. 1B). When the images 1101 and 1102 are obtained, the method 1100 may include an additional step of associating pixels of the images 1101 and 1102 with labels using a clustering method before executing sub-process 1120, as described hereinbefore.

The sub-process 1120 then processes the input images 1101 and 1102 with reference to the transformation 1103 to generate histograms. In this and the following description, the histograms refer to the joint histogram 1396 and the one-dimensional histograms 1394 and 1395, as shown in FIG. 13B. The processing of the images 1101 and 1102 in the sub-process 1120 will be further described in relation to FIG. 12.

The method 200 then proceeds from the sub-process 220 to step 1130, in which the generated histograms (in sub-process 1120) are used to calculate a mutual information score. The mutual information score is a numeric value representing the accuracy of the registration of the fixed image 1101 with the moving image 1102 through the current transformation 1103. In step 1130 the mutual information (MI) score is computed by the method to be described in FIG. 12, and in step 1140 the MI score is examined to determine if the registration process should terminate. This determination might occur after a fixed number (i.e., a predefined number) of iterations, or if the MI score reaches a predefined value, or if the MI score has not changed in value by more than a fixed amount, e.g. $10^{-6}$, since the last iteration.

If the determination in step 1140 is that the MI score has not yet reached its maximum value (NO), step 1140 process to step 1150 where the parameters of the transformation 1103 are adjusted to form a new transformation to be evaluated. An optimization method, for example the Nelder-Mead method, can be used to adjust transformation parameters towards a maximum MI value, ideally representing best alignment, for the two images 1101 and 1102 close to the current transformation 1103. Control is then returned from step 1150 to sub-process 1120, where the new transformation is evaluated and the method 1100 continues to step 1130.

If the determination in step 1140 is that the MI score has reached its optimal value (YES), the current transformation 1103 is output as the final transformation 1160, and the fixed 1101 and moving images 1102 are considered to be registered.

The method 1100 then concludes at the conclusion of step 1140.

Figure 12:
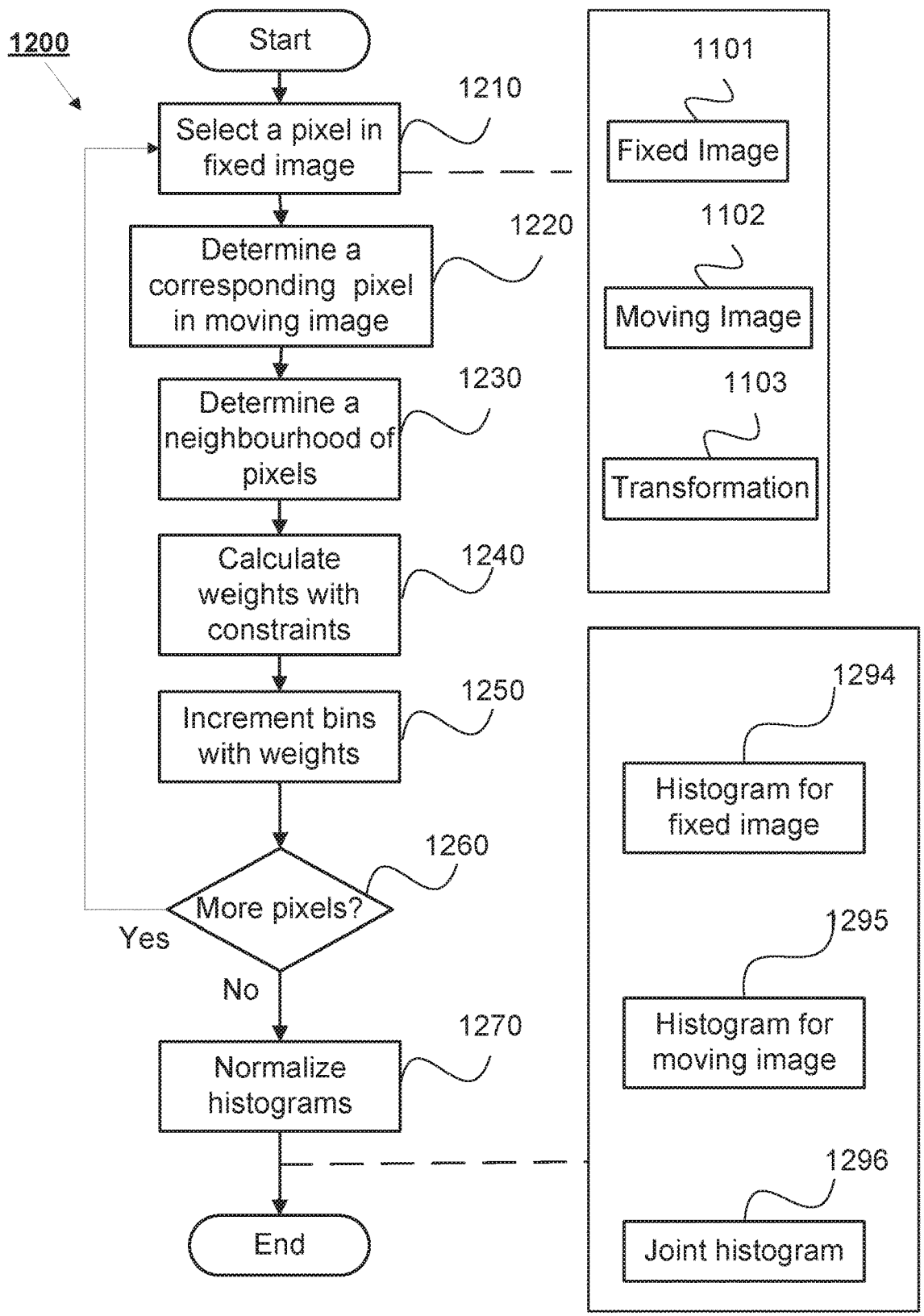
FIG. 12 shows a method of constructing histograms for mutual information calculation.

FIG. 12 shows a flowchart of a method 1200 for calculating histograms. The method 1200 is the method performed in the sub-process 1120 of the method 1100. Inputs to the method 1200 are the fixed image 1101, the moving image 1102, and the transformation 1103, as described above. The method 1200 starts at step 1210 where a pixel from the fixed image 1101 is selected. The method 1200 then proceeds from step 1210 to step 1220.

In step 1220, a pixel in the moving image 1102 corresponding to the selected pixel in the fixed image 1101 is determined using the input transformation 1103. This transformation is calculated as follows. Denote the selected pixel in the fixed image vector by u=(x,y), and the input transformation 1103 T(u) transforms the selected pixel to a non-integer location in the moving image part $v=(x_m,y_m)$=T(u). The corresponding pixel in the moving image 1102 is the pixel with location closest to the non-integer location (X,Y), namely $(X,Y)=(\lfloor x_m+0.5 \rfloor, \lfloor y_m+0.5 \rfloor)$. The method 1200 then proceeds from step 1220 to step 1230.

In step 1230, a neighbourhood of pixels is determined. The neighbourhood of pixels is the eight pixels neighbouring the pixel of the moving image 1102 determined in step 1220 and the pixel determined in step 1230. The method 1200 then proceeds from step 1230 to step 1240.

In step 1240, weights with constraints are calculated for updating bins in the histograms. Using the sub-pixel shift part of the displacement vector, i.e. for a position vector v=(x,y), and a corresponding integer location (X,Y) the sub-pixel part s of this vector is $(x_f, y_f) = v_m - (X,Y) = (x - \lfloor x + 0.5 \rfloor, y - \lfloor y + 0.5 \rfloor)$, PV weights are calculated for the nine pixels in the neighbourhood of pixels determined in step 1230.

The nine pixels correspond to a 3×3 set of interpolation filter (or weights) used for PV interpolation. The 3×3 set of weights is calculated separably using 3 weights each for a shift in the x and y directions using the MACK-3 kernel using equation [2], or a close approximation to same, such as in equation [3], where the values of the weights are determined by assuming constraints including which are sum, centroid, and $L_2$ norm constraints. These constraints define the values of the partial volume (PV) weighting function.

The method 1200 then proceeds from step 1240 to step 1250, where these weights are used to increment the associated bins in the histograms. For example, if weight $w_{i,j}$ was determined for a pixel position (i,j) in the neighbourhood 1313 (see FIG. 13A), a bin for a corresponding label at the pixel position L(i,j) in the window 1313 is incremented by $w_{i,j}$. Each of the bins in the histograms relates to a label in each of the images 1101 and 1102. Finally, the pixel count N is incremented by the sum of the weights $w_{i,j}$ used to update the histograms.

The number of entries in the joint histogram 1396 (see FIG. 13B) is the product of the number of associated labels in both the fixed and moving images 1101 and 1102. Note that some labels are ignored because they are not mapped. It is assumed that the number of labels is smaller than the number of pixels in the images 1101 and 1102, otherwise the count of pixels in each histogram bin will be very low and resulting in inaccurate estimates of underlying probabilities.

The method 1200 then proceeds from step 1250 to step 1260.

In step 1260, it is determined whether more pixels remain to be processed. If there are more pixels to be processed (YES), then the method 1200 returns to step 1210 so the remaining pixels can be processed. If all pixels have been processed (NO), then the method 1200 proceeds to step 1270.

In step 1270, the histograms are normalized by dividing all bins by the pixel count N to produce estimated probabilities Outputs from step 1270 are normalized one-dimensional histograms 1294 and 1295 for the fixed image 1101 and the moving image 1102 respectively, and the joint histogram 1296 for the images 1101 and 1102. Although the method 1200 has been described only in relation to two dimensional images 1101 and 1102, the method 1200 can be modified to calculate histograms for volumetric images using a three-dimensional transform and a three-dimensional neighbourhood of pixels.

There are various other techniques in use to generate the histograms, for example which have different weights for the PV interpolation weighting, or which use Parzen windows. The method 1200 as described above, however, is efficient and accurate.

From the probability histograms, accuracy of a transformation for high-resolution images can be estimated using a mutual information score I that is determined using $$I = \sum_{i,j} P(a_i, b_j) \log_2 \left( \frac{P(a_i, b_j)}{P(a_i) P(b_j)} \right).$$

A correction for an existing transformation can be estimated from the probability histograms.

The method 1200 concludes at the conclusion of step 1270.

Figure 13A:
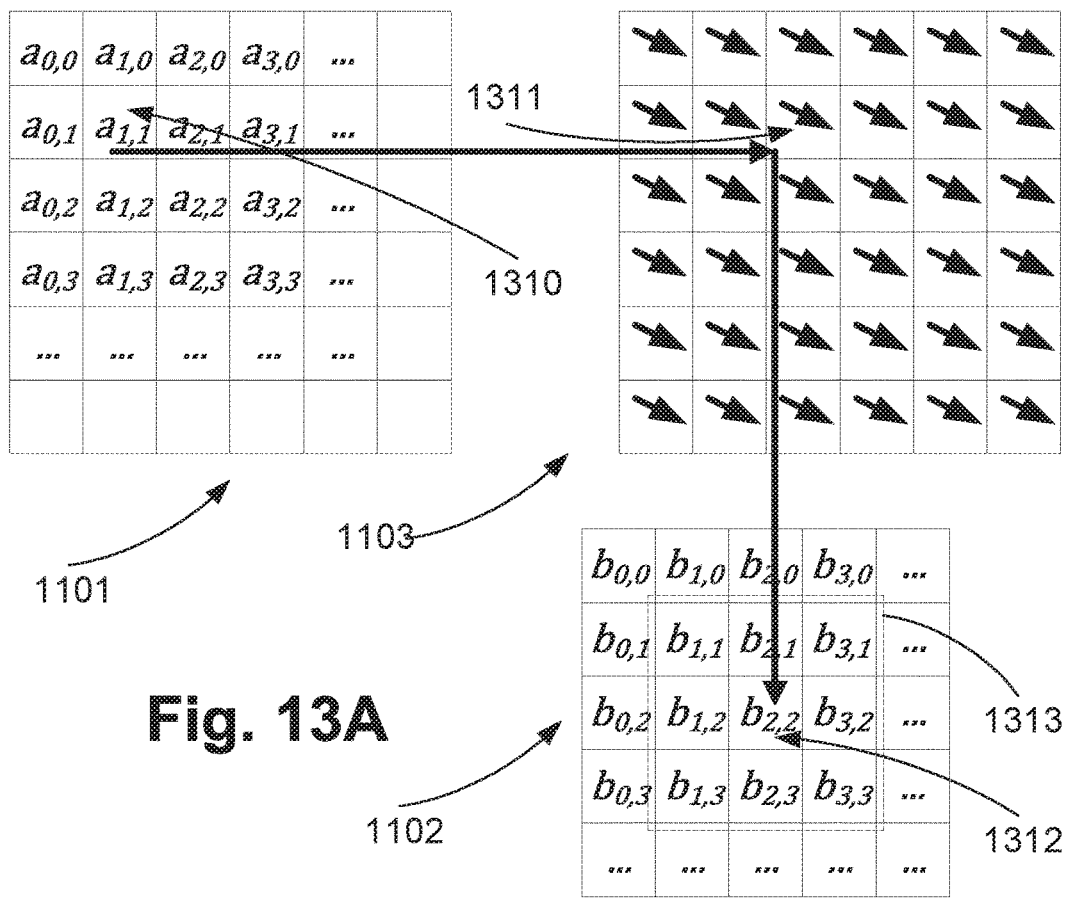
FIG. 13 shows detail of a histogram update operation.
Figure 13B:
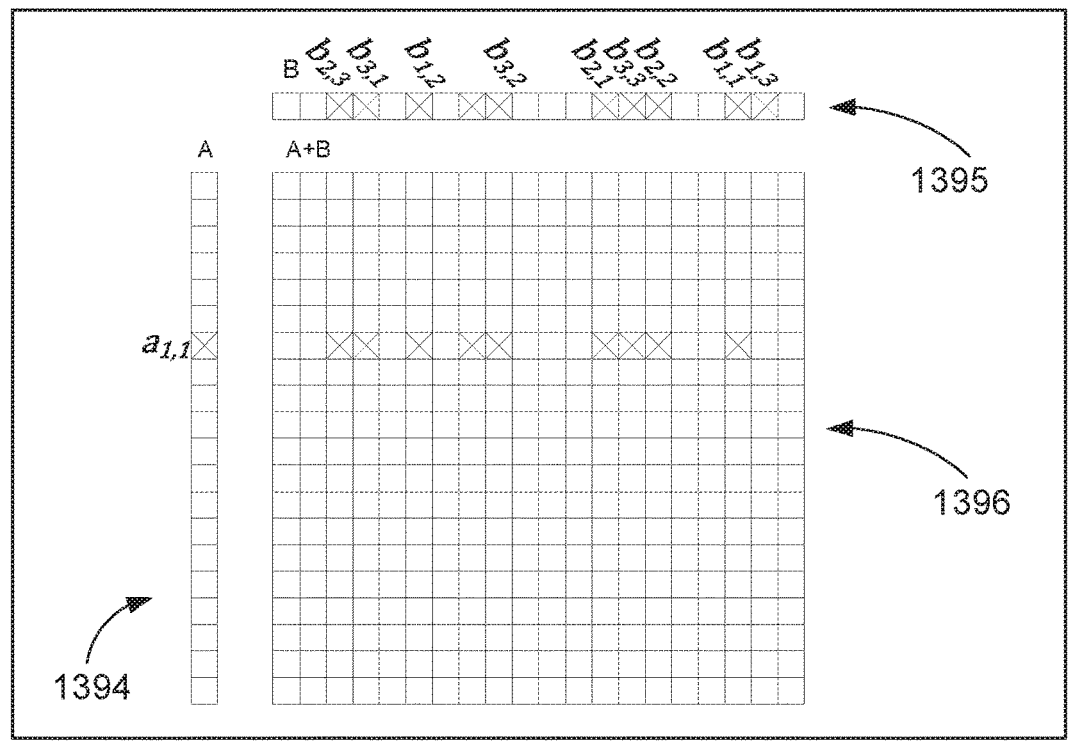

FIG. 13A shows block diagrams of images as the method 1200 is performed. In particular, the updating of the MI histograms for a single pixel is shown.

As described in relation to FIG. 12 above, the inputs to the method 1200 are the fixed image 1101, the moving image 1102, and the transformation 1103. The moving image 1102 does not need to be the same size as the fixed image 1101. As described earlier, the fixed and moving images 1101 and 1102 contain labels, associated with pixels of the images 1101 and 1102. The transformation 1103 maps pixel positions in the fixed image 1101 to pixel positions in the moving image 1102. By following the steps 1210 to 1250, the result is a histogram 1394 of marginal probability values of pixels in the fixed image 1101, a histogram 1395 of marginal probability values of pixels in the moving image 1102, a joint histogram 1396 of joint probability values of related label pairs in the fixed image 1101 and the moving image 1102. Further, the pixel count N is also obtained to be used for normalization of the histograms so that the histograms 1394, 1395, and 1396 are estimates of the corresponding marginal and joint probabilities as described hereinbefore.

The histogram 1394 includes bins indexed by labels of the fixed image 1101. Each of the bins of the histogram 1394 is an estimate of the probability that the corresponding label occurs in the fixed image 1101.

The histogram 1395 includes bins indexed by labels of the moving image 1102. Each of the bins of the histogram 1395 is an estimate of the probability that the corresponding label occurs in the moving image 1102.

The joint histogram 1396 includes bins indexed by label pairs of the fixed image 1101 and the moving image 1102. Each of the bins of the joint histogram 1396 is an estimate of the probability that a label in the fixed image 1101 is co-located, through mapping by a transformation 1103, to a label in the moving image 1102. The marginal histogram 1395 and joint histogram 1396 are determined using the PV interpolation technique with a MACK 3×3 approximation kernel, as described above.

For example, as described in step 1210, a pixel position (1, 1) is selected from the fixed image 1101. As shown in FIG. 13A, the pixel at position (1, 1) is associated with the label $a_{1,1}$. In the subsequent step 1220, a vector 1311 given by the current transformation 1103 at the pixel at position (1, 1) is used to determine a floating-point position (x,y) in the moving image 1102. The position (x,y) is then rounded to the nearest pixel 1312 with integer coordinates (X,Y) by rounding the floating-point values (x,y) with a common method, $X = \lfloor x + 0.5 \rfloor$, $Y = \lfloor y + 0.5 \rfloor$. As shown in FIG. 13A, the nearest pixel 1312 is associated with the label $b_{2,2}$. Hence, step 1220 determines a corresponding pixel position 1312 in the moving image 1102 by using both the vector 1311 computed from the transformation 1103 and the corresponding pixel position 1310 in the fixed image 1101.

In the step 1230, a 3×3 neighbourhood of pixels 1313 in the floating image is determined. The pixel 1312 is associated with the label $b_{2,2}$ and the 8 neighbouring pixels are associated with the labels ($b_{1,1}$, $b_{2,1}$ ... $b_{3,3}$). If the central pixel 1312 or any of the neighbouring pixels extend outside the boundary of the moving image 1102, the pixels can be estimated by mirroring or by extension of the final value. However, the preferred method is to drop pixels which map outside the moving image 1102 from consideration by not updating the histogram for the dropped pixels and updating the pixel count N only by the sum of the weights of the non-dropped pixels.

In step 1240, PV weights ($w_{1,1} \ldots w_{3,3}$) are calculated for each label pair consisting of the label for the selected pixel in the fixed image and the labels for the pixels in the moving image neighbourhood ($a_{1,1},b_{1,1}$), ($a_{1,1},b_{2,1}$), ... ($a_{1,1},b_{3,3}$). The MACK-3 kernel weights are calculated using Equation [2] or a close approximation such as Equation [3], where $s_x$ and $s_y$ are the fractional shifts in the x and y directions: $s_x=x-X$, $s_y=y-Y$, $-0.5 \leq s_x<0.5$ and $-0.5 \leq s_y<0.5$. The fractional shifts $s_x$ and $s_y$ provide a sub-pixel shift value corresponding to a shift from an integer pixel coordinate X or Y respectively.

In step 1250, the three histograms 1394, 1395 and 1396 (see FIG. 13B) are updated using the weights calculated in step 1240. The bins in the histogram 1394 for labels $A=\{a_{1,1}\}$ in the fixed image 1101 are incremented by the operation $H_A(a_{1,1}) \leftarrow H_A(a_{1,1})+1$. The bins in the histogram 1395 (see FIG. 13B) for labels $B=\{b_{i,j}\}$ in the moving image 1102 are incremented by the operation $H_B(b_{1+i,1+j}) \leftarrow H_B(b_{1+i,1+j})+w_{i,j}$ (for $i \in \{0,1,2\}$ and $j \in \{0,1,2\}$), where (i,j) refers to a relative position in the window 1313, $b_{i,j}$ is a label assigned to the pixel position (i,j) in the window 1313 and $w_{i,j}$ is a weight determined for the pixel position (i,j) in the window 1313. The bins in the joint histogram 1396 (see FIG. 13B) are incremented by the operation $H_{AB}(a_{1,1},b_{1+i,1+j}) \leftarrow H_{AB}(a_{1,1},b_{1+i,1+j})+w_{i,j}$ (for $i \in \{0,1,2\}$ and $j \in \{0,1,2\}$). Finally, the total pixel count N is updated by the operation $N \leftarrow N+1$, unless there are dropped pixels, in which case the total pixel count is updated by the sum of the calculated weights.

The above process is repeated for all pixels in the fixed image 1101, as described in step 1260 of the method 1200. Once it is determined that all the pixels in the fixed image 1101 have been processed, the method 1200 proceeds to step 1270.

In step 1270, each value in the one-dimensional histogram 1394 for the fixed image 1101 can be converted from pixel counts to a probability. Such a conversion occurs by normalizing using the pixel count N which is defined by the operation $P(a)=H(a)/N$. Similarly, the second one-dimensional histogram 1395 and the joint histogram 1396 are normalized by dividing the counts in the respective bins by the pixel count N.

The method 1200 then concludes.

Estimation of Patch Displacement in 1 Dimension with Projection

Figure 14:
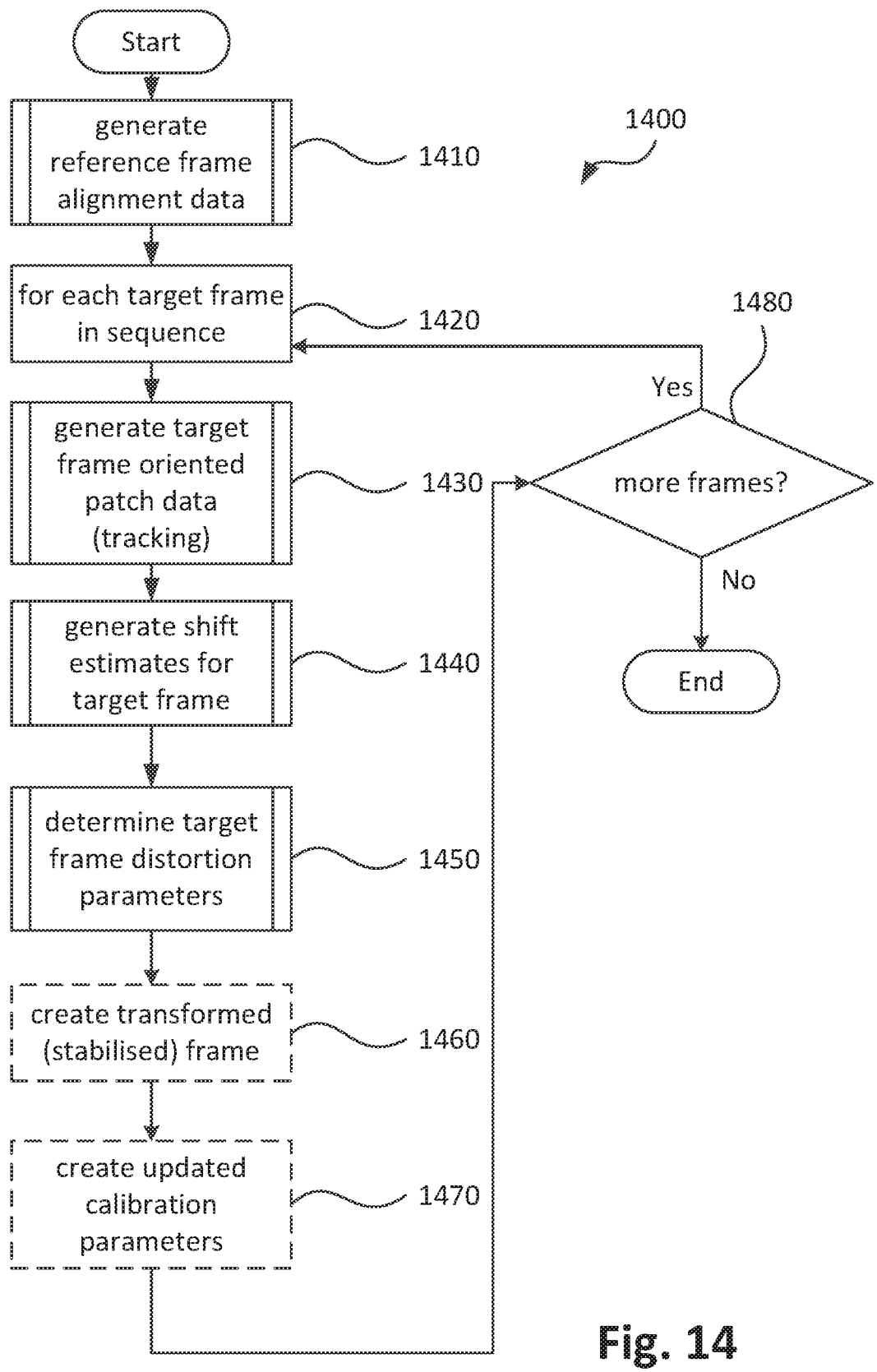
FIG. 14 shows a method for stabilizing a camera image by comparing patches in a reference image with patches in the camera image.

A method 1400 of detecting changes in camera calibration parameters of an input image captured by a camera is now described with reference to FIG. 14. The method 1400 may output transformed video sequence frames that match a reference frame or updated camera calibration parameters for use in a computer vision system. The method 1400 may be implemented as one or more software code modules of the software application program 133 resident in storage devices (similar to the storage devices 109) and being controlled in its execution by a processor (similar to the processor 105) of a camera. The method 1400 in FIG. 14 includes an initialisation step that analyses a reference frame to generate alignment data, and an ongoing per frame alignment step that processes a target frame from the camera. In some implementations, the initialisation step may be updated periodically during operation.

The method 1400 begins at sub-process 1410, where a reference frame received from an image sensing device, under execution of the processor, is processed to generate reference frame alignment data. In one arrangement, the reference frame is supplied with distortion parameters of the camera. The distortion parameters of the camera may include parameters defining an interpolation function such as polynomial, rational or piecewise-linear. The reference frame is processed to generate reference frame alignment data consisting of a set of oriented projected patch information, referred to as oriented patch data, suitable for alignment analysis to detect changes in the calibration parameters of the camera corresponding to other captured image frames. Each oriented patch may include data corresponding to the position, reference direction, and projected profile data (in either real or transformed space such as Fourier space) of a single patch from the reference frame. The projected profile data may be generated by a projection operation along a direction substantially perpendicular to the reference direction of the patch. A method 1500 of generating reference frame alignment data, as executed at sub-process 1410, will be described in further detail below with respect to FIG. 15. The reference direction also establishes an alignment coordinate system.

Once the reference frame alignment data (i.e., the set of oriented patch data for all oriented patches) have been generated, a loop structure starting at step 1420 is used to process a sequence of frames received from the image sensing device. Each of the frames received from the image sensing device may have the same format as the reference frame.

The first processing step of the loop structure used to process the sequence of frames is generating step 1430, where oriented patch data is generated for the target frame. The oriented patch data is generated by determining a location and a reference direction for each patch of the target frame based on tracking of corresponding patches in the reference frame without any processing of pixels in the target frame. Location and reference direction may be generated for each patch and a predetermined coordinate transform. However, the projection operation is not performed at step 1430. The tracking executed at step 1430 may be based on various data such as shift estimates for oriented patches and/or calibration parameter data from previously processed frames and supplementary motion data from a gyroscope, accelerometer, or other motion sensing device. A method 2000 of generating target frame oriented patch data corresponding to reference frame oriented patches, as executed at step 1430, will be described in further detail below with respect to FIG. 20.

Processing then continues to generating step 1440, where the pixel projection data is used to determine shift estimates relative to the reference frame at each oriented patch. A method 2100 of determining patch shift estimates, as executed at step 1440, will be described in further detail below with respect to FIG. 21. In the arrangement of FIG. 14, pixel processing for the detection of calibration parameter changes occurs in step 1440. Step 1440 may be implemented using hardware acceleration in a form of ASIC or FPGA hardware module. However, as described above, step 1440 may also be implemented using a general purpose processor.

Next, at determining step 1450, the target frame distortion parameters for a distortion transform are determined based on the target frame oriented patch data from step 1430 and the corresponding shift estimates from step 1440. In one arrangement, the frame distortion parameters are the parameters of a function that defines the mapping of pixels in the target frame to pixels in a transformed stabilised frame.

Suitable functional transforms include rotation, scaling, translation, affine, and projective transforms or a combination of the above.

The projective transform may be defined in terms of a set of three (3) rotational parameters based on the assumption that the variation in the position of the camera is negligible, and the intrinsic parameters of the camera do not change. Consider Equation (S1) for a feature in world space (X, Y, Z) that maps to a pixel coordinate $(u_r, v_r)$ in the reference frame and pixel coordinate $(u_t, v_t)$ in the target frame based on a change in the rotation matrix only. The transformation defined in accordance with Equation (S3), below, can be derived:

$$\begin{bmatrix} u_r \\ v_r \\ 1 \end{bmatrix} \propto R_{cr} \cdot \begin{bmatrix} u_t \\ v_t \\ 1 \end{bmatrix} \qquad (S1)$$

where $R_{cr} = R_r R_c^{-1}$ defines the relative rotation of two cameras which may be expressed as a quaternion q=a, b, c, d. Three rotational parameters (related to tilt, pan and roll, respectively) may be expressed in terms of the quaternion parameters as (t=b/a, p=c/a, r=d/a). The matrix $R_{cr}$ may be expressed, in accordance with Equation (S2), as follows:

$$R_{cr} = \begin{bmatrix} 1+t^2-p^2-r^2 & 2(tp-r) & 2(tr+p) \\ 2(tp+r) & 1-t^2+p^2-r^2 & 2(pr-t) \\ 2(tr-p) & 2(pr+t) & 1-t^2-p^2+r^2 \end{bmatrix}, \qquad (S2)$$

which for small angles approximates to Equation (S3), as follows:

$$R_{cr} \approx \begin{bmatrix} 1 & -2r & 2p \\ 2r & 1 & -2t \\ -2p & 2t & 1 \end{bmatrix}. \qquad (S3)$$

Each oriented patch in the target frame is associated with a location $(u_t, v_t) \ldots$ (that may vary based on step 1430) and a scalar shift estimate, referred to as $\Delta w_m$. An estimated location in the reference frame, $(u'_r, v'_r)$, may be obtained using the rotation matrix $R_{cr}$ for any given set of rotation parameters (t,p,r) according to Equation (S3).

In order to determine the estimated location, the scaling parameters in Equation (S3) are chosen so that the equality is met. Next, the expected offset, $(\Delta u, \Delta v)$, between the estimated location in the reference frame and the position of the patch in the target frame, $(u_t, v_t)$, is determined. The offset $(\Delta u, \Delta v)$ may be transformed to a scalar offset $\Delta w$ along the projection axis of the oriented patch by taking the dot product with a unit vector along the direction of projection axis of the oriented patch. If the distortion transform of Equation (S1) is accurate, the scalar offset should be very close to the scalar shift estimate between the reference and target oriented patches determined at step 340.

For a set O of N oriented patches consisting of the patches indexed i where i∈1, ..., N, it is possible to set up an error metric as a function of the rotation parameters (t,p,r) based on the differences between the scalar offset and the shift estimates. For example, a simple sum of square error metric may be determined in accordance with Equation (S4), as follows:

$$E(t, p, r; O) = \sum_{i=1}^{N} (\Delta w^{(i)}(t, p, r) - \Delta w_m^{(i)})^2 \qquad (S4)$$

where the value of scalar offset $\Delta w$ along the projection axis of the oriented patch is a function of the three rotation parameters. Rotation parameters may be determined by minimising the error function in accordance with Equation (S5) as follows:

$$(t,p,r) = \arg_{t,p,r} \max(E(t,p,r;O)) \qquad (S5)$$

The solution to Equation (S5) may be determined using a standard non-linear least squares minimisation method such as Gauss-Newton. In general, a suitable starting point for the minimisation is the origin, as the expected rotation is zero (as the current knowledge about the expected motion was included in the tracking step). Alternatively, the starting point may be chosen as an approximate to the solution of Equation (S5), for example as obtained using the linear least squares method. A fixed number of three (3) to five (5) iterations of the Gauss-Newton method may be used. Furthermore, if the rotation has been simplified to a linear form, it may be possible to set up a linear set of equations and solve directly using a matrix inversion.

The accuracy of the estimated rotation parameters in the presence of outliers may be improved by using a more robust estimator such, as the RANSAC method. In the case where such as a robust estimator is used, small sets of oriented patches are selected at random and used to form a best fit, and this fit is applied to the full set of oriented patches to determine a set of inliers which are considered close enough to the estimated transform (i.e. for which the shift estimate is close enough to the scalar offset). The determination of the set of inliers is made by comparing the difference between measured offset and the offset obtained from the estimated transform with a fixed predetermined threshold. The threshold may be specified between one (1) and five (5) pixels. The selected parameter set is the parameter set for which the number of inliers is greatest. The estimated rotation parameters may then be determined using a linear least squares over a selected set of inliers.

The method of determining the distortion parameters may be implemented using other transforms such as translation, RST (rotation scaling and translation), affine and more general projective transforms.

Any other suitable method of defining a distortion field from the set of shift estimates may be used at step 1450 depending on accuracy requirements of alignment. Such other suitable methods include interpolation methods that form a dense distortion field from the sparse set of shift estimates. The method of defining a distortion field used at step 1450 should be capable of extrapolation outside the convex hull defined by the set of oriented patches. One suitable method of defining a distortion field may use radial basis functions.

Processing then continues to creating step 1460, where a transformed (stabilised) frame is created. The target frame distortion parameters from step 1450 may be used to define a displacement field and an associated image transform operation that maps pixels in the target frame to pixels in a transformed stabilised frame. As described above, in general, the mapping does not map integer pixel locations in the stabilised frame to integer pixel locations in the target frame. Therefore, some form of interpolation is required in order to generate an accurate stabilised frame. In one arrangement, a cubic interpolation method may be used to generate an accurate stabilised frame as the cubic interpolation method provides a good trade-off between accuracy and computational complexity.

The stabilised frame may optionally be compensated for geometric aberrations such as barrel distortion if parameters are supplied corresponding to the target frame. Compensating for geometric aberrations may involve a nonlinear distortion (also called an image warp) of the target frame image data according to the distortion model for the camera (parameterised according to the distortion parameters). The nonlinear distortion may be applied after the image stabilisation distortion, or may be combined with the image stabilisation and applied in a single image transform operation. Combining the distortions and applying as a single transform has the advantage of maintaining a higher accuracy in the generated stabilised image as only a single interpolation step is required. As described above, any suitable method for combining displacement fields may be used, and the method of combining displacement fields may require interpolation of the displacement field data.

Next, the method 1400 continues to creating step 1470 where updated calibration parameters corresponding to the camera may be optionally created based on the target frame. Where the distortion transform is a projective transform defined by three rotational parameters described above, the rotation matrix for the extrinsic parameters of the target frame $R_c$ may be determined by multiplying the known reference frame rotation matrix $R_r$ by the inverse of the rotation correction matrix $R_{cr}$ determined in step S350 above, in accordance with Equation (S6), as follows:

$$R_c = R_{cr}^{-1} \cdot R_r \quad (S6)$$

Steps 1460 and 1470 are optional. In one arrangement, the method 1400 may proceed from step 1450 to step 1480, thereby skipping steps 1460 and 1470.

Processing then continues to decision step 1480, where if there are more frames to process (YES), then the method 1400 returns to step 1420. Otherwise, if there are no further frames to process (NO), then the method 1400 ends.

Figure 15:
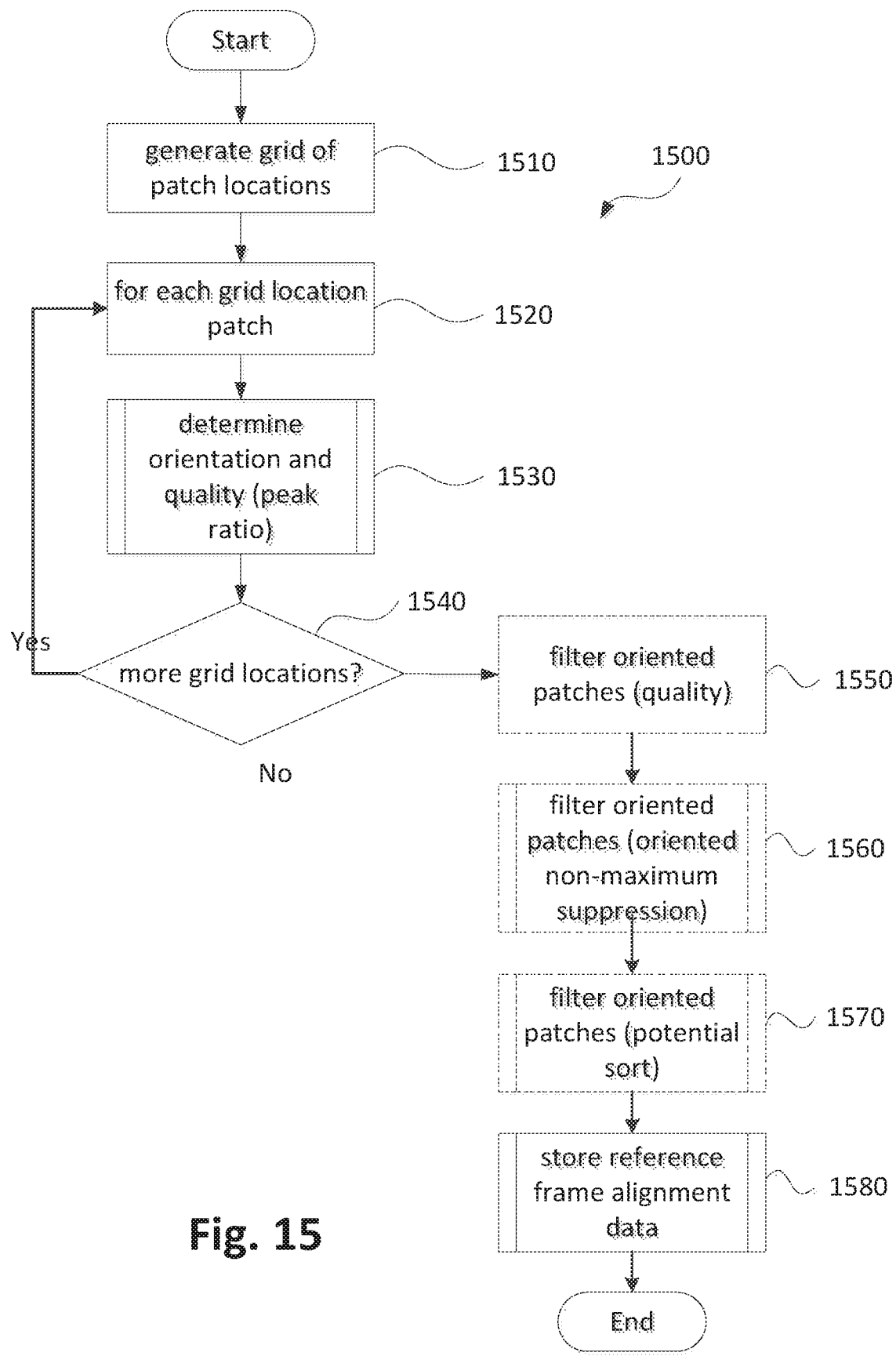
FIG. 15 shows a method for generating reference frame alignment data from image patches.

The method 1500 of generating reference frame alignment data, as executed at step 1410, will be described in further detail below with respect to FIG. 15. The frame alignment data generated in accordance with the method 1500 may be in the form of a set of oriented patch data.

As discussed with reference to step 1410, method 1500 receives as input a reference frame in a known format, and may optionally receive distortion parameters corresponding to the image capture. Method 1500 produces reference frame alignment data consisting of a set of oriented patch data suitable for alignment analysis to detect changes in the calibration parameters of the camera corresponding to other captured image frames. Each oriented patch may include the position, reference direction, and projected profile data (in either real or transformed space such as Fourier space) of a selected patch from the reference frame image. The projected profile data may be generated by a projection operation along a direction substantially perpendicular to the reference direction of the patch. Interpolation may be performed to improve accuracy of the projection.

Method 1500 starts at generating step 1510, where a grid of patch locations is generated for analysis. In one arrangement, HD image frames are processed in accordance with the method 1500. However, as discussed above, the described methods may be adapted to other frame formats such as SD, 4K and 8K.

Patch size is selected so as to encompass the width of the typical linear features in the image and to provide sufficient margin to accommodate expected shifts between two consecutive frames. A patch size of sixty-four (64) pixels is selected as a default value for HD video frames. The grid of locations is typically densely populated. For example, if patch alignment data with a patch size of sixty-four (64) pixels is to be selected, then evenly distributed patch locations on a grid where the spacing is between thirty-two (32) and one twenty eight (128) pixels may be considered. In the case that distortion parameters are supplied to the method 1500, the grid may be sampled uniformly in an undistorted space then the known functional form of the distortion transform and the distortion parameters may be used to map to a non-uniform grid in the reference frame space.

Next, a loop structure is used starting at selecting step 1520 to determine reference direction and quality information for patches at each grid location. At selecting step 1520, a next patch location is selected.

The method 1500 continues at determining step 1530, where reference direction and quality information is determined for the patch at the grid location selected at step 1520. A method 1600 of determining patch reference direction and quality information, as executed at step 1530, will be described in more detail below with reference to FIG. 16.

In one arrangement, the quality parameter returned at step 1530 is a peak ratio which takes a higher value for patches considered of a higher quality. Next, at determining step 1540, if there are more grid locations to analyse (YES), then the method 1500 returns to step 1520. Otherwise (NO), all locations have been analysed and processing continues to step 1550. The processing of individual grid locations in the loop structure starting at step 1520 may be suitable for acceleration by parallel processing.

Next, a series of optional processing steps 1550 to 1570 are used to filter the set of oriented patches. As the number of patches increases, so does the processing cost, however the processing cost is offset by benefit of increasing accuracy of estimation of calibration parameters. The steps 1550 to 1570 are configured to select a set of patches to give acceptable accuracy with a minimum number of patches.

Step 1550 may optionally filter the set of oriented patches according to quality. A suitable method for filtering the set of oriented patches according to quality is to select a threshold for the quality parameter of each patch and to reject any patches with a lower quality than the threshold. The value of the threshold depends on the expected performance of the camera, and the environment. For a reference image from a typical mounted camera at a sports stadium capturing HD video, a suitable threshold for the peak ratio quality metric described in method 1600 may be in the range three (3) to five (5).

Figure 17:
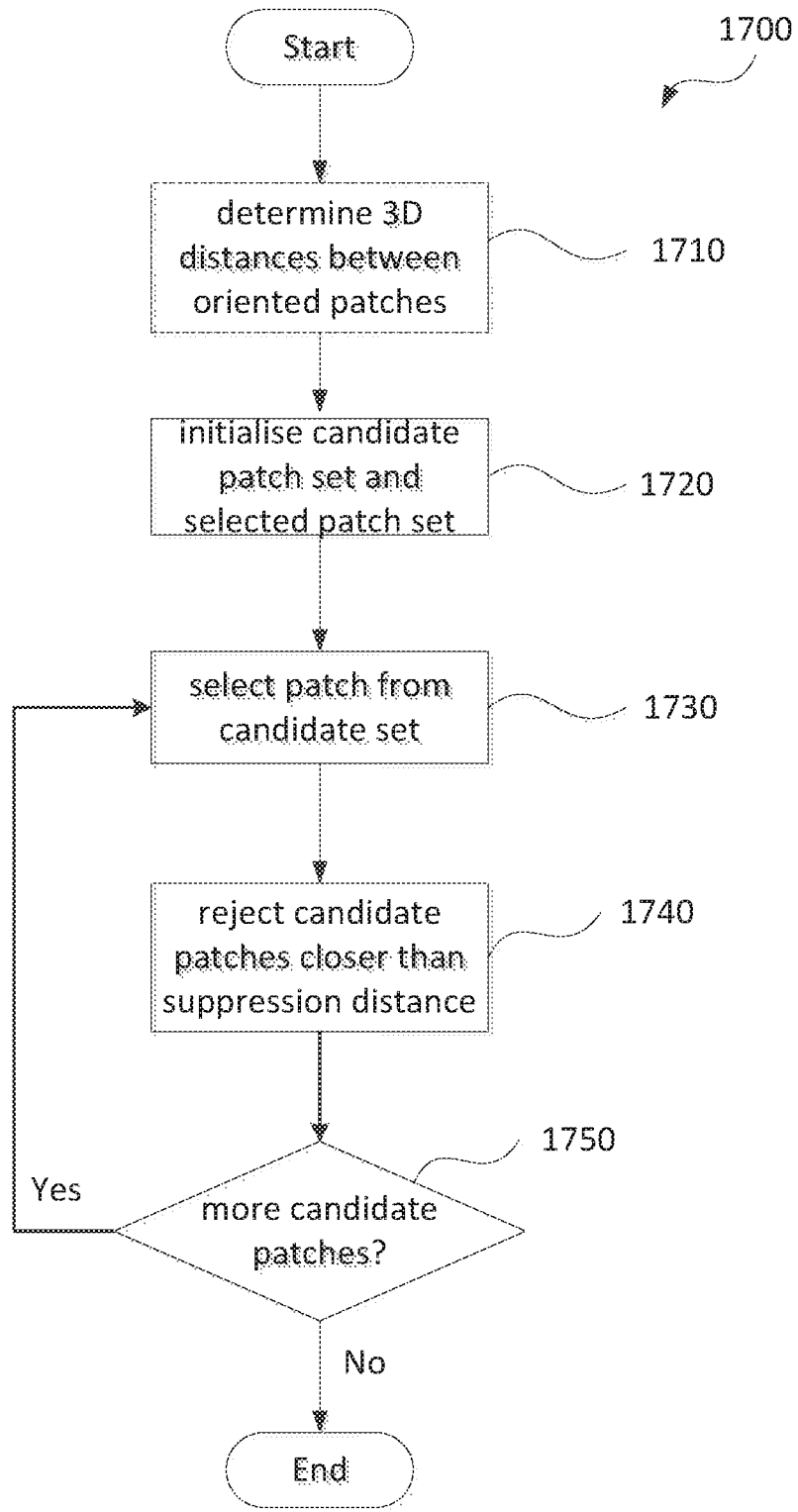
FIG. 17 shows a method for selecting patches from a set of candidate patches.

At filtering step 1560, the set of oriented patches may be optionally filtered using an oriented non-maximum suppression process. A method 1700 of selecting candidate patches using non-maximal suppression, as executed at step 1560, is shown in FIG. 17.

The method 1700 commences at step 1710 by determining three dimensional distances between oriented patches. The method 1700 then proceeds from step 1710 to step 1720, which initialises a candidate patch set and a selected patch set. The method 1700 proceeds from step 1720 to step 1730 to select a patch from the candidate patch set. The method 1700 proceeds from step 1730 to step 1740 to reject candidate patches that are closer than the suppression distance. The method 1700 proceeds from step 1740 to decision step 1750. In the decision step 1750, the method 1700 determines whether there are more candidate patches. If yes, then the method 1700 proceeds from step 1750 to step 1730.

Otherwise (NO), the method 1700 concludes, which also concludes the step 1560 and the method 1500 proceeds from step 1560 to step 1570.

Figure 18:
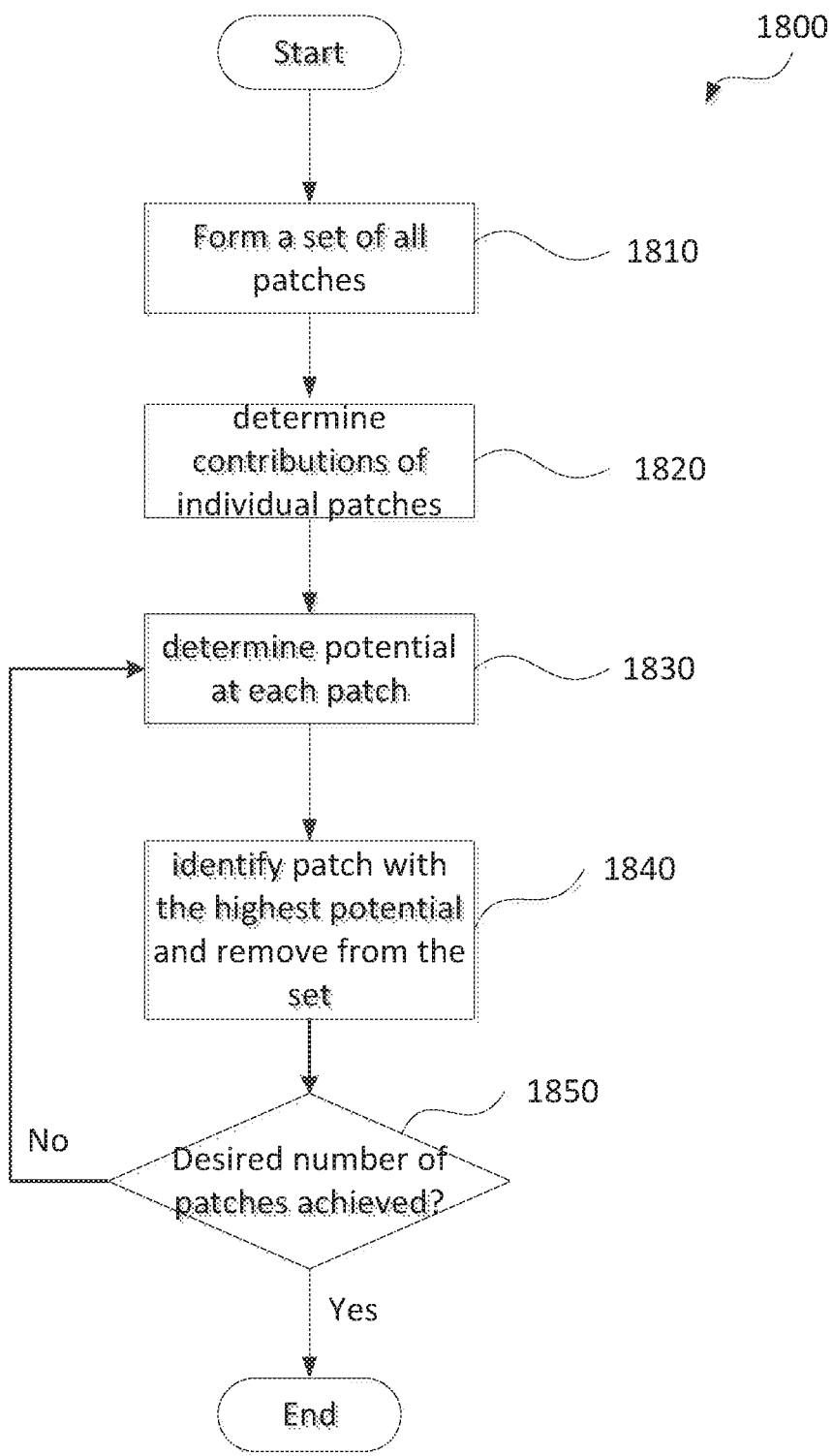
FIG. 18 shows a method for discarding patches from a set to achieve a desired number of patches.

Next, at filtering step 1570, the set of oriented patches may be further filtered using a potential sort process. A method 1800 of filtering candidate patches using potential sort is shown in FIG. 18.

The method 1800 commences at step 1810 by forming a set of all patches. The method 1800 then proceeds from step 1810 to step 1820, which determines contributions of individual patches. The method 1800 proceeds from step 1820 to step 1830 to determine the potential at each patch. The method 1800 proceeds from step 1830 to step 1840 to identify the patch with the highest potential and remove this patch from the set. The method 1800 proceeds from step 1840 to step 1850 to determine whether the desired number of patches is achieved. If no, the method 1800 proceeds from step 1850 to step 1830. Otherwise (YES), the method 1800 concludes. At the conclusion of the method 1800, the step 1570 also concludes and the method 1500 proceeds from step 1570 to step 1580.

After the filtering of oriented patches has been completed, the method 1500 proceeds to storing step 1580, where the reference frame alignment data is stored in RAM, for example. A method 1900 of extracting reference patch data, as executed at step 1580, will be described in detail below with reference to FIG. 19.

Figure 16:
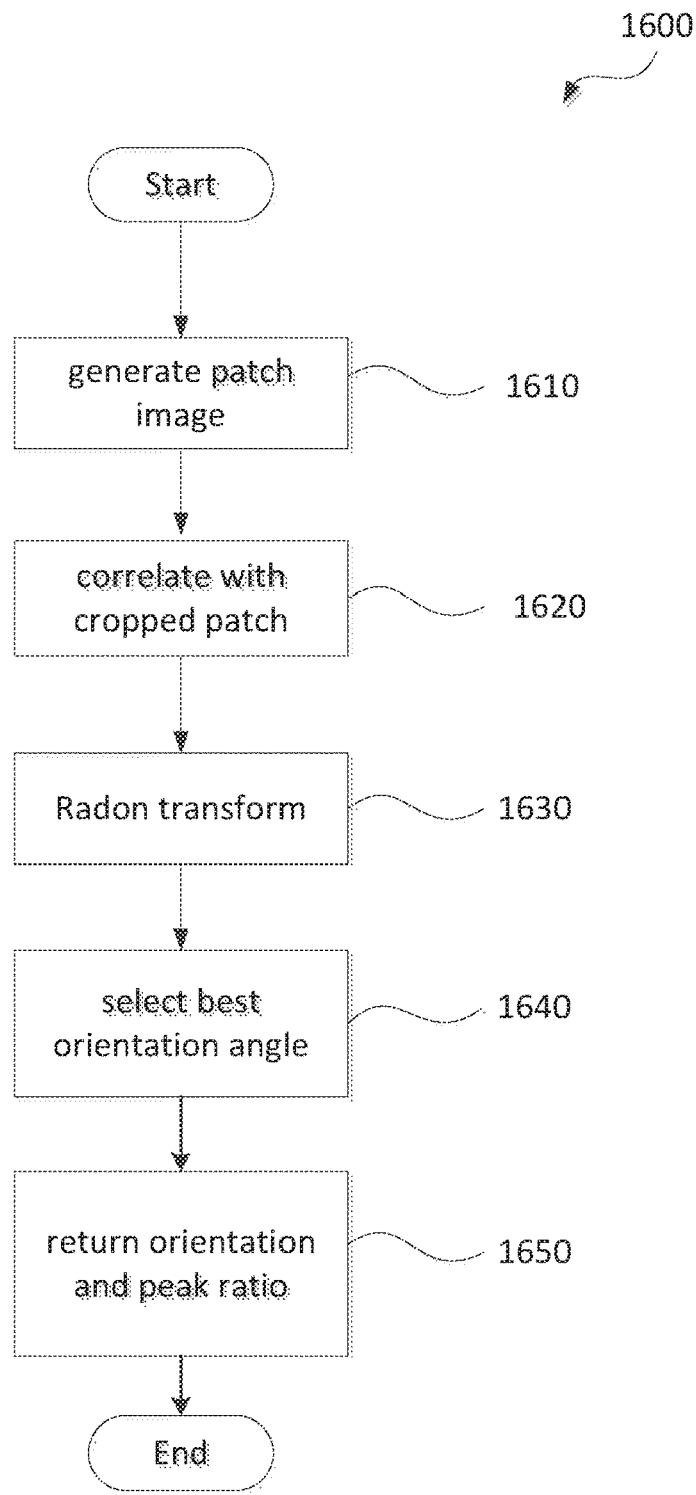
FIG. 16 shows a method for generating orientation and peak ratio data for an image patch.

The method 1600 of determining patch reference direction and quality information (peak ratio) for a patch at a given location suitable for use at step 1530 of method 1500, will now be described in more detail with reference to FIG. 16.

Method 1600 begins at generating step 1610, where a patch image of twice the predefined patch size is generated from the reference frame at the given location. For example, patches of width and height given by one hundred and twenty eight (128) pixels for the suggested patch size of sixty-four (64) pixels referred to in step 1510 above, may be generated at step 1610. In the case that a distortion model and corresponding distortion parameters were supplied for the reference frame, the reference patch image may optionally be warped according to the model to remove the camera distortions. The expected output of step 1610 has a single channel. The single channel may be a luminance or grey-scale channel. However, the single channel may alternatively be any individual channel of the reference image (e.g., the green channel in the case of RGB reference frame pixel data). The method 1600 then proceeds from step 1610 to step 1620.

Next, at correlating step 1620, the image patch is correlated with a cropped version of the image patch to determine correlation data. The cropped version of the image patch is half the size of the original image patch (i.e. the cropped version of the image patch has width and height given by the patch size), centred at the centre of the original patch image. Prior to performing the correlation at step 1620, the mean value is subtracted from each patch and a suitable window function is used to smooth the signal near the patch image boundaries in both dimensions. The method 1600 then proceeds from step 1620 to step 1630.

In step 1630, the Radon transform is performed on the correlation data. The transformed data describes the correlation data as a 2D function of offset and angle. The Radon transformed data, represented in a polar coordinate space, may be stored in the memory 170 under execution of the processor 105.

Next, at selecting step 1640, the Radon transformed data is analysed to select the patch reference direction. The patch reference direction is determined by determining the highest peak along the 1D slice corresponding to all possible angles and zero offset. A 1D slice representing the set of values of the Radon transform over all possible offsets for the chosen angle (reference direction) is then analysed. The height ratio of the highest peak to the next highest peak at the same angle gives a measure of quality that will be referred to as the peak ratio. The angle of the slice with the highest peak ratio quality metric is selected as the patch reference direction.

Following the selection at step 1640, the method 1600 proceeds to storing step 1650, where the selected patch reference direction and corresponding peak ratio quality metric are returned to step 1530 of the method 1500. The selected patch reference direction and corresponding peak ratio quality metric may also be stored in the RAM 106.

The method 1600 concludes at the conclusion of step 1650.

Figure 19:
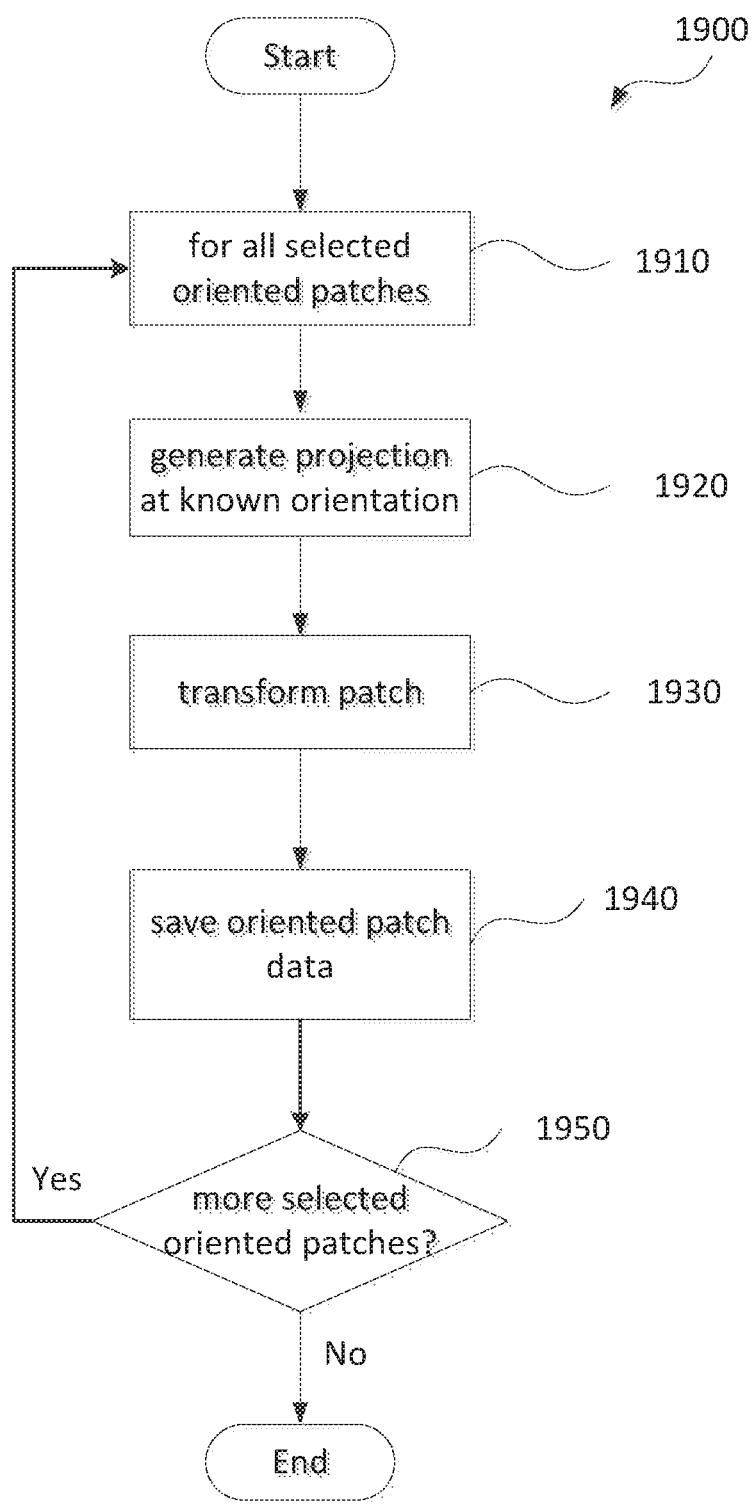
FIG. 19 shows a method for generating frame oriented patch data.

A method 1900 of extracting reference patch data, as executed at step 1580, will now be described with reference to FIG. 19. The method 1900 stores reference frame alignment data in the form of a set of reference frame oriented patch data.

Method 1900 uses a loop structure beginning at selecting step 1910 to process each oriented patch in the selected set of oriented patches in turn. At step 1910, a first patch is selected from the set of oriented patches. The method 1900 proceeds from step 1910 to step 1920.

Then at generating step 1920, a projected rotated image patch image is generated at the patch location and reference direction of width and height given by half of the patch size referred to in step 1510 (e.g., thirty two (32) pixels). Generating a rotated image patch requires interpolation unless the rotation is a multiple of $\pi/2$ radians, which may be performed using cubic interpolation, though other interpolation methods may be used (e.g. linear, sinc, Fourier). The projection operation consists of summing the pixel values along an axis that is substantially perpendicular to the patch reference direction.

In one implementation of step 1920, the intermediate rotated patch image is not stored. The projected rotated image patch may be formed by summing values from pixels around the patch location directly into the projection array elements. For example, an empty projection array may be initialised, then pixels in a region around the patch location known to contain the rotated patch (by geometry) may be sampled. Each pixel may be transformed to a location in the rotated patch that will in general be between integer locations along the axis parallel to the reference direction of the patch. By projecting pixels onto the reference direction, 1D signal is generated. The generated 1D signal is used to align the reference patch and the target patch. Therefore, the reference direction, as mentioned before, is considered to be the alignment coordinate system. Further, the reference direction is determined from the reference patch.

According to a selected interpolation scheme the pixel data may be added to the projection array in the integer locations adjacent to location of the corresponding pixel along the parallel axis. The pixel data is added to the projection array with a weighting defined by the value of an approximation kernel at the offset of the integer location relative to the sub-pixel position of the projected pixel along the projection axis. A Mack-3 or Mack-4 kernel with support of three or four pixels respectively is used as the approximation function, calculated using equations [2], [3], [4] or [5]. The use of a Mack-3 kernel provides a more accurate estimate of shift than conventional interpolation kernels, with a maximum bias with the three-tap kernel being 0.12 pixels, compared to 0.16 pixels with bicubic, and the MACK-4 kernel provides greater accuracy again, with a maximum bias of 0.05 pixels compared to 0.1 pixels for the MOMS4 kernel.

The use of the Mack-3 or Mack-4 kernel gives better accuracies for shift estimation for a similar computation cost as interpolation. In addition, the spectral corrections necessary to correct for the approximation kernels are not required for shift-estimation where spectral correction is already part of the correlation process.

In one implementation, the pixels in the reference frame may be processed as a pixel stream in raster order, considering each pixel once and accumulating projections for all active projections at a scan line. An implementation where the pixels in the reference frame are processed as a pixel stream in raster order is analogous to a method 2100 which will be described in detail below with reference to FIG. 21. As will be described, the method 2100 determines patch shifts from image data. The method 2100 performs a similar analysis of target frame oriented patches, before determining shifts between the reference and target frame oriented patches.

Following step 1920, processing then continues to transforming step 1930, where the projection array is transformed to accelerate processing during the method 2100 to be described. In the arrangement of FIG. 19, the projection array is offset such that the projection array has a zero mean, then the projection array is multiplied by a suitable one dimensional (1D) window function as discussed in step 1620 above, and padded symmetrically with zeros so that a width of the projection array matches the patch size. The projection array may then be transformed into frequency domain using a Fast Fourier Transform, pre-multiplied with a 1D version of the filter function as discussed in step 1620 and complex-conjugated in preparation for correlation at steps 2150 to 2160 to be described. The transformed projection array, reference direction and location are stored within the RAM at storing step 1940. Then at decision step 1950, if there are more selected oriented patches to analyse, the method 1900 returns to step 1910. Otherwise, method 1900 concludes.

A method 2000 of generating target frame oriented patch data corresponding to reference frame oriented patches, as executed at step 1430.

Figure 20:
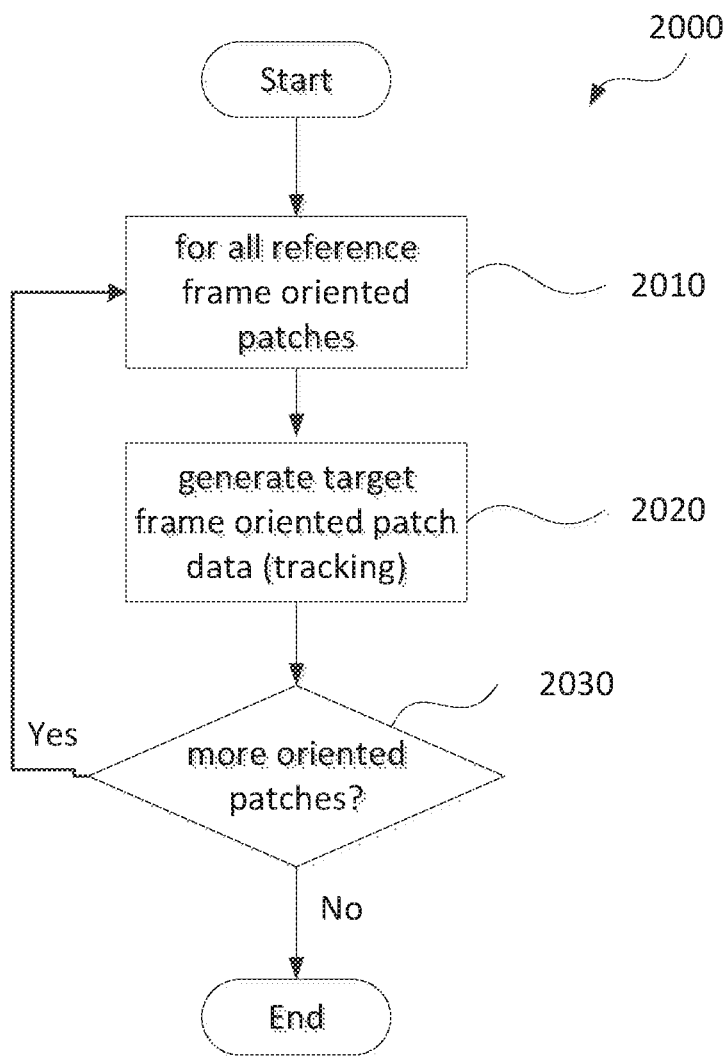
FIG. 20 shows a method for generating target frame oriented patch data.

The method 2000 of generating target frame oriented patch data corresponding to the reference frame oriented patches selected at step 1410, will now be described in further detail with respect to FIG. 20. The method 2000 is executed at step 1430.

The method 2000 sets the location and reference direction of each target frame patch and a pre-determined transform, but not the pixel projection. The method 2000 uses a loop structure beginning at selecting step 2010 to process each reference frame oriented patch in turn. At step 2010, a first reference frame oriented patch is selected.

Then at generating step 2020, target frame oriented patch data is generated based on a predictive model of the selected oriented patch over time. The oriented patches may be updated by offsetting the location according to a previous target frame shift estimate at the patch location determined at step 1440. An offset may be determined according to a distortion model generated for a previous target frame at step 1450 (e.g., the most recent frame).

Alternative models may use multiple previous distortion models to determine an offset. If no previous target frame information is available then the oriented patch data may be set to the reference frame location and reference direction, for example, in the case of the first target frame. The pre-determined transform is defined to be equivalent to the offset between a pixel location in a target frame and a pixel location in the reference frame with origin at the target patch location followed by a rotation according to the reference direction of the target oriented patch data.

In some arrangements, additional data may be supplied with the target frame such as motion data from a gyroscope, accelerometer, or other motion sensing device, which may be used directly to determine an updated patch location. In an arrangement where such additional data is supplied, the motion data will need to be correctly normalised and transformed to pixel coordinates according to intrinsic parameters of the camera. In another arrangement, motion data from recent distortion models or shift estimates may be combined to produce updated target patch location and reference direction data, and then the camera distortion model may be used. In general, however, the selected tracking method will not use any pixel analysis, but rather will use previously determined parameters and motion data.

Once step 2020 is complete, if there are more selected oriented patches to analyse at step 2030 (YES), then the method 2000 returns to step 2010. Otherwise (NO), the method 2000 concludes.

The method 2100 of determining patch shift estimates, as executed at step 1440, will be described in further detail below with respect to FIG. 21. The method 2100 generates pixel projection data for the target frame oriented patches and uses the target frame oriented patches to determine shift estimates relative to the reference frame at each oriented patch. Pixel processing of the target frame used for the detection of calibration parameter changes occurs in the method 2100.

Method 2100 is divided into two processing sets of operations. The left side 2180 of the flow chart consists of pixel processing steps (which form the target oriented patch pixel projection data), while the right side 2190 consists of oriented patch processing (which determines the shift estimates). In the arrangement of the method 2100 shown in FIG. 21, the pixel processing steps 2180 receive the pixels of the target frame in raster order directly from a sensor of the camera. The receipt of the pixels in raster order is indicated by the loop structure starting at step 2110 and ending at step 2145.

At step 2110, a pixel in the target frame is selected. As each pixel is considered in turn, the method 2100 stores and updates a set of pixel projection array structures corresponding to the set of target frame oriented patches that intersect the scan line (y-coordinate) of the pixel. The set of pixel projection array structures is updated by first allocating each pixel to a target frame oriented patch at allocating step 2120 if the pixel fits within the bounding box of an oriented patch of width and height given by the patch size defined in step 1610 described above. Each pixel should be contained in a single target frame oriented patch bounding box assuming minimum spacing of patches at step 1510 is more than the square root of two (2) multiplied by the patch size. As described previously, the pixel data may be stored in a number of different formats. The stored pixel, however, may be of the same format and colour channel as the pixel data used to generate reference patches at step 1610 (e.g. a single luminance value).

If the pixel is found to be in the bounding box of an target frame oriented patch at step 2120, then at mapping step 2130, the pixel location is mapped to a position in a rotated patch at the patch location and reference direction using a pre-determined transformation from step 2020. Next, if the pixel was in a bounding box of an oriented patch at step 2120 and coordinates of the pixel in the rotated patch is less than half of the patch size along both axes, then the pixel projection is updated at updating step 2135 according to the position of the pixel along the axis parallel to the oriented patch and the interpolation method selected as was discussed previously with respect to step 1920 of method 1900.

After pixel projection at step 2135, if the current pixel is the last pixel in the bounding box of an oriented patch and the pixel projection for that oriented patch is complete, processing proceeds to step 2150. In the arrangement of FIG. 21, a message or control signal is sent to the patch analysis processing 2190 to process that oriented patch data according to steps 2150 to 2170 on the right side of FIG. 21.

Figure 21:
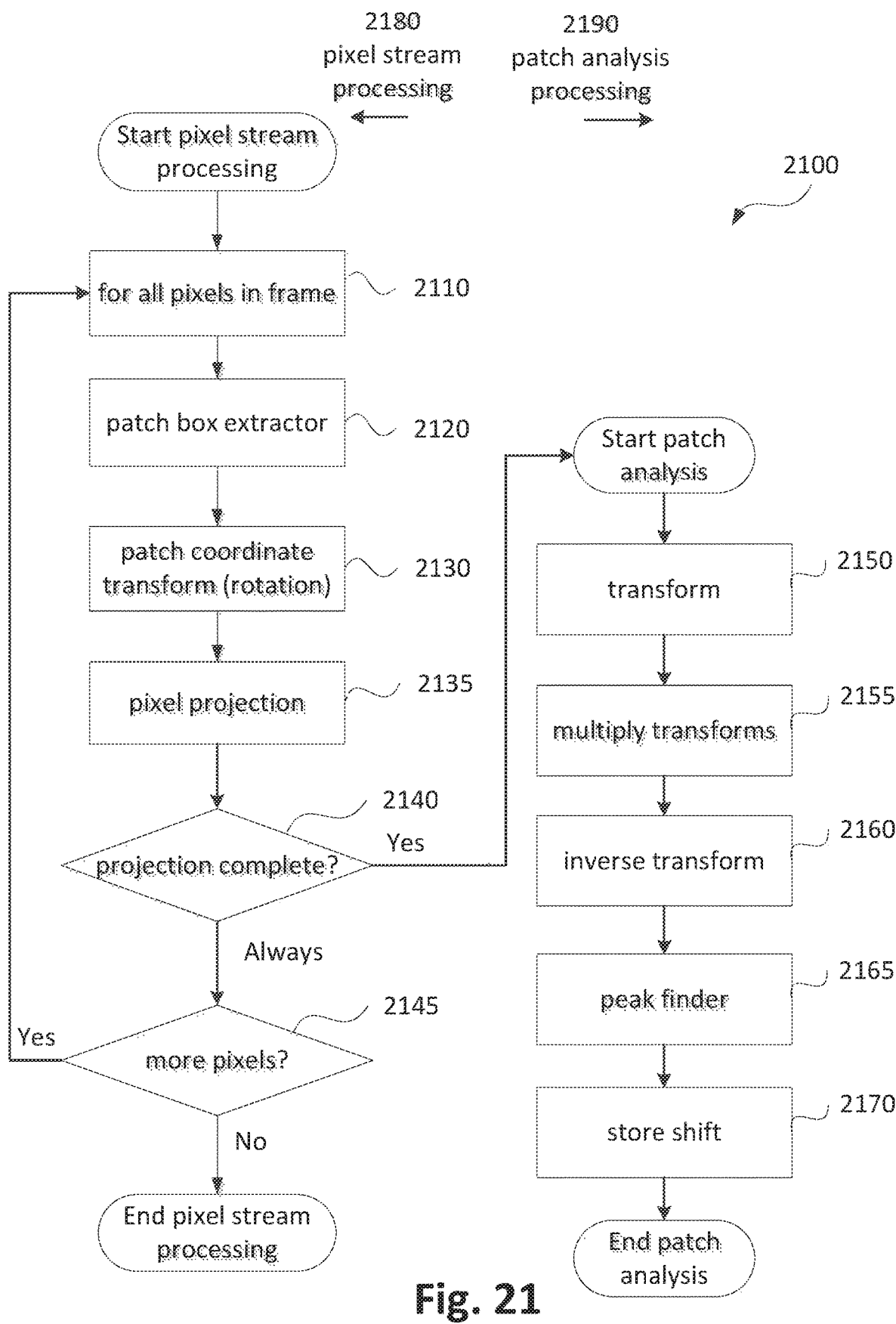
FIG. 21 shows pixel stream and patch analysis processing to determine shift between patches.

In the arrangement of FIG. 21, the pixel stream processing is performed in a separate hardware or software block such that pixel stream processing (2180) continues independently of patch analysis processing 2190. Within FIG. 21, the independent pixel processing is represented by continuation from step 2140 to step 2145 regardless of whether a projection is complete and patch analysis begins for the corresponding oriented patch from step 2150. If there are more pixels to process, then the pixel processing stream returns to step 2110. Otherwise, the pixel stream processing 2180 ends.

Independently of the pixel processing stream 2180, the patch analysis processing 2190 is performed for all oriented patches when the projection data of the oriented patches is confirmed as complete by step 2140. A FIFO queue may be used to communicate results of the process 2180 to process 2190. The maximum size of a queue may be chosen to correspond to the maximum number of patch projections ending on the same scanline. A queue of sixteen (16) patch projections is utilised in one arrangement.

At transforming step 2150, the projection array is transformed. The array may optionally have the mean value of the array subtracted and be multiplied by a suitable 1D window function as discussed previously with reference to step 1620. A Fourier transform is performed to prepare the projection data for shift estimation by a correlation based method.

Next, at multiplying step 2155, the transformed profile for the oriented patch in the target frame is multiplied with the corresponding transformed function generated at step 1930 of method 1900. Following step 2155, the product of the transformed reference and target frame patch profiles is transformed back to real space using an inverse Fourier transform. Next, at analysing step 2165, the real space profile generated at step 2160 is analysed by a peak finder. The peak finder should have a sub-pixel accuracy which may be achieved for example by fitting the largest peak in the data to a parabola. The position of the peak defines the shift estimate for the oriented patch in the target frame relative to the reference frame and is stored at storing step 2170. The patch analysis for the oriented patch ends following step 2170.

Alternative shift estimation methods are known for 1D signals based on alternative transforms or comparison directly in real space. Steps 2150 to 2170 of method 2100 may be replaced by any other suitable method. The transform patch step 1930 applied to reference frame oriented patches may need to be modified or skipped according to which alternative shift estimation method is used.

Figure 22:
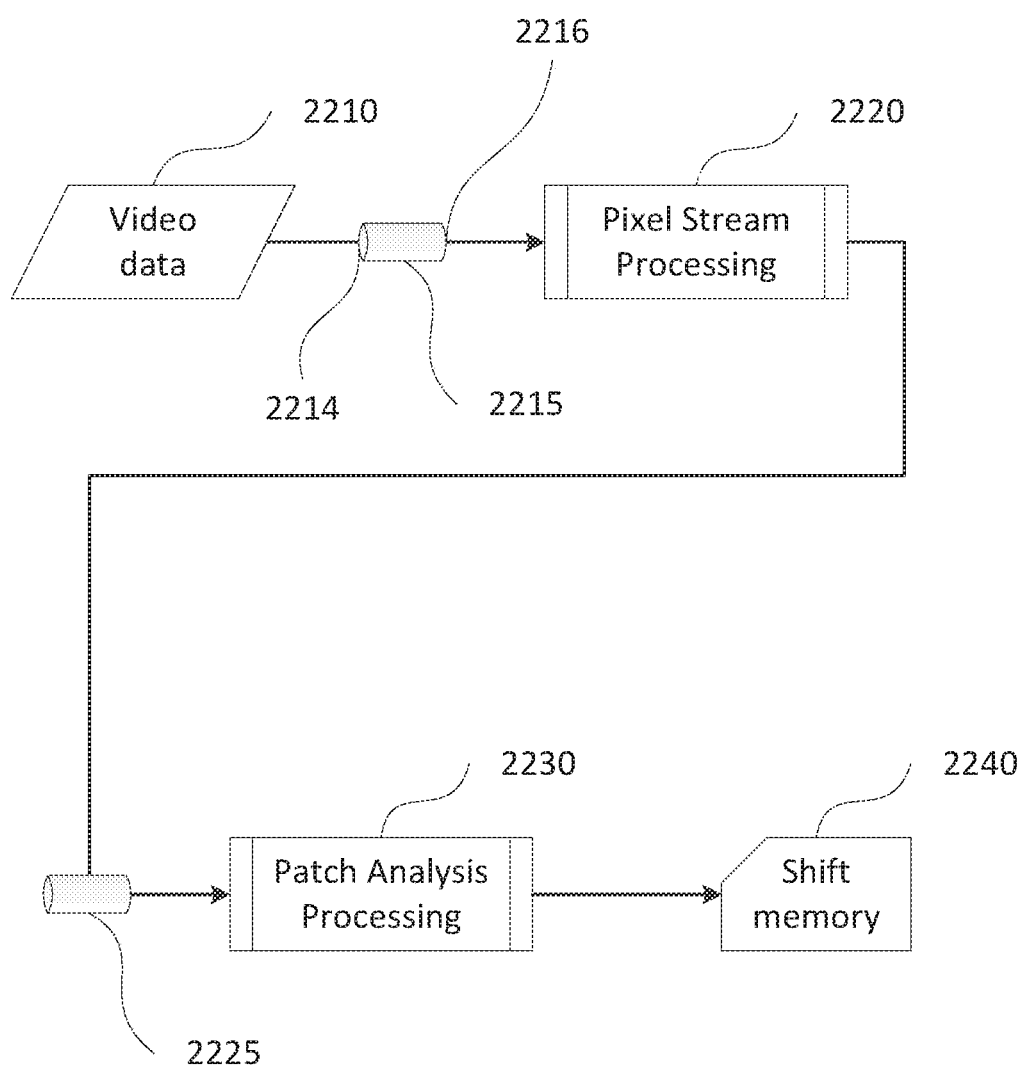
FIG. 22 shows the pipeline from video data to shift memory.

An alternative arrangement of the method 2100 will now be described with reference to FIG. 22, where shifts for the target frame are determined. Video data 2210 captured by image sensing device is streamed through an inter-stage FIFO 2215 to a pixel stream processing module 2220. The inter-stage FIFO has an input end 2214 connected to the video data 2210 and an output end 2216 connected to the pixel stream processing module 2220. Data is written to the input end 2214 and is made available at the output end 2216 for reading by the pixel stream processing module 2220.

The pixel stream processing module 2220 implements the pixel stream processing 2180 of the method 2100, and the patch analysis processing module 2230 implements the patch analysis processing 2190 of the method 2100. The pixel stream processing module 2220 and the patch analysis processing module 2230 will be described in further detail with reference to FIG. 23. The inter-stage FIFO 2225 operates in the same fashion as the inter-stage FIFO 2215. However, inter-stage FIFO 2225 may make available a different number of queue entries. When the patch analysis module 2230 has determined the shift value for each patch, the patch analysis module 2230 writes the shift value for each patch to attached shift memory 2240 which may be configured within RAM 106. The shift memory 2240 stores the results of measuring the shifts at each patch location. The results stored in the shift memory 2240 are then passed by a means that is appropriate to the implementation of step 1450 which determines the target frame distortion parameters.

Figure 23A:
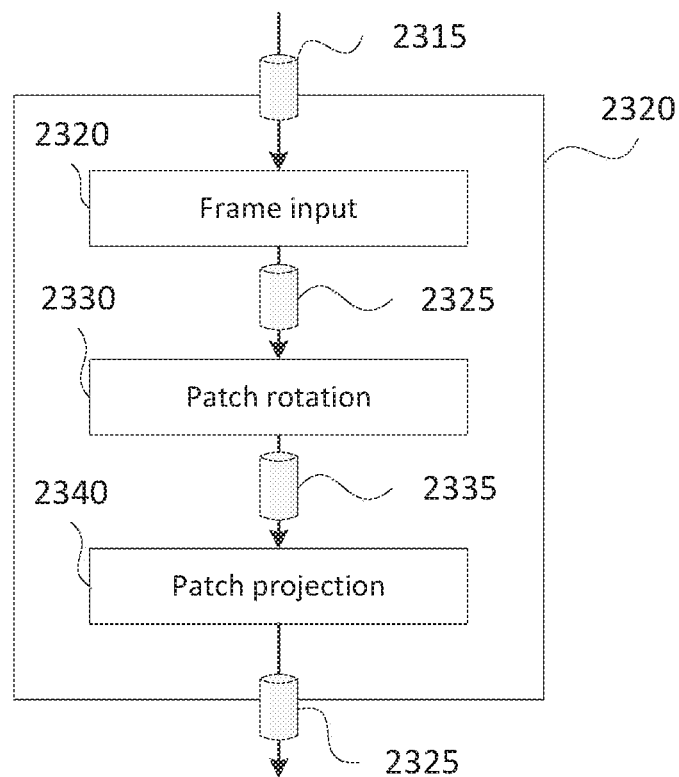
FIGS. 23A and 23B show detail in this pipeline.

FIG. 23A shows a programmable logic implementation of the pixel stream processing module 2220, which implements the pixel stream processing 2180. There are three stages of the programmable logic implementation including frame input 2320, patch rotation 2330 and patch projection 2340. The stages are connected using the inter-stage FIFOs 2325 and 2335. The input to the frame input stage 2320 comes from the inter-stage FIFO 2215. The frame input stage 2320 implements the patch box extractor step 2120, and the output of the frame input stage 2320 is passed via the inter-stage FIFO 2325 to the input of the patch rotation stage 2330. The patch rotation stage implements the patch coordinate transform (rotation) step 2130 and passes an output of step 2130 via the inter-stage FIFO 2335 to the patch projection stage 2340. The patch projection stage implements the pixel projection process of 2135, accumulating the pixel data that will make the projected patch, and the projection complete decision 2140. When the projection complete status is yes, the patch projection stage 2340 passes the accumulated projected patch data as its output via the inter-stage FIFO 2225.

Figure 23B:
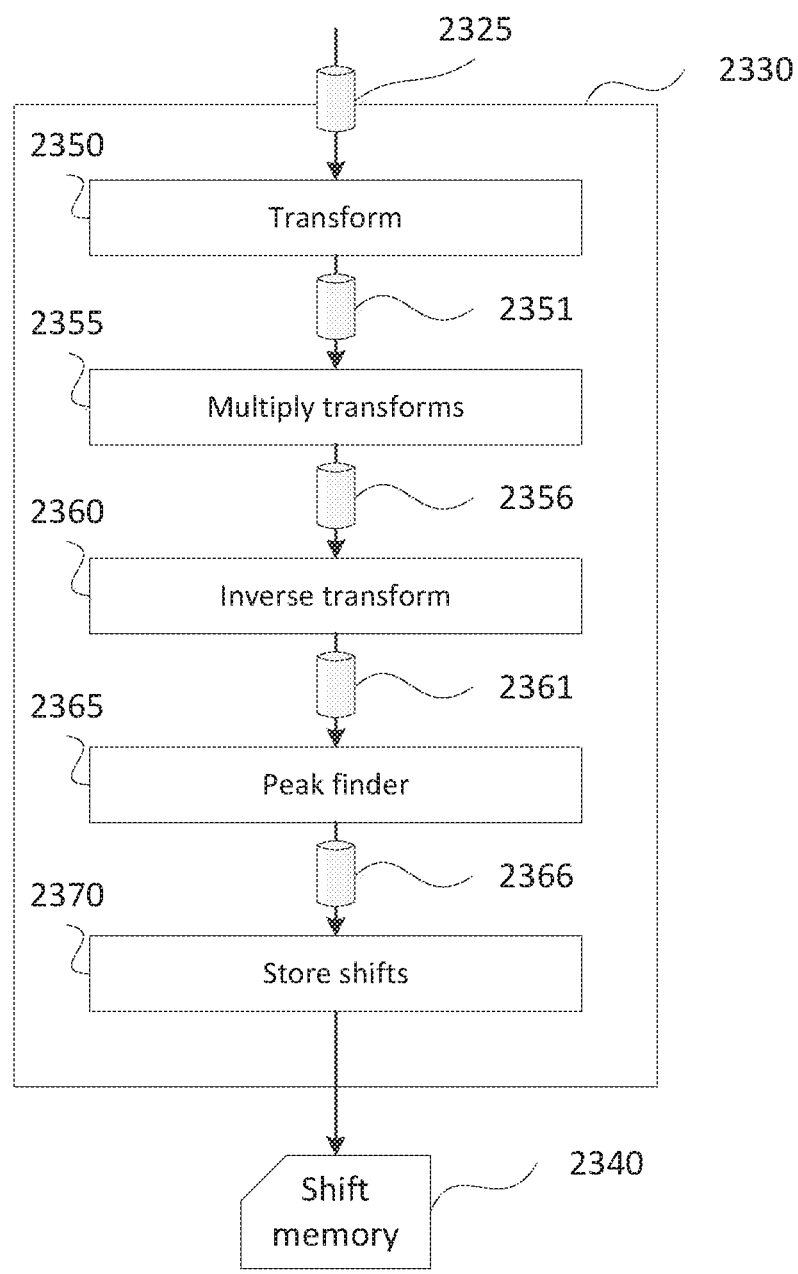
Figure 24:
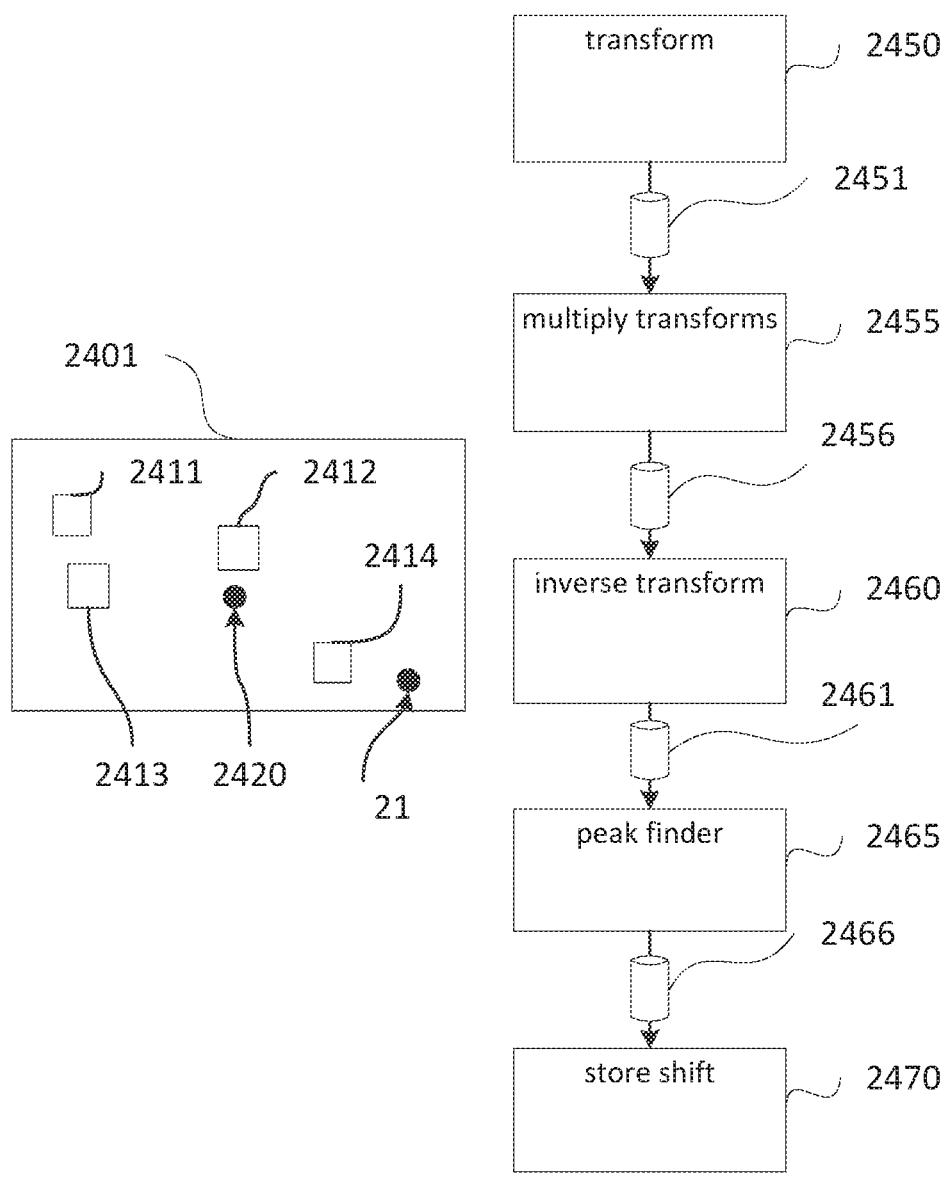
FIGS. 24A to 24D show different ways to implement this pipeline.

FIG. 23B shows a programmable logic implementation of the patch analysis processing module 2230. Projected patch data is read from the inter-stage FIFO 2225 by the Transform module 2350, which performs a 1D Fourier transform of the projected patch data according to step 2150, producing a transformed patch. The transformed patch is passed to the multiply transforms stage 2355 by writing the transformed patch data to the inter-stage FIFO 2351. The multiply transforms stage takes the transformed patch from the transform stage 2350 and multiplies it by the pre-processed transformed reference patch according to step 2155. The multiplication is performed on a Fourier transform coefficient basis. The multiplied transform is passed via the inter-stage FIFO 2356 to the inverse transform stage 2360. The inverse transform stage 2360 performs an inverse Fourier transform to produce a correlation according to step 2160. The correlation produced by stage 2360 is passed to the peak finder stage 2365 by the FIFO 2361. The peak finder stage determines the peak in the correlation corresponding to the shift between the target and reference patch using step 2165. The position and strength of the peak are passed via inter-stage FIFO 2366 to the store shifts stage 2370 which stores the shift data to the shift memory 2240.

FIGS. 24A, 24B, 24C and 24D show an example of the pipelining process, in particular, with regard to how several patches from a video frame can be processed in parallel. FIG. 24A shows an example video frame defined by a video frame bounding box 2401, representing the area covered by the video frame. Within the video frame bounding box 2401 are four patch bounding boxes, labelled 2411, 2412, 2413 and 2414.

The size of the patch bounding boxes 2411 through 2414 relative to the video frame bounding box 2401 is for illustrative purposes only. Similarly, the small number of patches is for illustrative purposes. In one implementation, there may be tens (10s) or hundreds (100s) of patches in an HD (1920×1080 pixels), 4K (3840×2160 pixels) or 8K (7680×4320 pixels) frames. The patch sizes may typically be 32×32 for a HD frame, or larger such as 64×64 or 96×96 for 4K or 8K video frames.

FIG. 24B shows the patch analysis processing steps 2190 from FIG. 21. Each of the steps 2150, 2155, 2160, 2165 and 2170 is assigned to an equivalent pipeline stage 2350, 2355, 2360, 2365 and 2370 respectively. Joining the pipeline stages 2350 through 2370 are inter-stage FIFOs 2451, 2456, 2461 and 2466. The inter-stage FIFOs 2451, 2456, 2461 and 2466 communicate the results of each stage to the following stage. For example, inter-stage FIFO 2451 passes the Fourier transformed data and patch control data from the Fourier transform stage 2350 to the transform stage 2355. The inter-stage pipelines 2456, 2461 and 2466 perform similar operations for their connected stages.

FIG. 24C shows status of the pipeline stages while processing the target input frame in a raster order defined by point 2420 in FIG. 24A. At the point 2420, patches 2411 and 2412 have been processed by the pixel stream processing 2180 and have been passed to the patch analysis processing 2190. In the example of FIG. 24C, the processing of the patch 2411 by the transform stage 2350 has completed and patch 2411 has been passed through the inter-stage FIFO 2351 to the multiply transforms stage 2355. The patch 2412 is being processed by the Fourier transform stage 2350. The inverse transform 2360, peak finder stage 2365 and store shift stage 2370 are idle waiting for input from the inter-stage FIFOs 2456, 2461, and 2466 respectively.

FIG. 24D shows the status of the pipeline stages while processing the input frame in a raster order as at point 2421 in FIG. 24A. At the point 2421, patches 2411 and 2412 have progressed in processing to the store shift 2370 and peak finder 2365 stages respectively. Patch 2413 is being processed by the inverse transform stage 2360 and patch 2414 is being processed by the transform stage 2350.

As seen in FIG. 24D, the multiply transforms stage 2355 is idle. It can be seen from FIG. 24A that the patches 2411, 2412 and 2413 are clustered towards the top left while patch 2414 is near the bottom right. The pixel processing occurs in a raster scan fashion from the top left to the bottom right, and there is sufficient duration between the completion of scanning patches 2413 and 2414 to produce a "bubble" in the pipeline processing. A bubble is an idle processing stage that progresses along the pipeline stages along with patches being processed.

In addition to the methods described above being implemented as software executed by a general purpose processor in a camera, the described methods may also be implemented in the form of a logic processor. Such logic processors may take the form of an application specific integrated circuit (ASIC) where the program is fixed at the time of manufacture. Another form of logic processor is the field programmable gate array (FPGA), which is a reconfigurable logic processor. The advantage of an FPGA is that the FPGA may be reconfigured in the field after manufacture. An FPGA is a collection of general purpose logic blocks, which may include look-up tables, registers and memory regions, and programmable interconnections including FIFO, multiplexor and switching elements. The hardware components are typically configured using a bitstream, which is a sequence of binary values that specify the look up table logic values, FIFO and multiplexor connections and other properties of the reconfigurable hardware. The bitstream is typically loaded from a memory device such as a non-volatile read only memory (ROM) or volatile memory such as EEPROM or flash.

The advantage of implementing the described methods in a logic processor is that the stages of processing may be implemented in a pipeline fashion. In a pipeline, multiple steps in an algorithm can operate concurrently, passing data from one step to the next. A more detailed description of pipelining, and how pipelining operates will be provided with respect to the described methods below.

In an FPGA implementation of the described methods, it is beneficial to structure the implementation in a pipelined fashion. The following describes a pipelined implementation suitable for use in an FPGA of the shift estimation method 2100. One element of a pipelined implementation is an inter-stage FIFO, which is a FIFO that connects multiple pipeline stages together. An inter-stage FIFO may be implemented using a collection of volatile data storage components such as flip-flops or static RAM combined with control logic. However, other volatile data storage components may be used, depending on the reconfigurable logic processor. The inter-stage FIFO acts like a pipe with elements written to input end by a first pipeline stage appearing at the output end for reading by a second pipeline stage. The elements are stored in the FIFOs volatile data storage after writing until the elements are read by the second pipeline stage. The number of elements that can be stored in the FIFO is configured based on the requirements of the pipeline. The FIFO allows the first and second pipeline stages to work in an asynchronous fashion, as the FIFO can store the results of the first pipeline stage until the second pipeline stage is ready to consume the results of the first pipeline stage.

Figure 25:
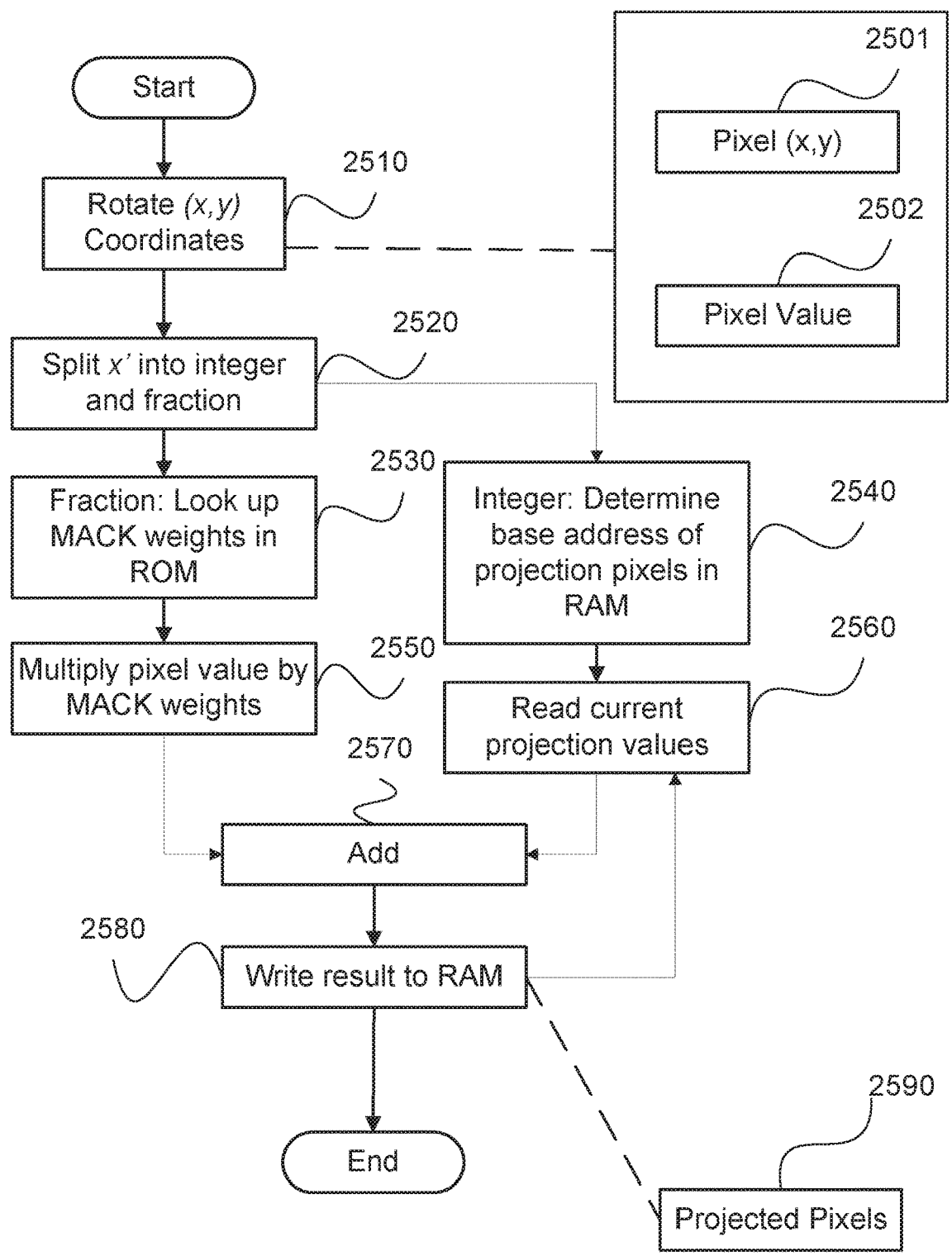
FIG. 25 shows a method of processing one pixel for the projection operation described in FIG. 21 using an FPGA.

FIG. 25 shows a method of processing one pixel for the projection operation described in FIG. 21 using an FPGA.

The input to the process is a 2501, a pixel (x,y) patch coordinate, and 2502, the pixel value from patch location (x,y).

In step 2510, the (x,y) coordinate is transformed to a new coordinate (x', y') by rotation around the patch centre so the projected x' coordinate represents the location of the projected pixel in the projected array elements.

In step 2520 the x' coordinate is split into integer and fractional parts, X and $x_f$ respectively, as described previously, i.e. $x_f$ is a sub-pixel shift value corresponding to a shift from an integer pixel coordinate X.

In step 2530 the fractional part $x_f$ is used to obtain MACK weights using a look-up table. Specifically, $x_f$ represented as a fixed point binary number, can be used as an index into a table stored in ROM which contains pre-calculated values of MACK weights. One arrangement uses table size of 256 entries which corresponds to 8-bit precision of $x_f$. In step 2540 the integer part X is used to calculate a base address in the RAM containing projected array elements.

In step 2550 the pixel value is multiplied by the calculated MACK weights, yielding 3 or 4 weighted pixel values.

In step 2560 the 3 or 4 pixels surrounding the calculated base address are read from the RAM. Therefore, the number of pixels is based on the number of taps of the filter (e.g., 3 pixels for a 3-tap filter, 4 pixels for a 4-tap filter). A multi-port RAM with 3 or 4 read and write ports can be used. Alternatively, RAM can be organized as 2 or more interleaved banks of dual-port RAM with the addition of pixel selection logic. In step 2570 the weighted pixel values are added to the pixels read from the RAM. Steps 2550 and 2570 can be implemented using FPGA logic resources. Alternatively they can be mapped into dedicated hardware DSP blocks available in many FPGA architectures.

In step 2580 the modified pixel values are written back to the RAM in their original locations.

To reduce latency, pixel read addresses at step 2560 can be compared to previous pixel write addresses at step 2580. In case of a match, corresponding pixel values can be transferred directly from step 2580 to step 2560, thus avoiding RAM write-read latency.

By repeating this procedure for each pixel in a patch as previously described, a patch may be projected to calculate projected array elements.

Hybrid Displacement Field Estimation

Figure 26:
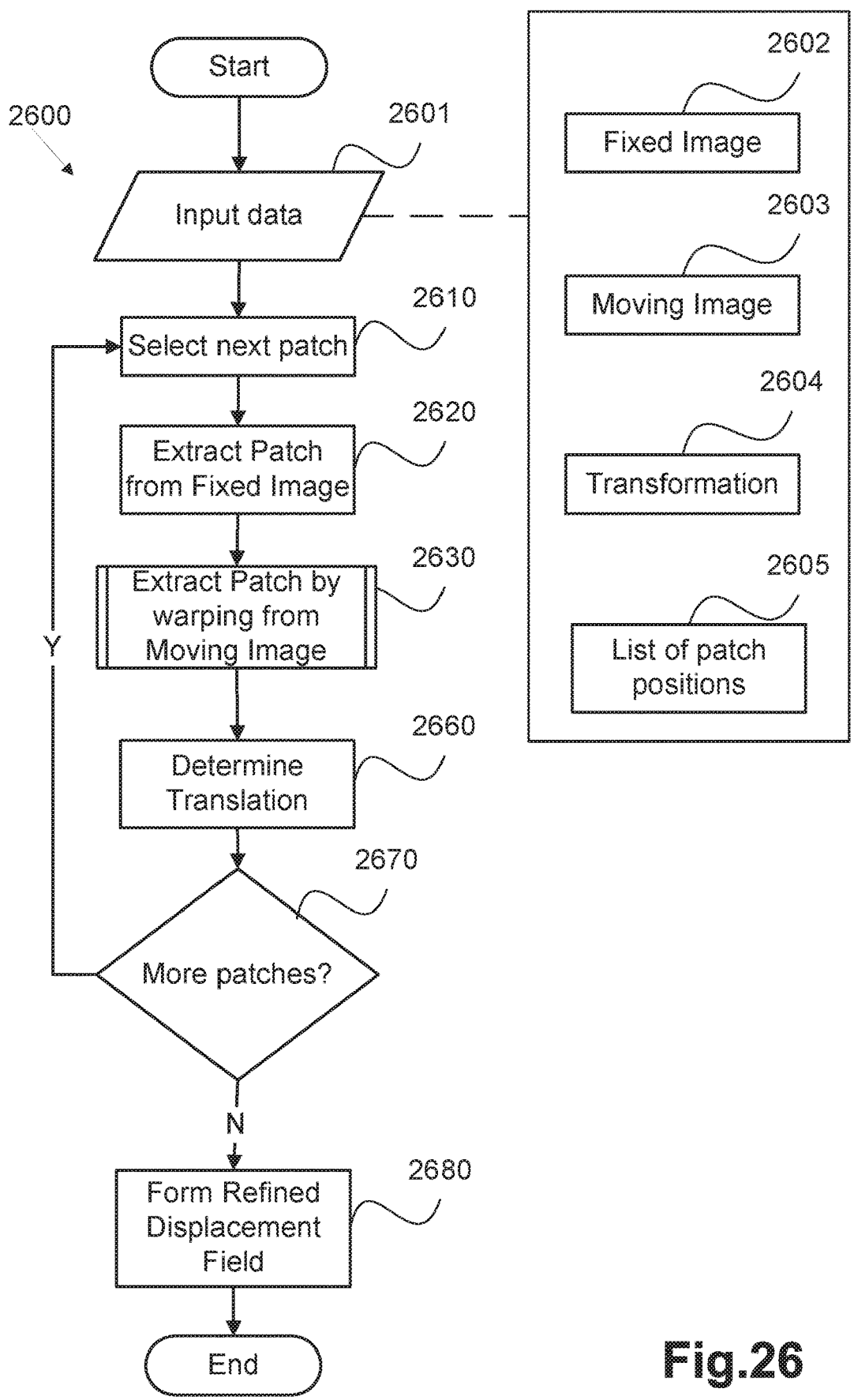
FIG. 26 shows a process to refine a displacement field by comparing fixed image patches with warped moving image patches.

FIG. 26 shows a method of refining a displacement field mapping from one image to another by estimating a local shift in a set of patches spread across the image, using a MACK kernel to warp patches to improve measurement accuracy.

The input data (2601) to the process is two images, a fixed image (2602) and a moving image (2603), a transformation or displacement field (2604) containing a mapping from positions in the fixed image to positions in the moving image, and a list of patch positions (2605) to be used to determine relative displacements at a set of locations in image 1.

The list of patch positions can be created on a regular grid to allow measurements over the whole of the fixed image, or using a set of feature points chosen to give a broad range of estimates but also chosen in positions where image information is such so as to give an accurate estimate of relative shift. A method such as the Harris corner detector is one common way to find such positions.

For this method to work, the displacement field (2604) must be a moderately accurate version of the correct displacement field relating the two images which results in patch pairs in overlapping portions of the two images containing at least two thirds of the area of the patches containing overlapping image content.

The process starts by selecting the next patch position (2610) from the list of patches. Using this patch position, a rectangular set of pixels is extracted (2620) from image 1 to form patch 1. A patch size of around 64×64 usually achieves good results, but a smaller patch size such as 32×32 might be chosen to increase speed, or if the transformation is of small magnitude, or if the alignable image content is high, or a larger patch size such as 128×128 might be chosen if the transformation has larger translations or the alignable content is low.

In step 2630 a rectangular set of pixels is extracted by warping using MACK kernels from the moving image to form patch 2. This process of warping is described in FIG. 27.

In step 2660 a translation is determined between patch 1 and patch 2 using phase correlation followed by a correlation peak estimation. If the distortion is small this operation can be performed with an accuracy better than 0.01 pixels. If the patches do not match due to non-overlap of image features, excessive distortion due to a poor initial transformation (2604) estimate, or an absence of strong image alignment features in the extracted patches, the peak will not be discernible and the translation for these patches is ignored.

In step 2670, the list of unprocessed patches is examined, and while there are more patches on that list (Y), control is returned to step 2610 until all patches are processed. If there are no more patches to process (N), the method 2600 proceeds from step 2670 to step 2680.

In step 2680, the patch positions associated with valid measured translations are used to determine a residual displacement field by interpolation of the measured translations. If the patch positions were placed on a regular grid, the residual displacement field can be generated by interpolating between the measured displacement values by cubic interpolation. If the patch positions were placed at arbitrary points, the displacement field can be generated by first triangulating the patch positions and then interpolating between triangulated patch positions using a plane fitted through each of the three triangulated points. This residual displacement field is composed with the original displacement field to yield a refined displacement field, which constitutes an improved estimation of the transformation relating the fixed and moving images.

Figure 27:
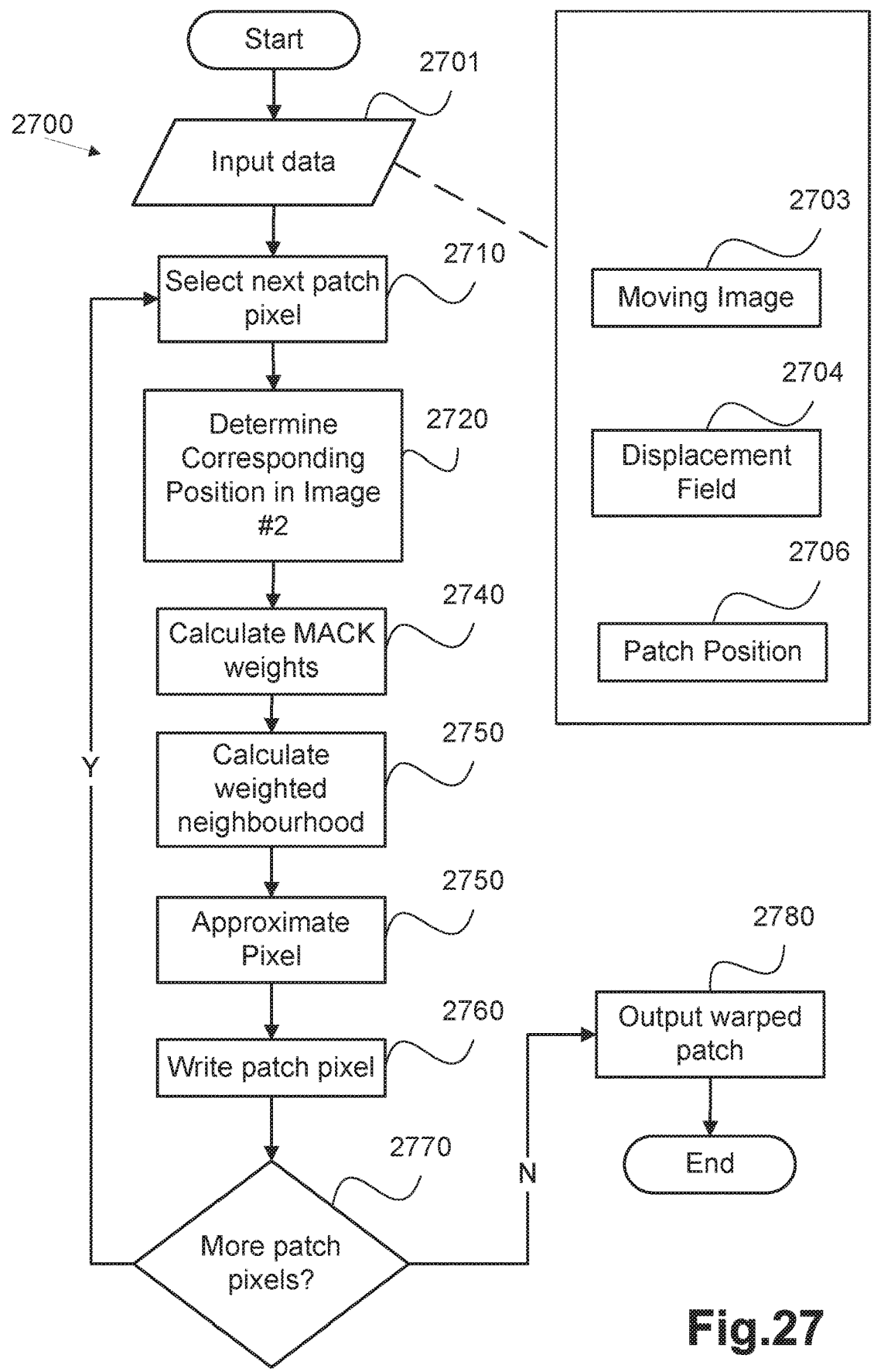
FIG. 27 shows a process to generate a warped moving image patch.

FIG. 27 describes the process for warping pixels from the moving image into patch 2 using a MACK kernel. The input data (2701) to this process is the moving image (2703), a displacement field (2704) mapping pixels from the fixed to the moving image, and a patch position (2706).

The set of patch pixels are those in the patch-sized rectangular region centred on the current patch position in the fixed image. In step 2710, the next patch pixel is selected from the set of all unprocessed patch pixels, and in step 2720 the transformation at the patch pixel position is used to determine the corresponding position (x,y) in the moving image. A base integer pixel position in the moving image (X,Y) and subpixel position $(x_f, y_f)$ are calculated from the position (x,y) using an appropriate method depending upon whether an odd or an even MACK kernel width is being used. In step 2730 the kernel MACK weights are calculated for the shifts $(x_f, y_f)$ using equations [2], [3], [4] or [5] and in step 2740 the values of the pixels neighbouring the base pixel position (X,Y) are multiplied by the MACK kernel weights, as previously described with reference to equations [2], [3], [4] and [5] and in step 2750 summed to produce an approximate pixel value. In step 2760 the approximate pixel value is written to the output patch in the same position as the selected patch pixel. In step 2770, control is returned to step 2710 and further patch pixels are processed until the output warped patch (2780) is populated with pixels.

The invention claimed is:

1. A method of adjusting a displacement field relating positions of pixels between at least two images, the method comprising:

receiving a first image and a second image, the received images being associated with an initial displacement field, each pixel of the first image and the second image being associated with a label;

selecting a first pixel in the first image which maps to a second pixel in the second image based on a vector of the initial displacement field, the first pixel being associated with a first label and the second pixel being associated with a second label;

determining a set of third pixels including the second pixel and a plurality of adjacent pixels to the second pixel, the third pixels being associated with third labels and a candidate shift vector with respect to the second pixel;

determining a covariance score for each of the third pixels, the covariance score defining a statistical dependence between the first label and each of the third labels;

determining an adjustment shift vector based on the covariance scores and the candidate shift vectors of the third pixels; and adjusting the vector of the initial displacement field using the determined adjustment shift vector, and wherein the statistical dependence is determined by normalizing a probability that the first label co-occurs with the second label in the second image with respect to a product of a probability of the first label in the first image and a probability of the second label in the second image.

2. The method according to claim 1, wherein the statistical dependence is based on the initial displacement field.

3. The method according to claim 1, wherein the covariance score has a value between 0 and 1.

4. The method according to claim 1, wherein the first label co-occurs together with the second label if the second pixel is mapped, through the initial displacement field, to the first pixel.

5. The method according to claim 1, wherein the adjustment shift vector for the first pixel is determined in parallel or asynchronously with determining an adjustment shift vector for at least one further pixel in the first image.

6. The method according to claim 1, wherein the adjustment shift vectors are determined on a GPU.

7. The method according to claim 1, further comprising determining an adjustment displacement field for a plurality of pixels of the first image; and filtering the adjustment displacement field.

8. The method according to claim 7, further comprising scaling adjustment shift vectors in the adjustment displacement field based on a stability of convergence.

9. The method according to claim 1, further comprising:
generating a pyramid of low resolution images for each of the first and the second images, wherein pixels of the low resolution images are associated with labels by a clustering algorithm at a corresponding level of the pyramid such that the number of clusters increases with resolution of the images.

10. A method of adjusting a displacement field relating positions of pixels between at least two images, the method comprising:
receiving a first image and a second image, the received images being associated with an initial displacement field, each pixel of the first image and the second image being associated with a label;
selecting a first pixel in the first image which maps to a second pixel in the second image based on a vector of the initial displacement field, the first pixel being associated with a first label and the second pixel being associated with a second label;
determining a set of third pixels including the second pixel and a plurality of adjacent pixels to the second pixel, the third pixels being associated with third labels and a candidate shift vector with respect to the second pixel;

determining a covariance score for each of the third pixels, the covariance score defining a statistical dependence between the first label and each of the third labels;

determining an adjustment shift vector based on the covariance scores and the candidate shift vectors of the third pixels;

adjusting the vector of the initial displacement field using the determined adjustment shift vector; and calculating a first histogram, a second histogram and a joint histogram, the first histogram comprising first marginal probability distribution values $-P(a_i)$ of labels associated with pixels in the first image, the second histogram comprising second marginal probability distribution values $P(b_j)$ of labels associated with pixels in the second image, the joint histogram comprising joint probability values $P(a_i,b_j)$ of the labels associated with the pixels in the first image being mapped to the labels associated with the pixels in the second image;

wherein the covariance scores are determined using joint probability values, first marginal probability distribution values, and second marginal probability distribution values.

11. The method according to claim 10, wherein the covariance score is non-negative, and further wherein the covariance score, given the initial displacement field, takes a value between 0 and 0.5 if $$\frac{P(a_i)*P(b_j)}{P(a_i,b_j)} > 1,$$

the covariance scores is about 0.5 where the first label and the associated label in the second image are statistically independent, and the covariance score is between 0.5 and 1.0 if $$0 < \frac{P(a_i)*P(b_j)}{P(a_i,b_j)} < 1.$$

12. The method according to claim 10, wherein the joint histogram is calculated using partial volume interpolation technique with a 3×3 approximation kernel.

13. The method according to claim 12, wherein the 3×3 approximation kernel has constant sum, constant sum of squares for each shift within [−0.5, +0.5], and a centroid equal to the shift.

14. A method of adjusting a displacement field relating positions of pixels between at least two images, the method comprising:
receiving a first image and a second image, the received images being associated with an initial displacement field, each pixel of the first image and the second image being associated with a label;
selecting a first pixel in the first image which maps to a second pixel in the second image based on a vector of the initial displacement field, the first pixel being associated with a first label and the second pixel being associated with a second label;
determining a set of third pixels including the second pixel and a plurality of adjacent pixels to the second pixel, the third pixels being associated with third labels and a candidate shift vector with respect to the second pixel;

determining a covariance score for each of the third pixels, the covariance score defining a statistical dependence between the first label and each of the third labels;

determining an adjustment shift vector based on the covariance scores and the candidate shift vectors of the third pixels;

adjusting the vector of the initial displacement field using the determined adjustment shift vector; and normalising the covariance scores wherein the adjustment shift vector is determined based on the normalized covariance scores, wherein the adjustment shift vector is defined using one of:

a sum of the candidate shift vectors for the third pixels weighted by the corresponding normalized covariance scores; and an adjustment shift vector of one of the third pixels associated with the highest covariance score weighted by said highest covariance score being normalized.

15. A method of adjusting a displacement field relating positions of pixels between at least two images, the method comprising:

receiving a first image and a second image, the received images being associated with an initial displacement field, each pixel of the first image and the second image being associated with a label;

selecting a first pixel in the first image which maps to a second pixel in the second image based on a vector of the initial displacement field, the first pixel being associated with a first label and the second pixel being associated with a second label;

determining a set of third pixels including the second pixel and a plurality of adjacent pixels to the second pixel, the third pixels being associated with third labels and a candidate shift vector with respect to the second pixel;

determining a covariance score for each of the third pixels, the covariance score defining a statistical dependence between the first label and each of the third labels;

determining an adjustment shift vector based on the covariance scores and the candidate shift vectors of the third pixels;

adjusting the vector of the initial displacement field using the determined adjustment shift vector;

calculating the covariance scores in advance for all pairs of labels for mapped pixels from the first image and the second image; and storing the calculated covariance scores in a look-up table indexed by a pair index associated with the pair labels.

* * * * *